(12) United States Patent
Shiraiwa et al.

(10) Patent No.: US 9,346,961 B2
(45) Date of Patent: May 24, 2016

(54) POLYMERIZABLE COMPOSITION AND ANTIREFLECTIVE FILM, POLARIZING PLATE AND IMAGE DISPLAY DEVICE USING THE SAME

(71) Applicant: FUJIFILM Corporation, Tokyo (JP)

(72) Inventors: Naozumi Shiraiwa, Kanagawa (JP); Masataka Yoshizawa, Kanagawa (JP); Daiki Wakizaka, Kanagawa (JP); Miho Asahi, Kanagawa (JP); Hiroyuki Suzuki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 357 days.

(21) Appl. No.: 13/853,702

(22) Filed: Mar. 29, 2013

(65) Prior Publication Data

US 2013/0258467 A1   Oct. 3, 2013

(30) Foreign Application Priority Data

| Mar. 30, 2012 | (JP) | 2012-081571 |
| Mar. 30, 2012 | (JP) | 2012-081572 |
| Jan. 31, 2013 | (JP) | 2013-017951 |
| Jan. 31, 2013 | (JP) | 2013-017952 |
| Mar. 14, 2013 | (JP) | 2013-052524 |
| Mar. 14, 2013 | (JP) | 2013-052525 |

(51) Int. Cl.

| C09D 4/00 | (2006.01) |
| C09D 5/00 | (2006.01) |
| G02B 1/10 | (2015.01) |
| G02B 5/30 | (2006.01) |
| G02B 1/111 | (2015.01) |
| G02B 1/116 | (2015.01) |

(52) U.S. Cl.
CPC ...... *C09D 5/006* (2013.01); *C09D 4/00* (2013.01); *G02B 1/105* (2013.01); *G02B 1/111* (2013.01); *G02B 1/116* (2013.01); *G02B 5/30* (2013.01); *G02B 5/3033* (2013.01)

(58) Field of Classification Search
CPC .......... C09D 4/00; C09D 5/006; G02B 1/105; G02B 1/111; G02B 1/116; G02B 5/30; G02B 5/3033
USPC ................ 359/483.01; 522/97, 151, 152, 174
See application file for complete search history.

(56) References Cited

U.S. PATENT DOCUMENTS

| 6,306,563 B1 | 10/2001 | Xu et al. |
| 2002/0006586 A1 | 1/2002 | Xu et al. |
| 2013/0053506 A1 | 2/2013 | Ohtaguro et al. |

FOREIGN PATENT DOCUMENTS

| JP | 2003-502718 | 1/2003 |
| JP | 2009-256597 A | 11/2009 |
| JP | 4556151 B | 7/2010 |
| JP | 2011-162572 | 8/2011 |
| WO | WO-2004-035656 | 4/2004 |

OTHER PUBLICATIONS

KarenzBEI Techincal Data Sheet from Showa Denko. retrieved from the interent on [Jul. 24, 2015]. Retrieved from internet <URL://http://www.karenz.jp/en/bei/> pp. 1-3 copyright (2004-2014).*
Notice of Reasons for Rejection issued by JPO on Aug. 19, 2014 in connection with corresponding Japanese Patent Application No. 2013-052524.
Introduction to Fluorine Chemistry, Frontline of Fundament and Application; Apr. 20, 2010; pp. 398-399.

* cited by examiner

*Primary Examiner* — Sanza McClendon
(74) *Attorney, Agent, or Firm* — Jean C. Edwards, Esq.; Edwards Neils PLLC

(57) ABSTRACT

The invention is directed to a polymerizable composition containing: a compound containing a repeating unit having a polyether structure having a fluorine atom and four or more polymerizable groups and being represented by the formula (I) as defined herein; a photopolymerization initiator; and an organic solvent, or a polymerizable composition containing: a compound containing a repeating unit having a polyether structure having a fluorine atom and four or more polymerizable groups and being represented by one of the formulae (I-1) to (I-5) as defined herein; a photopolymerization initiator; and an organic solvent.

7 Claims, No Drawings

POLYMERIZABLE COMPOSITION AND ANTIREFLECTIVE FILM, POLARIZING PLATE AND IMAGE DISPLAY DEVICE USING THE SAME

CROSS-REFERENCE TO RELATED APPLICATIONS AND PRIORITY CLAIMS

This present application claims the benefit of priority from Japanese Patent Applications Nos. 2012-081571, which was filed Mar. 30, 2012, 2012-081572, which was filed Mar. 30, 2012, 2013-017951, which was filed Jan. 31, 2013, 2013-017952, which was filed Jan. 31, 2013, 2013-052524, which was filed Mar. 14, 2013 and 2013-052525, which was filed Mar. 14, 2013, the contents of all of which are incorporated herein by reference in their entirety.

FIELD OF THE INVENTION

The present invention relates to a polymerizable composition, an antireflective film using the same, a polarizing plate using the antireflective film, and an image display device using the antireflective film or the polarizing plate on the outermost surface of the display.

BACKGROUND OF THE INVENTION

In an image display device, for example, a cathode ray tube display device (CRT), a plasma display (PDP), an electroluminescence display (ELD) or a liquid crystal display device (LCD), an antireflective film is ordinarily provided on the outermost surface of the display for reducing reflectivity using the principle of optical interference, in order to prevent contrast reduction due to the reflection of the outside light or reflection of an image. Thus, the antireflective film is required to have a high antifouling property against a fat or oil component, for example, a fingerprint or sebum, high physical strength (for example, scratch resistance), high transmittance, chemical resistance and weather resistance (for example, moisture/heat resistance or light resistance). In addition to the high antireflective performance.

As the antireflective film, a film having a single optical interference layer is known. However, from the standpoint of achieving more reduction of reflectivity, a multilayer type antireflective film having a plurality of optical interference layers, for example, a low refractive index layer, a medium refractive index layer or a high refractive index layer has been developed at present.

Such a multilayer type antireflective film can achieve the reduction of reflectivity, but when the layer thickness or refractive index of each of the layers is fluctuated, the reflected color may tend to change. In particular, when a fingerprint or sebum is attached on the surface of a coated film, even if it is wiped off, some residue of the fat or oil component, if any, remains, and thus, it is noticeable because the attachment trace is more readily recognized as the change in the tint based on the change in the refractive index in comparison with the single layer antireflective film, thereby reducing the visibility of the image. Therefore, in a multilayer type antireflective film, high antifouling property against a fat or oil component, for example, a fingerprint or sebum is particularly required.

As a technology for imparting the antifouling property, there has been ordinarily known a method of reducing the surface free energy of a coated film surface using a silicone compound having a polydimethylsiloxane structure or a fluorine-based compound. For example, it is proposed that a compound having a long-chain perfluoropolyether chain (PFPE) and a polyfunctional polymerizable unsaturated group is used so as to impart an antifouling performance (see, for example, JP-A-2009-256597 (the term "JP-A" as used herein means an "unexamined published Japanese patent application") and Japanese Patent No. 4,556,151).

However, such a compound is a compound having two kinds of repeating units of a repeating unit represented by —$(CF_2CF_2O)_m$— and a repeating unit represented by —$(CF_2O)_n$— because of using as a raw material, PFPE (FLUOROLINK D, produced by Solvay Solexis, Inc.). FLUOROLINK D is presented by $HOCH_2CF_2O(CF_2CF_2O)_m(CF_2O)_nCF_2CF_2OH$.

Although the repeating structure is represented by —$(CF_2CF_2O)_n$— in the structure of Compound 1 described in Paragraph No. [0020] of JP-A-2009-256597, it is understood that the repeating structure has been incorrectly described and in fact, the repeating structure of Compound 1 of JP-A-2009-256597 is composed of two kinds of repeating units of a repeating unit represented by —$(CF_2CF_2O)_m$— and a repeating unit represented by —$(CF_2O)_n$—.

Taking into consideration of increase in the surface tension reducing ability due to increase in hydrophobic interaction between the PFPE structures, it is desired that the PFPE structure is a single structure, for example, —$(CF_2CF_2O)_m$— structure. However, it is difficult to obtain a repeating structure composed of only —$(CF_2CF_2O)_m$— structure by the production process of FLUOROLINK D as described in the production scheme shown below (see, for example, *Fusso Kagaku Nyumon; Kiso to Oyo no Siazensen* 2010 (*Introduction to Fluorine Chemistry: Frontline of Fundament and Application* 2010)).

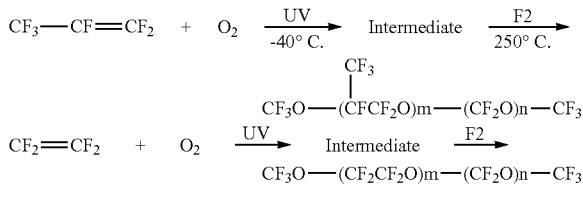

Further, in order to impart the antifouling property to a low refractive index layer, further improvements in reduction of refractive index, antifouling property and scratch resistance have been required.

SUMMARY OF THE INVENTION

In view of the problems of prior art described above, an object of the present invention is to provide a polymerizable composition which provides a film having a low refractive index and being excellent in antifouling property and scratch resistance, an antireflective film using the same, and a polarizing plate and an image display device using the antireflective film.

As a result of the intensive investigations in order to solve the above-described problems, the inventors have found that the above-described objects can be achieved by the constructions described below, and based thereon, to complete the present invention.
(1) A polymerizable composition comprising a component (A), a component (B) and a component (C):
(A) a compound containing a repeating unit having a polyether structure having a fluorine atom and four or more polymerizable groups and being represented by formula (I) shown below,
(B) a photopolymerization initiator, and
(C) an organic solvent, Formula (I)

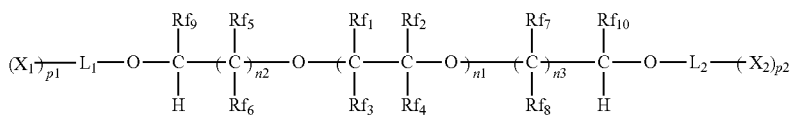

In formula (I), $Rf_1$ to $Rf_4$ each independently represents a fluorine atom, an alkyl group having a fluorine atom or a group represented by $-CF_2-O-(CF_2)_{m1}F$. m1 represents an integer of 1 or more. n1 represents a number of the repeating unit and is a positive integer. $Rf_5$ to $Rf_8$ each independently represents a fluorine atom, an alkyl group having a fluorine atom or a group represented by $-CF_2-O-(CF_2)_{m2}F$. n2 and n3 each independently represents a positive integer. When n2 or n3 is 2 or more, two or more $Rf_5$s, two or more $Rf_6$s, two or more $Rf_7$s or two or more $Rf_8$s may be the same as or different from each other. m2 represents an integer of 1 or more. $Rf_9$ and $Rf_{10}$ each independently represents a hydrogen atom, an alkyl group having a fluorine atom or a group represented by $-CF_2-O-(CF_2)_{m3}F$. m3 represents an integer of 1 or more. $L_1$ represents a (p1+1) valent aliphatic connecting group, and $L_2$ represents a (p2+1) valent aliphatic connecting group. p1 and p2 each independently represents an integer of 2 or more. $X_1$ and $X_2$ each independentiy represents a group having a polymerizable group.
(2) The polymerizable composition as described in (1) above, wherein, a kind and number of the substituents represented by $Rf_1$ to $Rf_4$ are the same among the repeating units in the compound (A).
(3) The polymerizable composition as described in (1) or (2) above, wherein at least one of $Rf_1$ to $Rf_8$ in formula (I) is a straight chain perfluoroalkyl group having from 2 to 8 carbon atoms or a group represented by $-Cf_2-O-(CF_2)_mF$ (wherein m represents an integer from 1 to 10), and $Rf_9$ and $Rf_{10}$ each independently represent a hydrogen atom, a straight chain perfluoroalkyl group having from 2 to 8 carbon atoms or the group represented by $-CF_2-O-(CF_2)_{m3}F$.
(4) The polymerizable composition as described in any one of (1) to (3) above, wherein $L_1$ and $L_2$ in formula (I) each independently represents a connecting group represented by any of formulae shown below.

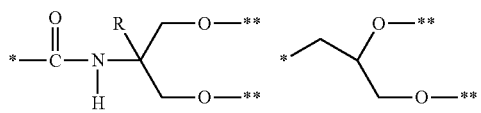

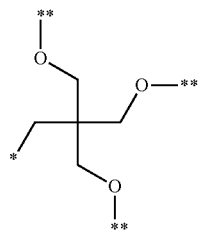

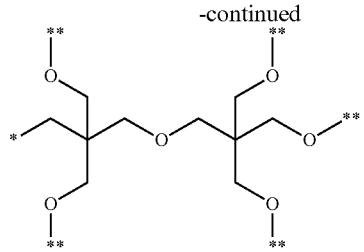

In the formulae above, R represents a hydrogen atom or an alkyl group, * represents a site connecting to an adjacent oxygen atom in formula (I), and ** represents a site connecting to $X_1$ or $X_2$ in formula (I).
(5) The polymerizable composition as described in any one of (1) to (4) above, wherein the group having a polymerizable group represented by $X_1$ or $X_2$ in the compound (A) is a (meth)acryloyl group.
(6) An antireflective film comprising at least one low refractive Index layer on a transparent support, wherein the low refractive index layer is formed from the polymerizable composition as described in any one of (1) to (5) above.
(7) A polarizing plate comprising a polarizing film and two protective films which protect both sides of the polarizing film, wherein at least one of the protective films is the antireflective film as described in (6) above.
(8) An image display device comprising a display having the antiretlective film as described in (6) above or the polarizing plate as described in (7) above at an outermost surface.
(9) A method for production of a compound containing a repeating unit having a polyether structure having a fluorine atom and four or more polymerizable groups and being represented by formula (I) shown below, which comprises a step of obtaining the repeating unit having a polyether structure having a fluorine atom by treating a compound represented by formula (II) shown below with a liquid phase fluorination method.

Formula (I)

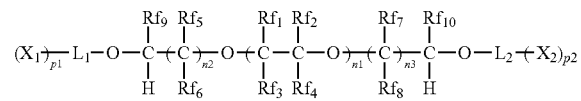

In formula (I), $Rf_1$ to $Rf_4$ each independently represents a fluorine atom, an alkyl group having a fluorine atom or a group represented by $-CF_2-O-(CF_2)_{m1}F$. m1 represents an integer of 1 or more. n1 represents a number of the repeating unit and is a positive integer. $Rf_5$ to $Rf_8$ each independently represents a fluorine atom, an alkyl group having a fluorine atom or a group represented by $-CF_2-O-(CF_2)_{m2}F$. m2 represents an integer of 1 or more. n2 and n3 each independently represents a positive integer. When n2 or n3 is 2 or more, two or more $Rf_5$s, two or more $Rf_6$s, two or more $Rf_7$s or two or more $Rf_8$s may be the same as or different from each other. $Rf_9$ and $Rf_{10}$ each independently represents a hydrogen atom, an alkyl group having a fluorine atom or a group represented by $-CF_2-O-(CF_2)_{m3}F$. m3 represents an integer of 1 or more, $L_1$ represents a (p1+1) valent aliphatic connecting group, and $L_2$ represents a (p2+1) valent aliphatic connecting group. p1 and p2 each independently represents an integer of 2 or more. $X_1$ and $X_2$ each independently represents a group having a polymerizable group.

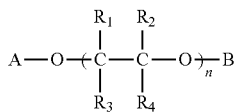

Formula (II)

In formula (II), A and B each independently represents a protective group of hydroxy group. $R_1$ to $R_4$ each independently represents a hydrogen atom, an alkyl group or a group represented by $-CH_2-O-(CH_2)_{m1}H$. m1 represents an integer of 1 or more. n represents a positive integer.

(10) The method for production as described in (9) above, which further comprises a step of obtaining the compound represented by formula (II) by ring-opening polymerization of an epoxy ring of a compound represented by formula (III) shown below.

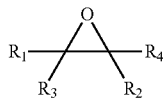

Formula (III)

In formula (III), $R_1$ to $R_4$ have the same meanings as $R_1$ to $R_4$ in formula (II) respectively.

(11) A polymerizable composition comprising a component (A), a component (B) and a component (C):
 (A) a compound containing a repeating unit having a polyether structure having a fluorine atom and four or more polymerizable groups and being represented by any of formulae (I-1) to (I-5) shown below,
 (B) a photopolymerization initiator, and
 (C) an organic solvent.

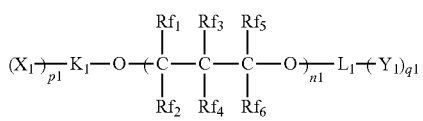
(I-1)

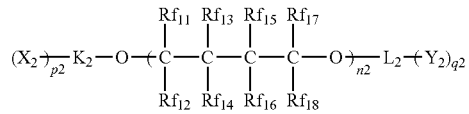
(I-2)

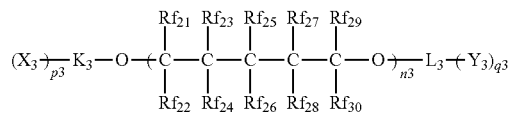
(I-3)

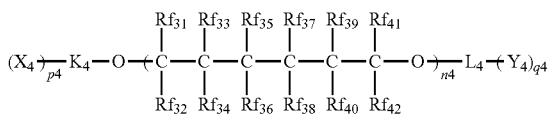
(I-4)

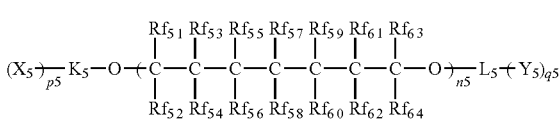
(I-5)

In formulae (I-1) to (I-5), $Rf_1$ to $Rf_6$, $Rf_{11}$ to $Rf_{18}$, $Rf_{21}$ to $Rf_{30}$, $Rf_{31}$ to $Rf_{42}$ and $Rf_{51}$ to $Rf_{64}$ each independently represents a fluorine atom, an alkyl group having a fluorine atom or a group represented by $-CF_2-O-(CF_2)_{m1}F$. m1 represents an integer of 1 or more. n1 to n5 each independently represents a number of the repeating unit and is a positive integer. $X_1$ to $X_5$ and $Y_1$ to $Y_5$ each independently represents a group having a polymerizable group. $K_1$ represents a (p1+1) valent connecting group, and $L_1$ represents a (q1+1) valent collecting group. p1 and q1 each independently represents an integer of 2 or more. $K_2$ represents a (p2+1) valent connecting group, and $L_2$ represents a (q2+1) valent connecting group. p2 and q2 each independently represents an integer of 2 or more. $K_3$ represents a (p3+1) valent connecting group, and $L_3$ represents a (q3+1) valent connecting group. p3 and q3 each independently represents an integer of 2 or more. $K_4$ represents a (p4+1) valent connecting group, and $L_4$ represents a (q4+1) valent connecting group. p4 and q4 each independently represents an integer of 2 or more. $K_5$ represents a (p5+1) valent connecting group, and $L_5$ represents a (q5+1) valent connecting group. p5 and q5 each independently represents an integer of 2 or more.

(12) The polymerizable composition as described in (11) above wherein, a kind and number of the substituents represented by $Rf_1$ to $Rf_6$ the same among the repeating units in formula (I-1), a kind and number of the substituents represented by $Rf_{11}$ to $Rf_{18}$ are the same among the repeating units in formula (I-2), a kind and number of the substituents represented by $Rf_{21}$ to $Rf_{30}$ are the same among the repeating units in formula (I-3), a kind and number of the substituents represented by $Rf_{31}$ to $Rf_{42}$ are the same among the repeating units in formula (I-4), and a kind and number of the substituents represented by $Rf_{51}$ to $Rf_{64}$ are the same among the repeating units in formula (I-5),

(13) The polymerizable composition as described in (12) above wherein, the compound (A) is a compound represented by any of formulae (I-3) to (I-5).

(14) The polymerizable composition as described in any one of (11) to (13) above, wherein, $K_1$ to $K_5$ and $L_1$ to $L_5$ each independently represents a connecting group represented by any of formulae shown below.

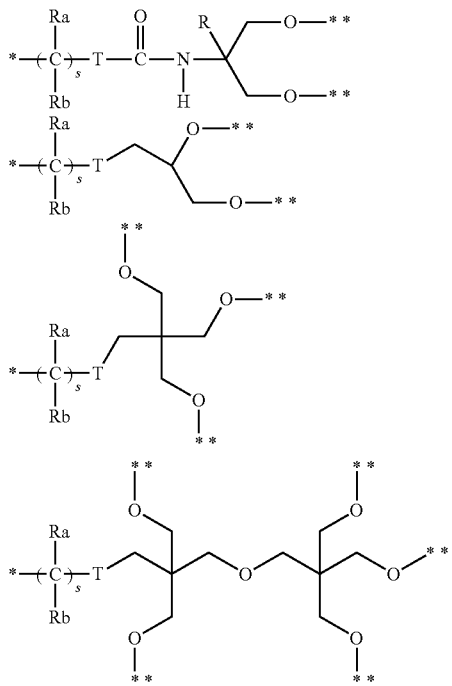

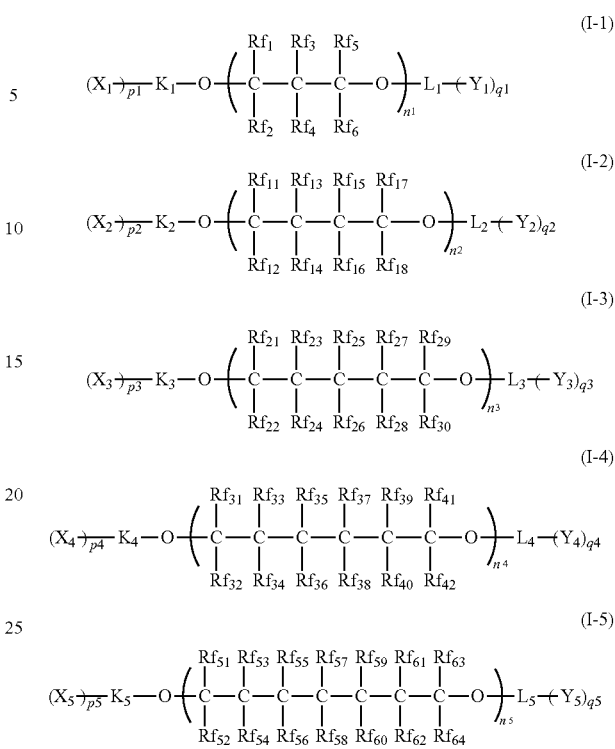

In the formulae above, R represents a hydrogen atom or an alkyl group, Ra and Rb each independently represents a hydrogen atom, a fluorine atom, an alkyl group having a fluorine atom or a group represented by —$CF_2$—O—$(CF_2)_{m2}$F. m2 represents an integer of 1 or more. s represents an integer of 0 or more. T represents a single bond when s is 0 or an oxygen atom when s is an integer of 1 or more. * represents a site connecting to an adjacent oxygen atom in any of formulae (I-1) to (I-5), and ** represents a site connecting to any of $X_1$ to $X_5$ and $Y_1$ to $Y_5$ in formulae (I-1) to (I-5).

(15) The polymerizable composition as described in any one of (11) to (14) above, wherein the group having a polymerizable group represented by any of $X_1$ to $X_5$ and $Y_1$ to $Y_5$ in the compound (A) is a (meth)acryloyl group.

(16) An antireflective film comprising at least one low refractive index layer on a transparent support wherein the low refractive index layer is formed from the polymerizable composition as described in any one of (11) to (15) above.

(17) A polarizing plate comprising a polarizing film and two protective films which protect both sides of the polarizing film, wherein at least one of the protective films is the antireflective film as described in (16) above.

(18) An image display device comprising a display having the antireflective film as described in (16) above or the polarizing plate as described in (17) above at an outermost surface.

(19) A method for production of a compound containing a repeating unit having a polyether structure having a fluorine atom and four or more polymerizable groups and being represented by any of formulae (I-1) to (I-5) shown below, which comprises a step of obtaining the repeating unit having a polyether structure having a fluorine atom by treating a compound represented by any of formula (II-1) to (II-5) shown below with a liquid phase fluorination method.

In formulae (I-1) to (I-5), $Rf_1$ to $Rf_6$, $Rf_{11}$ to $Rf_{18}$, $Rf_{21}$ to $Rf_{30}$, $Rf_{31}$ to $Rf_{42}$ and $Rf_{51}$ to $Rf_{64}$, each independently represents a fluorine atom, an alkyl group having a fluorine atom or a group represented by —$CF_2$—O—$(CF_2)_{m1}$F. m1 represents an integer of 1 or more. n1 to n5 each independently represents a number of the repeating unit and is a positive integer. $X_1$ to $X_5$ and $Y_1$ to $Y_5$ each independently represents a group having a polymerizable group. $K_1$ represents a (p1+1) valent connecting group, and $L_1$ represents a (q1+1) valent connecting group. p1 and q1 each independently represents an integer of 2 or more. $K_2$ represents a (p2+1) valent connecting group, and $L_2$ represents a (q2+1) valent connecting group. p2 and q2 each independently represents an integer of 2 or more. $K_3$ represents a (p3+1) valent connecting group, and $L_3$ represents a (q3+1) valent connecting group. p3 and q3 each independently represents an integer of 2 or more. $K_4$ represents a (p4+1) valent connecting group, and $L_4$ represents a (q4+1) valent connecting group. p4 and q4 each independently represents an integer of 2 or more. $K_5$ represents a (p5+1) valent connecting group, and $L_5$ represents a (q5+1) valent connecting group. p5 and q5 each independently represents an integer of 2 or more.

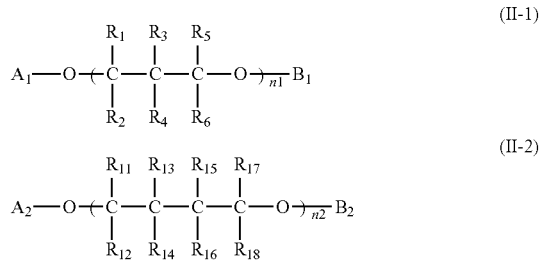

(II-3)

$$A_3-O\left(\begin{array}{c}R_{21}\\|\\C\\|\\R_{22}\end{array}\begin{array}{c}R_{23}\\|\\C\\|\\R_{24}\end{array}\begin{array}{c}R_{25}\\|\\C\\|\\R_{26}\end{array}\begin{array}{c}R_{27}\\|\\C\\|\\R_{28}\end{array}\begin{array}{c}R_{29}\\|\\C\\|\\R_{30}\end{array}-O\right)_{n3}B_3$$

(II-4)

$$A_4-O\left(\begin{array}{c}R_{31}\\|\\C\\|\\R_{32}\end{array}\begin{array}{c}R_{33}\\|\\C\\|\\R_{34}\end{array}\begin{array}{c}R_{35}\\|\\C\\|\\R_{36}\end{array}\begin{array}{c}R_{37}\\|\\C\\|\\R_{38}\end{array}\begin{array}{c}R_{39}\\|\\C\\|\\R_{40}\end{array}\begin{array}{c}R_{41}\\|\\C\\|\\R_{42}\end{array}-O\right)_{n4}B_4$$

(II-5)

$$A_5-O\left(\begin{array}{c}R_{51}\\|\\C\\|\\R_{52}\end{array}\begin{array}{c}R_{53}\\|\\C\\|\\R_{54}\end{array}\begin{array}{c}R_{55}\\|\\C\\|\\R_{56}\end{array}\begin{array}{c}R_{57}\\|\\C\\|\\R_{58}\end{array}\begin{array}{c}R_{59}\\|\\C\\|\\R_{60}\end{array}\begin{array}{c}R_{61}\\|\\C\\|\\R_{62}\end{array}\begin{array}{c}R_{63}\\|\\C\\|\\R_{64}\end{array}-O\right)_{n5}B_5$$

In formulae (II-1) to (II-5), $A_1$ to $A_5$ and $B_1$ to $B_5$ each independently represents a protective group of hydroxy group. $R_1$ to $R_6$, $R_{11}$ to $R_{18}$, $R_{21}$ to $R_{30}$, $R_{31}$ to $R_{42}$ and $R_{51}$ to $R_{64}$ each independently represents a hydrogen atom, an alkyl group or a group represented by —CH$_2$—O—(CH$_2$)$_{m1}$H. m1 represents an integer of 1 or more. n1 to n5 each independently represents a positive integer.

(20) The method for production as described in (19) above, which further comprises a step of obtaining the compound represented by any of formulae (II-1) to (II-5) by ring-opening polymerization of a compound represented by any of formulae (III-1) to (III-5) shown below.

(III-1)

(III-2)

(III-3)

(III-4)

(III-5)

In formulae (III-1) to (III-5), $R_1$ to $R_6$, $R_{11}$ to $R_{18}$, $R_{21}$ to $R_{30}$, $R_{31}$ to $R_{42}$ and $R_{51}$ to $R_{64}$ have the same meanings as $R_1$ to $R_6$, $R_{11}$ to $R_{18}$, $R_{21}$ to $R_{30}$, $R_{31}$ to $R_{42}$ and $R_{51}$ to $R_{64}$ in formulae (II-1) to (II-5) respectively.

(21) A compound containing a repeating unit having a polyether structure having a fluorine atom and four or more polymerizable groups and being represented by any of formulae (I-1) to (I-5) shown below.

(I-1)

$$(X_1)_{p1}K_1-O\left(\begin{array}{c}Rf_1\\|\\C\\|\\Rf_2\end{array}\begin{array}{c}Rf_3\\|\\C\\|\\Rf_4\end{array}\begin{array}{c}Rf_5\\|\\C\\|\\Rf_6\end{array}-O\right)_{n1}L_1(Y_1)_{q1}$$

(I-2)

$$(X_2)_{p2}K_2-O\left(\begin{array}{c}Rf_{11}\\|\\C\\|\\Rf_{12}\end{array}\begin{array}{c}Rf_{13}\\|\\C\\|\\Rf_{14}\end{array}\begin{array}{c}Rf_{15}\\|\\C\\|\\Rf_{16}\end{array}\begin{array}{c}Rf_{17}\\|\\C\\|\\Rf_{18}\end{array}-O\right)_{n2}L_2(Y_2)_{q2}$$

(I-3)

$$(X_3)_{p3}K_3-O\left(\begin{array}{c}Rf_{21}\\|\\C\\|\\Rf_{22}\end{array}\begin{array}{c}Rf_{23}\\|\\C\\|\\Rf_{24}\end{array}\begin{array}{c}Rf_{25}\\|\\C\\|\\Rf_{26}\end{array}\begin{array}{c}Rf_{27}\\|\\C\\|\\Rf_{28}\end{array}\begin{array}{c}Rf_{29}\\|\\C\\|\\Rf_{30}\end{array}-O\right)_{n3}L_3(Y_3)_{q3}$$

(I-4)

$$(X_4)_{p4}K_4-O\left(\begin{array}{c}Rf_{31}\\|\\C\\|\\Rf_{32}\end{array}\begin{array}{c}Rf_{33}\\|\\C\\|\\Rf_{34}\end{array}\begin{array}{c}Rf_{35}\\|\\C\\|\\Rf_{36}\end{array}\begin{array}{c}Rf_{37}\\|\\C\\|\\Rf_{38}\end{array}\begin{array}{c}Rf_{39}\\|\\C\\|\\Rf_{40}\end{array}\begin{array}{c}Rf_{41}\\|\\C\\|\\Rf_{42}\end{array}-O\right)_{n4}L_4(Y_4)_{q4}$$

(I-5)

$$(X_5)_{p5}K_5-O\left(\begin{array}{c}Rf_{51}\\|\\C\\|\\Rf_{52}\end{array}\begin{array}{c}Rf_{53}\\|\\C\\|\\Rf_{54}\end{array}\begin{array}{c}Rf_{55}\\|\\C\\|\\Rf_{56}\end{array}\begin{array}{c}Rf_{57}\\|\\C\\|\\Rf_{58}\end{array}\begin{array}{c}Rf_{59}\\|\\C\\|\\Rf_{60}\end{array}\begin{array}{c}Rf_{61}\\|\\C\\|\\Rf_{62}\end{array}\begin{array}{c}Rf_{63}\\|\\C\\|\\Rf_{64}\end{array}-O\right)_{n5}L_5(Y_5)_{q5}$$

In formulae (I-1) to (I-5), $Rf_1$ to $Rf_6$, $Rf_{11}$ to $Rf_{18}$, $Rf_{21}$ to $Rf_{30}$, $Rf_{31}$ to $Rf_{42}$ and $Rf_{51}$ to $Rf_{64}$ each independently represents a fluorine atom, an alkyl group having a fluorine atom or a group represented by —CF$_2$—O—(CF$_2$)$_{m1}$F. m1 represents an integer from 1 to 10. n1 to n5 each independently represents a number of the repeating unit and is a positive integer. $X_1$ to $X_5$ and $Y_1$ to $Y_5$ each independently represents a group having a polymerizable group. $K_1$ represents a (p1+1) valent connecting group, and $L_1$ represents a (q1+1) valent connecting group. p1 and q1 each independently represents an integer of 2 or more. $K_2$ represents a (p2+1) valent connecting group, and $L_2$ represents a (q2+1) valent connecting group. p2 and q2 each independently represents an integer of 2 or more. $K_3$ represents a (p3+1) valent connecting group, and $L_3$ represents a (q3+1) valent connecting group. p3 and q3 each independently represents an integer of 2 or more. $K_4$ represents a (p4+1) valent connecting group, and $L_4$ represents a (q4+1)

valent connecting group. p4 and q4 each independently represents an integer of 2 or more. $K_5$ represents a (p5+1) valent connecting group, and $L_5$ represents a (q5+1) valent connecting group. p5 and q5 each independently represents an integer of 2 or more.

The polymerizable composition according to the invention is excellent in the antifouling property and scratch resistance.

The antireflective film according to the invention is excellent in the antifoulng property wherein a fat or oil component, for example, a fingerprint or sebum is easily wiped off, when it is attached, and is excellent in the scratch resistance because of using the polymerizable composition described above.

The antireflective film according to the invention can provide a polarizing plate or image display device excellent in the antifouling property and scratch resistance.

Due to the compound and the method for production thereof, the polymerizable composition excellent in the antifouling property and scratch resistance described above can be provided.

DETAILED DESCRIPTION OF THE INVENTION

The present invention is described below, but the invention should not be construed as being limited thereto. In the specification, in the case where a numerical value represents a physical property value, a characteristic value or the like, the expression of "(numerical value 1) to (numerical value 2)" means a value ranging from "(numerical value 1)" or more to "(numerical value 2) or less". Also, in the specification, the term "(meth)acrylate" means "at least any of acrylate and methacrylate". The same is also applied to the terms "(meth) acryloyl group", "(meth)acrylic acid" and the like.

The polymerizable composition according to a first embodiment of the invention contains at least components (A), (B) and (C) shown below.
(A) a compound containing a repeating unit having a polyether structure having a fluorine atom and four or more polymerizable groups and being represented by formula (I) shown below,
(B) a photopolymerization initiator, and
(C) an organic solvent.

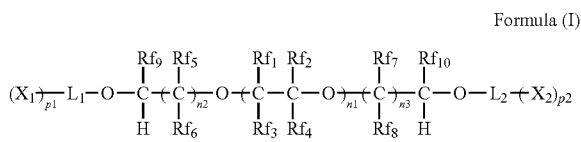

Formula (I)

In formula (I), $Rf_1$ to $Rf_4$ each independently represents a fluorine atom, an alkyl group having a fluorine atom or a group represented by $-CF_2-O-(CF_2)_{m1}F$. m1 represents an integer of 1 or more. n1 represents a number of the repeating unit and is a positive integer. $Rf_5$ to $Rf_8$ each independently represents a fluorine atom, an alkyl group having a fluorine atom or a group represented by $-CF_2-O-(CF_2)_{m2}F$. m1 represents an integer of 1 or more. n2 and n3 each independently represents a positive integer. When n2 or n3 is 2 or more, two or more $Rf_5$s two or more $Rf_6$s two or more $Rf_7$s or two or more $Rf_8$s may be the same as or different from each other. $Rf_9$ and $Rf_{10}$ each independently represents a hydrogen atom, an alkyl group having a fluorine atom or a group represented by $-CF_2-O-(CF_2)_{m3}F$. m3 represents an integer of 1 or more. $L_1$ represents a (p1+1) valent aliphatic connecting group, and $L_2$ represents a (p2+1) valent aliphatic connecting group. p1 and p2 each independently represents an integer of 2 or more. $X_1$ and $X_2$ each independently represents a group having a polymerizable group.

First, the compound (A) (hereinafter, also simply referred to as "compound (A) represented by formula (I)") containing a repeating unit having a polyether structure having a fluorine atom and four or more polymerizable groups and being represented by formula (I) shown above will be described.

In the first embodiment of the invention, the compound (A) represented by formula (I) is able to function as an antifouling agent.

The polyether structure having a fluorine atom is preferably a perfluoropolyether structure from the standpoint of the antifouling property.

In formula (I), $Rf_1$ to $Rf_4$ each independently represents a fluorine atom, an alkyl group having a fluorine atom or a group represented by $-CF_2-O-(CF_2)_{m1}F$.

The alkyl group having a fluorine atom for any one of $Rf_1$ to $Rf_4$ is preferably a straight chain alkyl group having from 1 to 10 carbon atoms and a fluorine atom, and more preferably a straight chain perfluoroalkyl group having from 1 to 10 carbon atoms.

m1 represents an integer of 1 or more, and is preferably an integer from 1 to 10, and more preferably an integer from 2 to 8.

Although $Rf_1$ to $Rf_4$ may be diffeent form each other among the repeating units in the compound (A), it is preferred that the kind and number of the substituents represented by $Rf_1$ to $Rf_4$ are the same among the repeating units in the compound (A). A position isomer in which the positions of the substituents represented by $Rf_1$ to $Rf_4$ (positions at which the substituents represented by $Rf_1$ to $Rf_4$ are connected to a main chain of the polyether structure having a fluorine atom) are different among the repeating units in the compound (A) may be used.

As the alkyl group having a fluorine atom for any one of $Rf_1$ to $Rf_4$, a straight chain perfluoroalkyl group having from 2 to 8 carbon atoms is preferred, and includes, for example, a perfluoromethyl group, a perfluoroethyl group, a perfluoropropyl group, a perfluorobutyl group, a perfluoropentyl group, a perfluorohexyl group, a perfluorobutyl group and a perfluorooctyl group. A perfluoroethyl group, a perfluoropropyl group, a perfluorobutyl group, a perfluoropentyl group, a perfluorohexyl group, a perfluoroheptyl group or a perfluorooctyl group is preferred.

As any one of $Rf_1$ to $Rf_4$, a straight chain perfluoroalkyl group having from 2 to 8 carbon atoms or a group represented by $-CF_2-O-(CF_2)_{m1}F$ is preferred and a straight chain perfluoroalkyl group having from 2 to 8 carbon atoms is more preferred.

It is preferred that at least one of $Rf_1$ to $Rf_4$ is a straight chain perfluoroalkyl group having from 2 to 8 carbon atoms or a group represented by $-CF_2-O-(CF_2)_{m1}F$, and it is more preferred that at least one of $Rf_1$ to $Rf_4$ is a straight chain perfluoroalkyl group having from 2 to 8 carbon atoms.

n1 represents a number of the repeating unit and is a positive integer. n1 is preferably an integer from 3 to 50, and more preferably an integer from 8 to 20.

$Rf_5$ to $Rf_8$ each independently represents a fluorine atom, an alkyl group having a fluorine atom or a group represented by $-CF_2-O-(CF_2)_{m2}F$.

The alkyl group having a fluorine atom for any one of $Rf_5$ to $Rf_8$ is preferably a straight chain alkyl group having from 1 to 10 carbon atoms and a fluorine atom, and more preferably a straight chain perfluoroalkyl group having from 1 to 10 carbon atoms.

m2 represents an integer of 1 or more, and is preferably an integer from 1 to 10, and more preferably an integer from 2 to 8.

It is preferred that at least one of $Rf_5$ to $Rf_8$ is a straight chain perfluoroalkyl group having from 2 to 8 carbon atoms or a group represented by $—CF_2—O—(CF_2)_{m2}F$, it is more preferred that at least one of $Rf_5$ to $Rf_8$ is a straight chain perfluoroalkyl group having from 2 to 8 carbon atoms, and it is particularly preferred that at least one of $Rf_5$ to $Rf_8$ is a perfluoroethyl group, a perfluoropropyl group, a perfluorobutyl group, a perfluoropentyl group, a perfluorohexyl group, a perfluoroheptyl group or a perfluorooctyl group.

n2 and n3 each independently represents a positive integer. It is preferred that n2 and n3 each represents 1 or 2, and it is more preferred that n2 and n3 each represents 2 from the standpoint of solubility in an organic solvent.

$Rf_9$ and $Rf_{10}$ each independently represents a hydrogen atom, an alkyl group having a fluorine atom or a group represented by $—CF_2—O—(CF_2)_{m3}F$.

The alkyl group having a fluorine atom for any one of $Rf_9$ and $Rf_{10}$ is preferably a straight chain alkyl group having from 1 to 10 carbon atoms and a fluorine atom, and more preferably a straight chain perfluoroalkyl group having from 1 to 10 carbon atoms.

m3 represents an integer of 1 or more, and is preferably an integer from 1 to 10, and more preferably an integer from 2 to 8.

It is preferred that $Rf_9$ and $Rf_{10}$ each independently represents a hydrogen atom or a straight chain perfluoroalkyl group having from 2 to 8 carbon atoms, and it is particularly preferred that $Rf_9$, and $Rf_{10}$ each independently represents a hydrogen atom, a perfluoroethyl group, a perfluoropropyl group, a perfluorobutyl group, a perfluoropentyl group, a perfluorohexyl group, a perfluoroheptyl group or a perfluorooctyl group.

In the first embodiment of the invention, it is particularly preferred that at least one of $Rf_1$ to $Rf_8$ is a straight chain perfluoroalkyl group having from 2 to 8 carbon atoms or a group represented by $—CF_2—O—(CF_2)_mF$ (wherein m represents an integer from 1 to 10) and $Rf_9$ and $Rf_{10}$ each independently represents a hydrogen atom, a straight chain perfluoroalkyl group having from 2 to 8 carbon atoms or a group represented by $—CF_2—O—(CF_2)_{m3}F$, and it is most preferred that at least one of $Rf_1$ to $Rf_8$ is a straight chain perfluoroalkyl group having from 2 to 8 carbon atoms and $Rf_9$ and $Rf_{10}$ each independently represents a hydrogen atom or a straight chain perfluoroalkyl group having from 2 to 8 carbon atoms.

$L_1$ represents a (p1+1) valent aliphatic connecting group, and $L_2$ represents a (p2+1) valent aliphatic connecting group. p1 and p2 each independently represents an integer of 2 or more.

p1 and p2 each independently preferably represents an integer from 2 to 8, and more preferably an integer from 2 to 5.

The (p1+1) valent aliphatic connecting group fo $L_1$ or (p2+1) valent aliphatic connecting group for $L_2$ is preferably a connecting group composed of at least one member selected from the group consisting of an ether bond, a carbonyl group and an amino group and a hydrocarbon chain having a branched structure.

The hydrocarbon chain having a branched structure is preferably a hydrocarbon chain having a branched structure and having from 3 to 10 carbon atoms.

$L_1$ and $L_2$ in formula (I) each more preferably represents a connecting group represented by any of the formulae shown below.

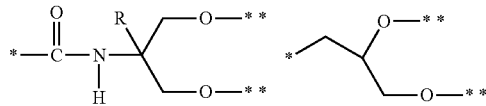

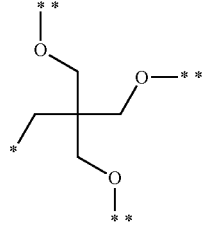

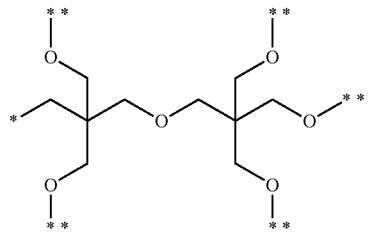

In the formulae above, R represents a hydrogen atom or an alkyl group, * represents a site connecting to an adjacent oxygen atom in formula (I), and ** represents a site connecting to $X_1$ or $X_2$ in formula (I).

The alkyl group for R is preferably an alkli group having from 1 to 8 carbon atoms and includes a methyl group, an ethyl group and a propyl group.

$X_1$ and $X_2$ each independently represent a group having a polymerizable group. The polymerizable group in $X_1$ or $X_2$ is preferably a (meth)acryloyl group, a vinyl, group, an aryl group, a cinnamoyl group, an epoxy group, an oxetanyl group, a hydroxy group, a polyoxyalkylene group, a carhoxyl group or an amino group, and more preferably a (meth)acryloyl group.

The aryl group includes, for example, a phenyl group.

The polyoxyalkylene group includes, for example, a polyoxyethylene group.

The weight average molecular weight of the compound (A) represented by formula (I) is preferably from 500 to less than 10,000, more preferably from 800 to less than 5,000, most preferably from 1,000 to less than 3,000, as a value calculated in terms of polystyrene determined by a GPC (gel permeation chromatography) method. The weight average molecular weight of less than 10,000 is preferred from the standpoint of good solubility in the organic solvent (C). The weight average molecular weight of 500 or more is preferred from the standpoint of sufficiently exhibiting the antifouling property.

Specific examples of the compound (A) represented by formula (I) are set forth below, hut the invention should not be construed as being limited thereto.

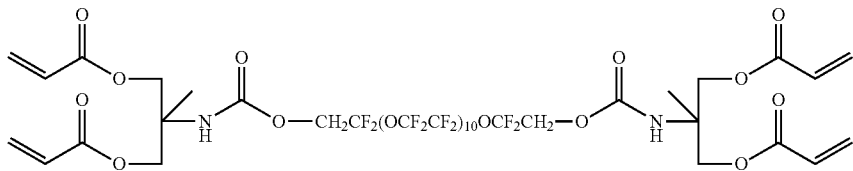
A-1
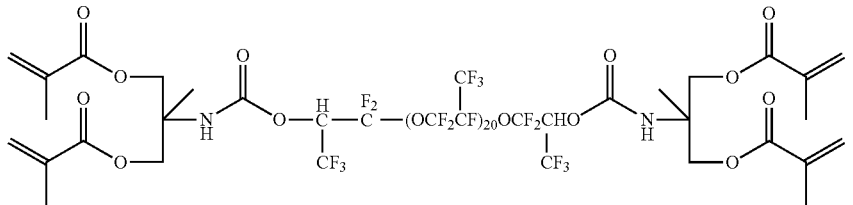
A-2
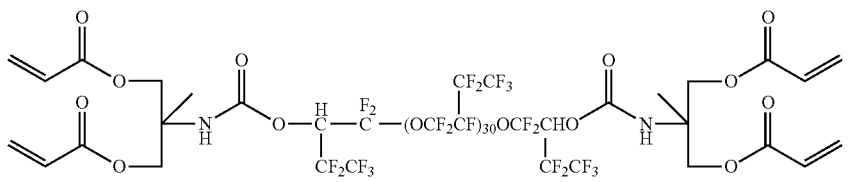
A-3
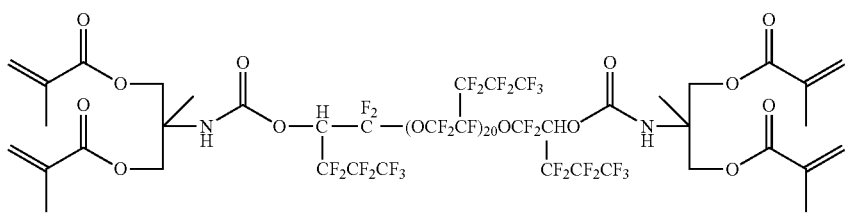
A-4
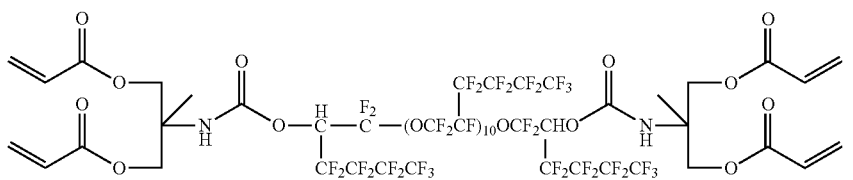
A-5
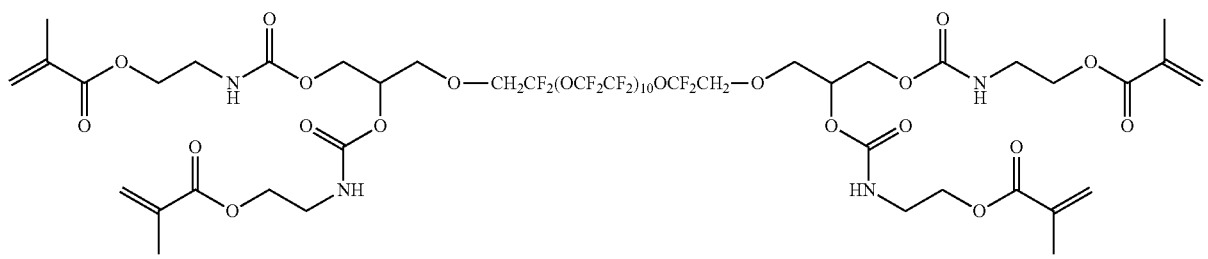
A-6
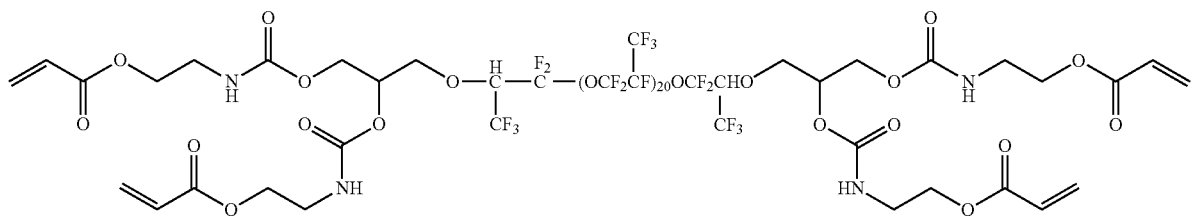
A-7

A-8
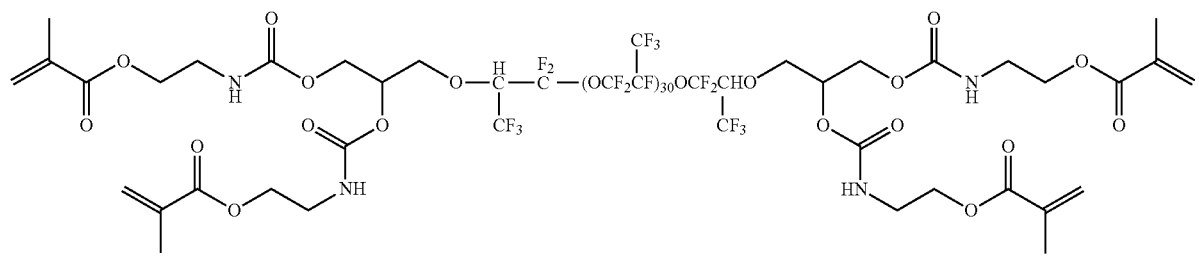
A-9
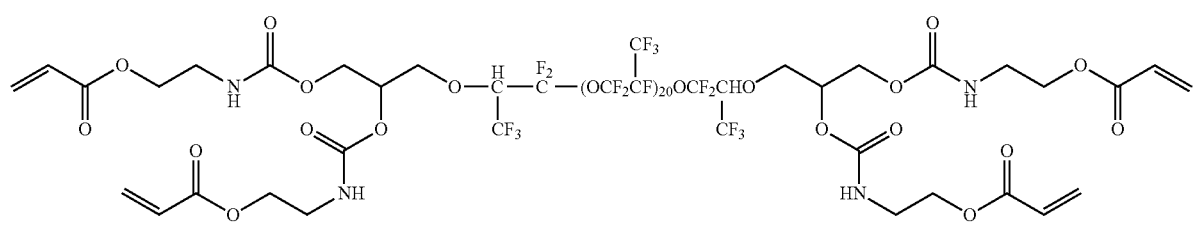
A-10
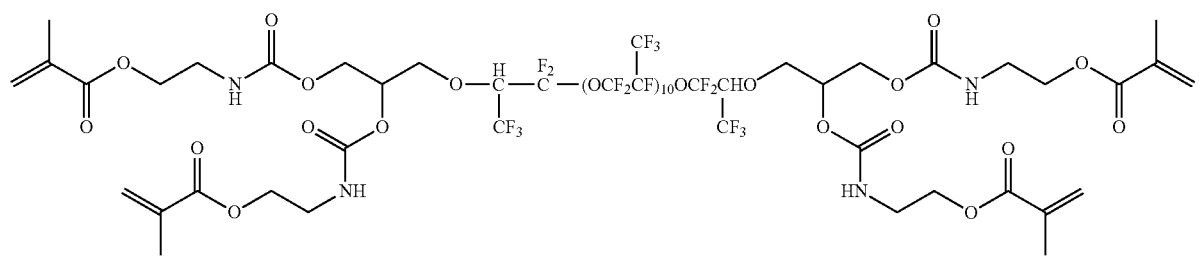
A-11
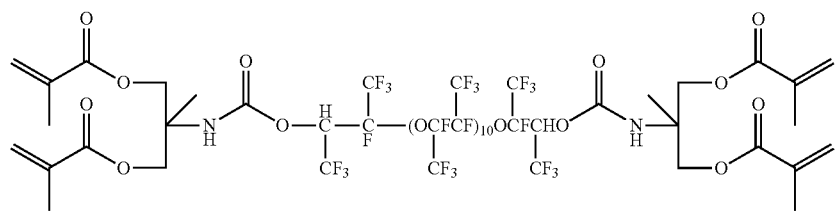
A-12
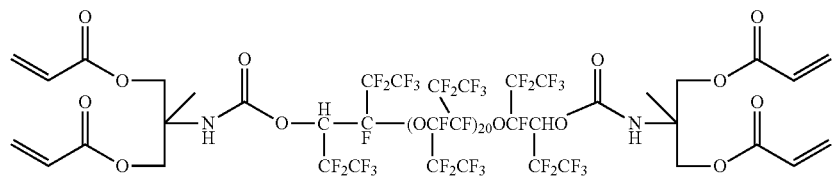
A-13
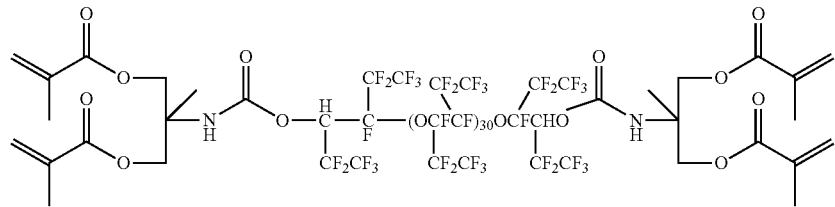

-continued
A-14
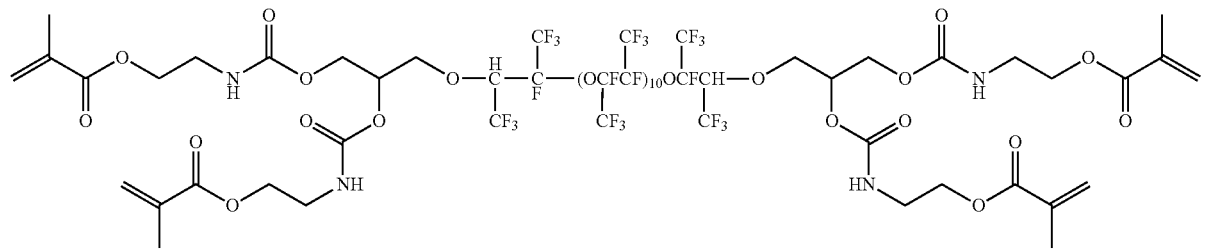
A-15
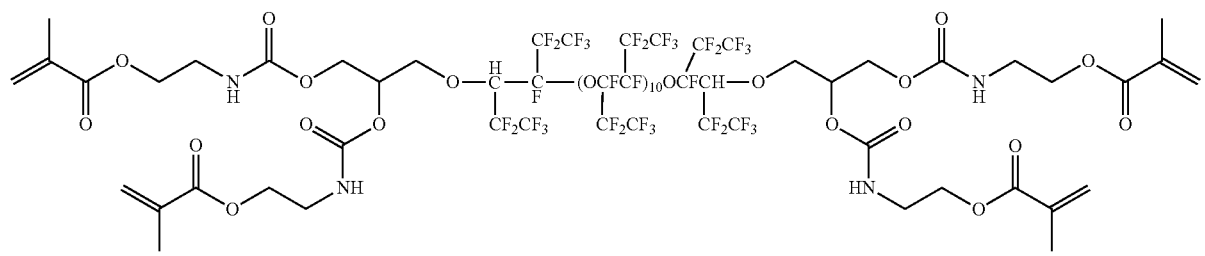
A-16
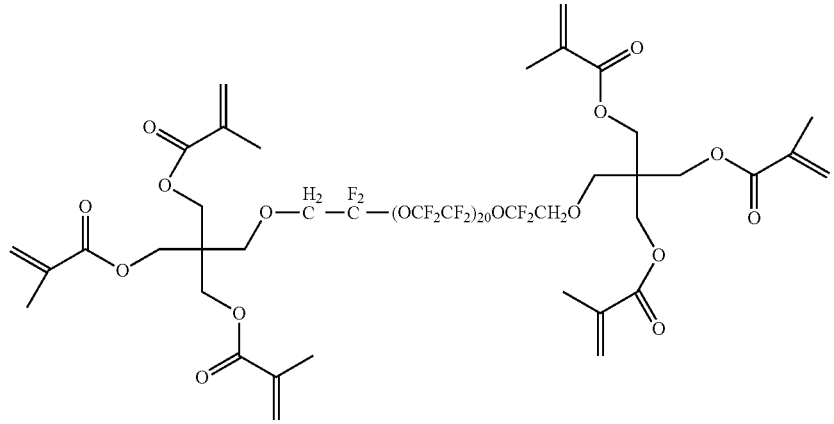
A-17
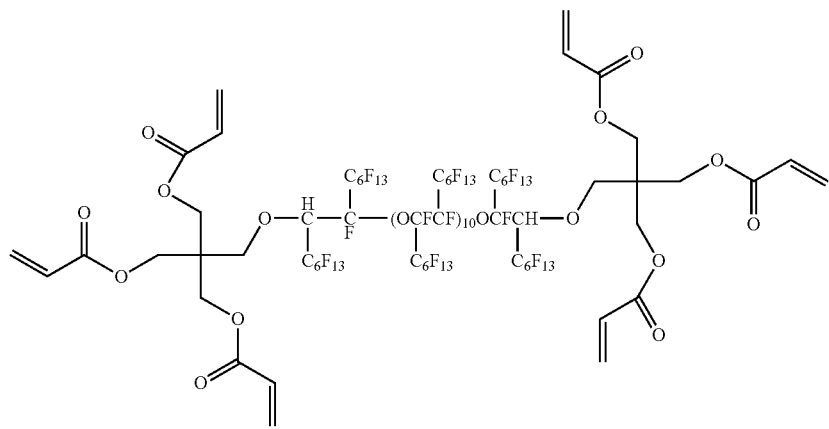

A-18
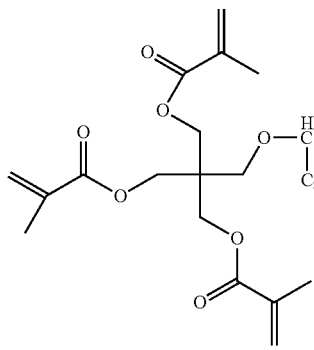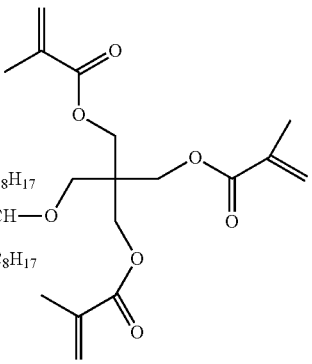
A-19
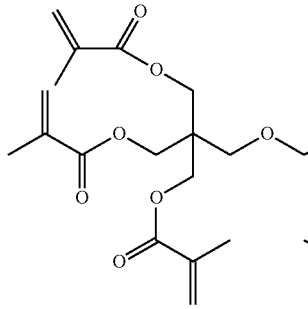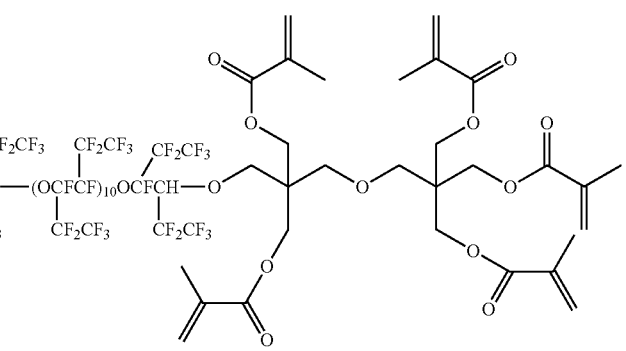
A-20
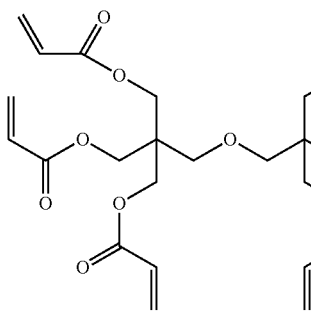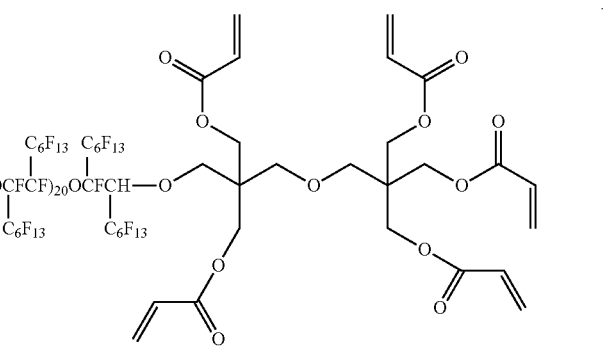
A-21
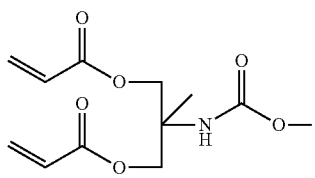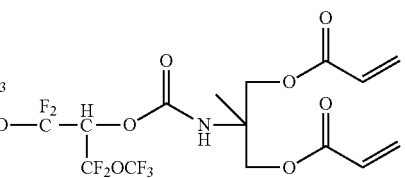
A-22
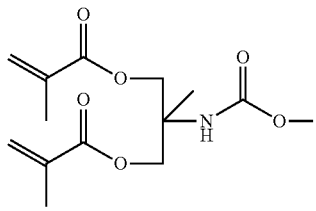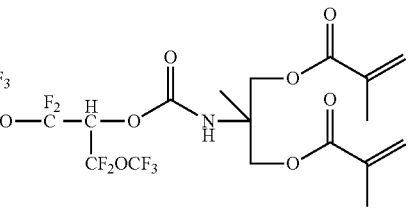

-continued
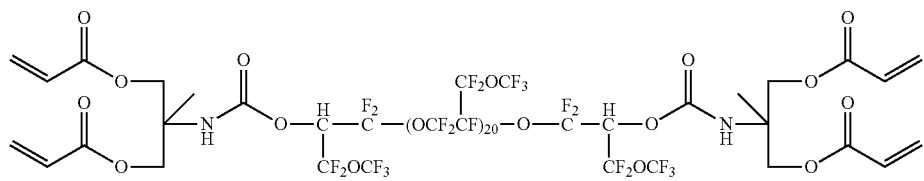
A-23
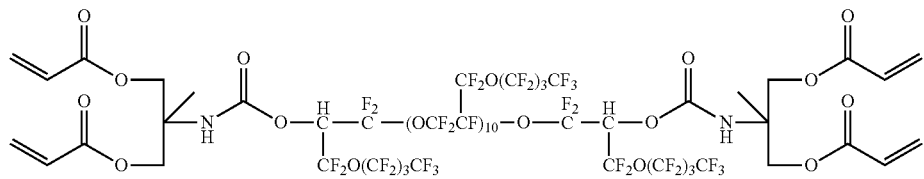
A-24
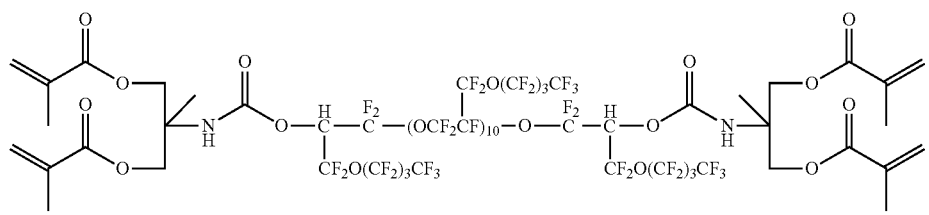
A-25
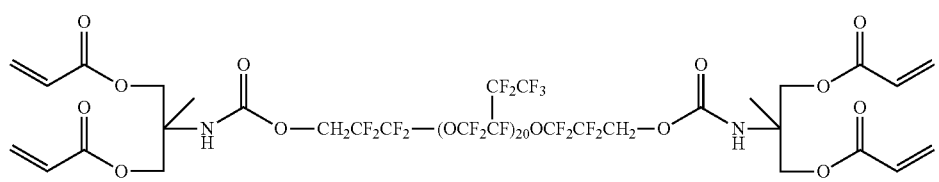
A-26
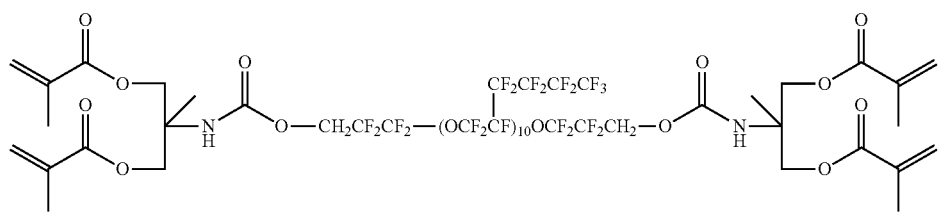
A-27
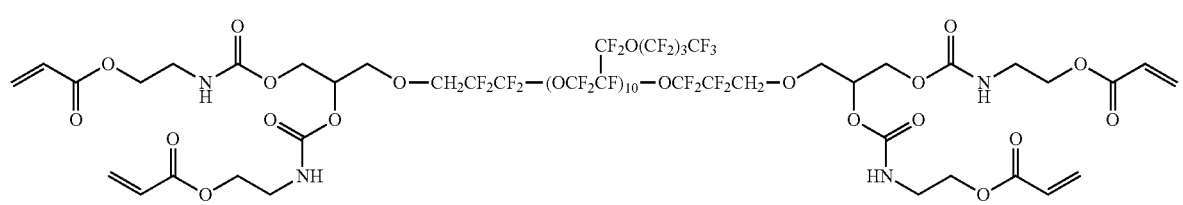
A-28
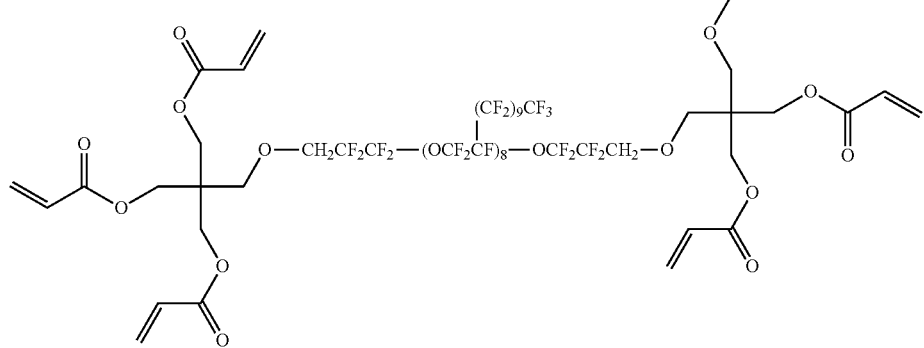
A-29

-continued

A-30

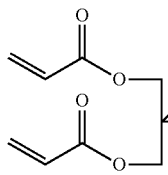 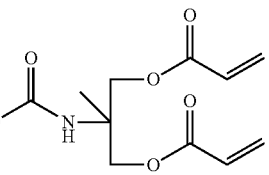

The content of the compound (A) represented by formula (I) in the polymerizable composition according to the first embodiment of the invention is preferably from 0.1 to 30% by weight, more preferably from 1 to 20% by weight, still more preferably from 5 to 10% by weight, based on the total solid content of the polymerizable composition.

Now, a method for production of the compound (A) represented by formula (I) is described below.

The first embodiment of the invention also includes the method for production of the compound (A) represented by formula (I).

The method for production of the compound (A) containing a repeating unit having a polyether structure having a fluorine atom and four or more polymerizable groups and being represented by formula (I) according to the first embodiment of the invention is not particularly restricted so far as the compound (A) represented by formula (I) can be produced. For example, the repeating unit having a polyether structure having a fluorine atom in the compound (A) represented by formula (I) can be produced by subjecting a corresponding compound having a repeating unit having a polyether structure to a perfluorination reaction.

For the perfluorination reaction, a known method can be used. For example, a liquid phase fluorination method, an aerosol fluorination method, an electrolytic fluorination method or a fluorination method with cobalt fluoride is exemplified. From the advantage of high yield of the product, the liquid phase fluorination method is preferred.

A method for production of the compound (A) comprising a step of obtaining the repeating unit having a polyether structure having a fluorine atom by treating a compound represented by formula (II) shown below with a liquid phase fluorination method is preferred.

Formula (II)

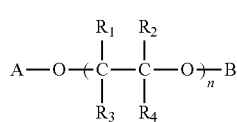

In formula (II), A and B each independently represents a protective group of hydroxy group.

The protective group of hydroxy group for A or B is not particularly restricted so far as it is a group capable of protecting a hydroxy group and includes, for example, an acyl group, an arylcarbonyl group and an alkyl group.

The acyl group, arylcarbonyl group or alkyl group for the protective group of hydroxy group for A or B may have a substituent, and the substituent includes, for example, a fluorine atom, $R_1$ to $R_4$ each independently represents a hydrogen atom, an alkyl group or a group represented by —$CH_2$—O—$(CH_2)_{m1}H$. m1 represents an integer of 1 or more.

Although $R_1$ to $R_4$ may be different form each other among the repeating units in the compound represented by formula (II), it is preferred that the kind and number of the substituents represented by $R_1$ to $R_4$ are the same among the repeating units in the compound represented by formula (II). A position isomer in which the positions of the substituents represented by $R_1$ to $R_4$ (positions at which the substituents represented by $R_1$ to $R_4$ are connected to a main chain of the repeating structure) are different among the repeating units in the compound represented by formula (II) may be used.

The alkyl group for any one of $R_1$ to $R_4$ is preferably a straight chain alkyl group having from 1 to 10 carbon atoms, more preferably a straight chain alkyl group having from 2 to 8 carbon atoms, and includes, for example, a methyl group, an ethyl group, a propyl group and a butyl group.

m1 is preferably an integer from 1 to 10, and more preferably an integer from 2 to 8.

It is preferred that at least one of $R_1$ to $R_4$ is a straight chain alkyl group having from 2 to 8 carbon atoms or a group represented by —$CH_2$—O—$(CH_2)_{m1}H$, and it is more preferred that at least one of $R_1$ to $R_4$ is a straight chain alkyl group having from 2 to 8 carbon atoms.

n represents a positive integer and is preferably an integer from 3 to 52, more preferably an integer from 5 to 52, and still more preferably an integer from 10 to 20.

Specific examples of the compound represented by formula (II) are set forth below, but the invention should not be construed as being limited thereto.

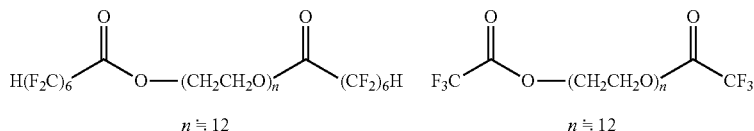

$n ≒ 12$                    $n ≒ 12$

-continued

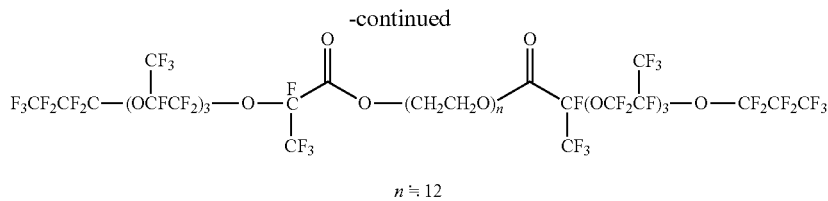

$n ≒ 12$

The polymerizable composition according to a second embodiment of the invention is a polymerizable composition comprising a component (A), a component (B) and a component (C):
(A) a compound containing a repeating unit having a polyether structure having a fluorine atom and four or more polymerizable groups and being represented by any of formulae (I-1) to (I-5) shown below,
(B) a photopolymerization initiator, and
(C) an organic solvent.

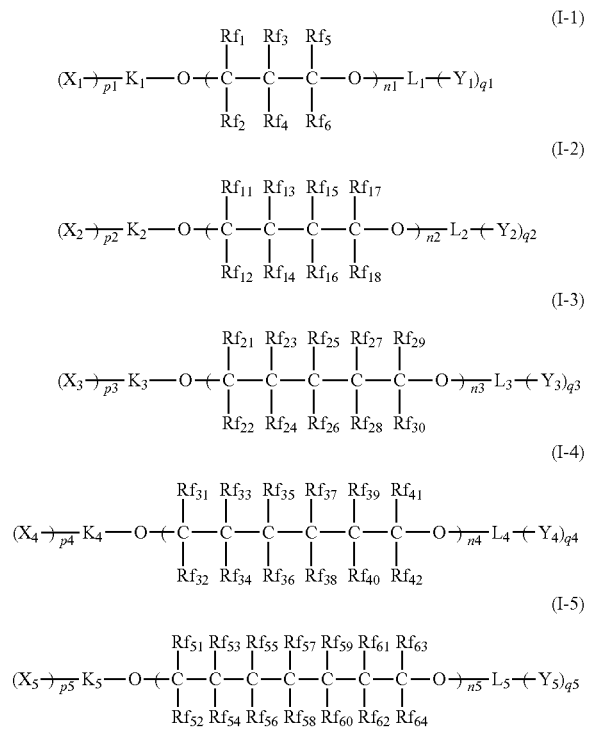

In formulae (I-1) to (I-5), $Rf_1$ to $Rf_6$, $Rf_{11}$ to $Rf_{18}$, $Rf_{21}$ to $Rf_{30}$, $Rf_{31}$ to $Rf_{42}$ and $Rf_{51}$ to $Rf_{64}$ each independently represents a fluorine atom, an alkyl group having a fluorine atom or a group represented by —$CF_2$—O—$(CF_2)_{m1}$F. m1 represents an integer of 1 or more. n1 to n5 each independently represents a number of the repeating unit and is a positive integer. $X_1$ to $X_5$ and $Y_1$ to $Y_5$ each independently represents a group having a polymerizable group. $K_1$ represents a (p1+1) valent connecting group, and $L_1$ represents a (q1+1) valent connecting group. p1 and q1 each independently represents an integer of 2 or more. $K_2$ represents a (p2+1) valent connecting group, and $L_2$ represents a (q2+1) valent connecting group. p2 and q2 each independently represents an integer of 2 or more. $K_3$ represents a (p3+1) valent connecting group, and $L_3$ represents a (q3+1) valent connecting group. p3 and q3 each independently represents an integer of 2 or more. $K_4$ represents a (p4+1) valent connecting group, and $L_4$ represents a (q4+1) valent connecting group. p4 and q4 each independently represents an integer of 2 or more. $K_5$ represents a (p5+1) valent connecting group, and $L_5$ represents a (q5+1) valent connecting group. p5 and q5 each independently represents an integer of 2 or more.

First, the compound (A) (hereinafter, also simply referred to as "compound (A) represented by any of formulae (I-1) to (I-5)") containing a repeating unit having a polyether structure having a fluorine atom and four or more polymerizable groups and being represented by any of formulae (I-1) to (I-5) shown above will be described.

In the second embodiment of the invention, the compound (A) represented by any of formulae (I-1) to (I-5) is able to function as an antifouling agent.

The polyether structure having a fluorine atom is preferably a perfluoropolyether structure from the standpoint of the antifouling property.

In formulae (I-1) to (I-5), $Rf_1$ to $Rf_6$, $Rf_{11}$ to $Rf_{18}$, $Rf_{21}$ to $Rf_{30}$, $Rf_{31}$ to $Rf_{42}$ and $Rf_{51}$ to $Rf_{64}$ each independently represents a fluorine atom, an alkyl group having a fluorine atom or a group represented by —$CF_2$—O—$(CF_2)_{m1}$F.

The alkyl group having a fluorine atom for any one of $Rf_1$ to $Rf_6$, $Rf_{11}$ to $Rf_{18}$, $Rf_{21}$ to $Rf_{30}$, $Rf_{31}$ to $Rf_{42}$ and $Rf_{51}$ to $Rf_{64}$ is preferably a straight chain alkyl group having from 1 to 10 carbon atoms and a fluorine atom, and more preferably a straight chain perfluoroalkyl group having from 1 to 10 carbon atoms.

m1 represents an integer of 1 or more, and is preferably an integer from 1 to 10, and more preferably an integer from 2 to 8.

As any one of $Rf_1$ to $Rf_6$, $Rf_{11}$ to $Rf_{18}$, $Rf_{21}$ to $Rf_{30}$, $Rf_{31}$ to $Rf_{42}$ and $Rf_{51}$ to $Rf_{64}$, a straight chain perfluoroalkyl group having from 2 to 8 carbon atoms or a group represented by —$CF_2$—O—$(CF_2)_{m1}$F is preferred and a straight chain perfluoroalkyl group having from 2 to 8 carbon atoms is more preferred.

Among the repeating units in the compound represented by formula (I-1), although $Rf_1$ to $Rf_6$ may be different form each other it is preferred that the kind and number of the substituents represented by $Rf_1$ to $Rf_6$ are the same. A position isomer in which the positions of the substituents represented by $Rf_1$ to $Rf_6$ (positions at which the substituents represented by $Rf_1$ to $Rf_6$ are connected to a main chain of the polyether structure having a fluorine atom) are different among the repeating units in the compound represented by formula (I-1) may be used.

Similarly, among the repeating units in th compound represented by formula (I-2), although $Rf_{11}$ to $Rf_{18}$ may be different form each other, it is preferred that the kind and number of the substituents represented by $Rf_{11}$ to $Rf_{18}$ are the same. A position isomer in which the positions of the substituents represented by $Rf_{11}$ to $Rf_{18}$ are different among the repeating units in the compound represented by formula (I-2) may be used.

Similarly, among the repeating units in the compound represented by formula (I-3), although $Rf_{21}$ to $Rf_{30}$ may be different form each other, it is preferred that the kind and number of the substituents represented by $Rf_{21}$ to $Rf_{30}$ are the same. A position isomer in which the positions of the substituents represented by $Rf_{21}$ to $Rf_{30}$ are different among the repeating units in the compound represented by formula (I-3) may be used.

Similarly, among the repeating units in the compound represented by formula (I-4), although $Rf_{31}$ to $Rf_{42}$ may be different form each other, it is preferred that the kind and number of the substituents represented by $Rf_{31}$ to $Rf_{42}$ are the same. A position isomer in which the positions of the substituents represented by $Rf_{31}$ to $Rf_{42}$ are different among the repeating units in the compound represented by formula (I-4) may be used.

Similarly, among the repeating units in the compound represented by formula (I-5), although $Rf_{51}$ to $Rf_{64}$ may be different form each other, it is preferred that the kind and number of the substituents represented by $Rf_{51}$ to $Rf_{64}$ are the same. A position isomer in which the positions of the substituents represented by $Rf_{51}$ to $Rf_{64}$ are different among the repeating units in the compound represented by formula (I-5) may be used.

As the alkyl group having a fluorine atom for any one of $Rf_1$ to $Rf_6$, $Rf_{11}$ to $Rf_{18}$, $Rf_{21}$ to $Rf_{30}$, $Rf_{31}$ to $Rf_{42}$ and $Rf_{51}$ to $Rf_{64}$, a straight chain perfluoroalkyl group having from 2 to 8 carbon atoms is preferred, and includes, for example, a perfluoromethyl group, a perfluoroethyl group, a perfluoropropyl group, a perfluorobutyl group, a perfluoropentyl group, a perfluorohexyl group, a perfluoroheptyl group and a perfluorooctyl group. A perfluoroethyl group, a perfluoropropyl group, a perfluorobutyl group, a perfluoropentyl group, a perfluorohexyl group, a perfluoroheptyl group or a perfluorooctyl group is preferred.

It is preferred that at least one of $Rf_1$ to $Rf_6$ is a straight chain perfluoroalkyl group having from 2 to 8 carbon atoms or a group represented by $-CF_2-O-(CF_2)_{m1}F$, and it is more preferred that at least one of $Rf_1$ to $Rf_6$ is a straight chain perfluoroalkyl group having from 2 to 8 carbon atoms.

Similarly, it is preferred that at least one of $Rf_{11}$ to $Rf_{18}$ is a straight chain perfluoroalkyl group having from 2 to 8 carbon atoms or a group represented by $-CF_2-O-(CF_2)_{m1}F$, and it is more preferred that at least one of $Rf_{11}$ to $Rf_{18}$ is a straight chain perfluoroalkyl group having from 2 to 8 carbon atoms.

Similarly, it is preferred that at least one of $Rf_{21}$ to $Rf_{30}$ is a straight chain perfluoroalkyl group having from 2 to 8 carbon atoms or a group represented by $-CF_2-O-(CF_2)_{m1}F$, and if is more preferred that at least one of $Rf_{21}$ to $Rf_{30}$ is a straight chain perfluoroalkyl group having from 2 to 8 carbon atoms.

Similarly, it is preferred that at least one of $Rf_{31}$ to $Rf_{42}$ is a straight chain perfluoroalkyl group having from 2 to 8 carbon atoms or a group represented by $-CF_2-O-(CF_2)_{m1}F$, and it is more preferred that at least one of $Rf_{21}$ to $Rf_{42}$ is a straight chain perfluoroalkyl group having from 2 to 8 carbon atoms.

Similarly, it is preferred that at least one of $Rf_{51}$ to $Rf_{64}$ is a straight chain perfluoroalkyl group having from 2 to 8 carbon atoms or a group represented by $-CF_2-O-(CF_2)_{m1}F$, and it is more preferred that at least one of $Rf_{51}$ to $Rf_{64}$ is a straight chain perfluoroalkyl group having from 2 to 8 carbon atoms.

n1 to n5 each independently represents a number of the repeating unit and is a positive integer. Any of n1 to n5 is preferably an integer from 5 to 50, and more preferably an integer from 10 to 20.

$K_1$ represents a (p1+1) valent connecting group, and $L_1$ represents a (q1+1) valent connecting group.

$K_2$ represents a (p2+1) valent connecting group, and $L_2$ represents a (q2+1) valent connecting group.

$K_3$ represents a (p3+1) valent connecting group, and $L_3$ represents a (q3+1) valent connecting group.

$K_4$ represents a (p4+1) valent connecting group, and $L_4$ represents a (q4+1) valent connecting group.

$K_5$ represents a (p5+1) valent connecting group, and $L_5$ represents a (q5+1) valent connecting group.

p1 to p5 and q1 to q5 each independently represents preferably an integer from 2 to 8, and more preferably an integer from 2 to 5.

The connecting group for any one of $K_1$ to $K_5$ and $L_1$ to $L_5$ is preferably a connecting group composed of at least one member selected from the group consisting of an ether bond, a carbonyl group and an amino group, an alkylene group which may have a substituent and a hydrocarbon chain having a branched structure.

Examples of the substituent which the alkylene group may have include a fluorine atom, an alky group having a fluorine atom (preferably a straight chain perfluoroalkyl group having from 1 to 10 carbon atoms) and a group represented by $-CF_2-O-(CF_2)_{m2}F$ (wherein m2 represents an integer of 1 or more, and is preferably an integer from 1 to 10).

The hydrocarbon chain having a branched structure is preferably a hydrocarbon chain having a branched structure and having from 3 to 10 carbon atoms.

$K_1$ to and $K_5$ to $L_1$ to $L_5$ in formulae (I-1) to (I-5) each more preferably represents a connecting group represented by any of formulae shown below.

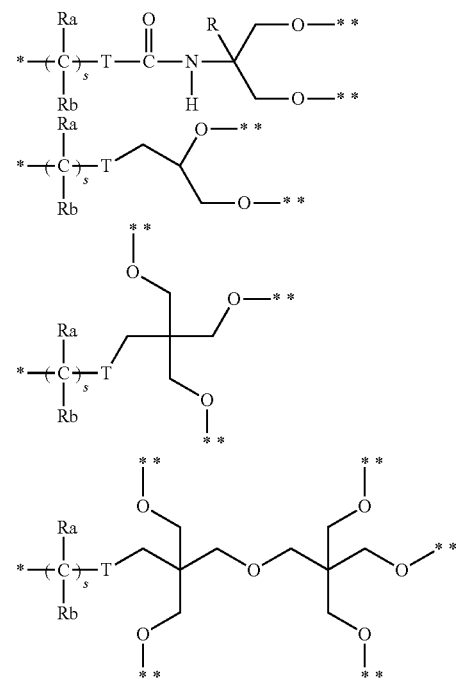

In the formulae above, R represents a hydrogen atom or an alkyl group, Ra and Rb each independently represents a hydrogen atom, a fluorine atom, an alkyl group having a fluorine atom or a group represented by —CF$_2$—O—(CF$_2$)$_{m2}$F. m2 represents an integer of 1 or more, and is preferably an integer from 1 to 10.

s represents an integer of 0 or more. T represents a single bond when s is 0 or an oxygen atom when s is an integer of 1 or more.

s is preferably an integer from 0 to 10, and more preferably an integer from 2 to 8.

* represents a site connecting to an adjacent oxygen atom in any of formulae (I-1) to (I-5), and ** represents a site connecting to any of X$_1$ to X$_5$ and Y$_1$ to Y$_5$ in formulae (I-1) to (I-5).

X$_1$ to X$_5$ and Y$_1$ to Y$_5$ each independently represents a group having a polymerizable group. The polymerizable group in any one of X$_1$ to X$_5$ and Y$_1$ to Y$_5$ is preferably a (meth)acryloyl group, a vinyl group, an aryl group, a cinnamoyl group, an epoxy group, an oxetanyl group, a hydroxy group, a polyoxyalkylene group, a carboxyl group or an amino group, and more preferably a (meth)acryloyl group.

In the second embodiment of the invention, it is preferred that the compound (A) is a compound represented by any of formulae (I-3) to (I-5) wherein among the repeating units in the compound represented by formula (I-3), the kind and number of the substituents represented by Rf$_{21}$ to Rf$_{30}$ are the same, among the repeating units in the compound represented by formula (I-4), the kind and number of the substituents represented by Rf$_{31}$ to Rf$_{42}$ are the same, or among the repeating units in the compound represented by formula (I-5), the kind and number of the substituents represented by Rf$_{51}$ to Rf$_{64}$ are the same.

The weight average molecular weight of the compound (A) represented by any of formulae (I-1) to (I-5) is preferably from 500 to less than 10,000, more preferably from 800 to less than 5,000, most preferably from 1,000 to less than 3,000, as a value calculated in terms of polystyrene determined by a GPC (gel permeation chromatography) method. The weight average molecular weight of less than 10,000 is preferred from the standpoint of good solubility in the organic solvent (C). The weight average molecular weight of 500 or more is preferred from the standpoint of sufficiently exhibiting the antifouling property.

Specific examples of the compound (A) represented by any of formulae (I-1) to (I-5) are set forth below, but the invention should not be construed as being limited thereto.

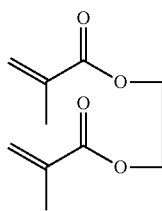 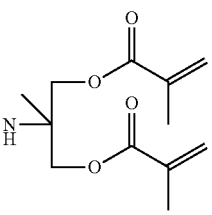

A-31

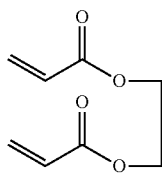 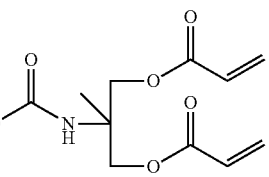

A-32

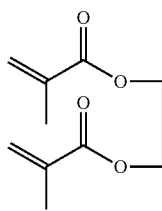 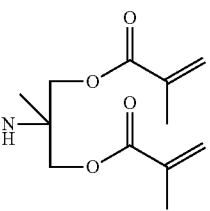

A-33

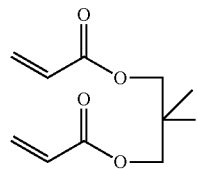 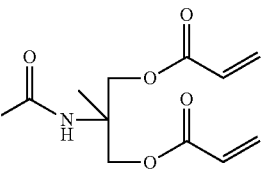

A-34

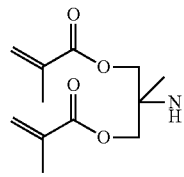 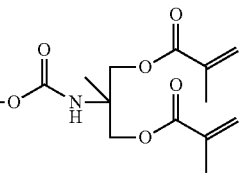

A-35

-continued
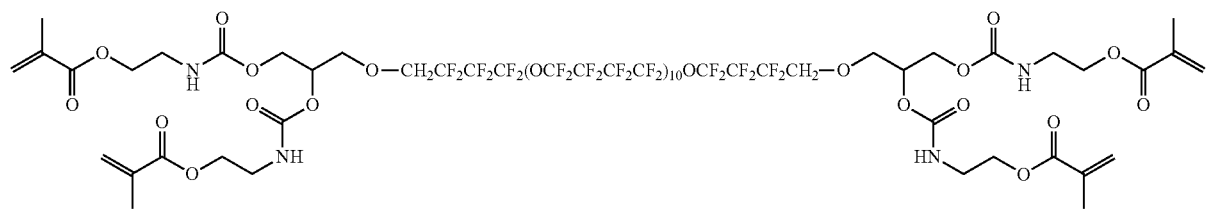
A-36
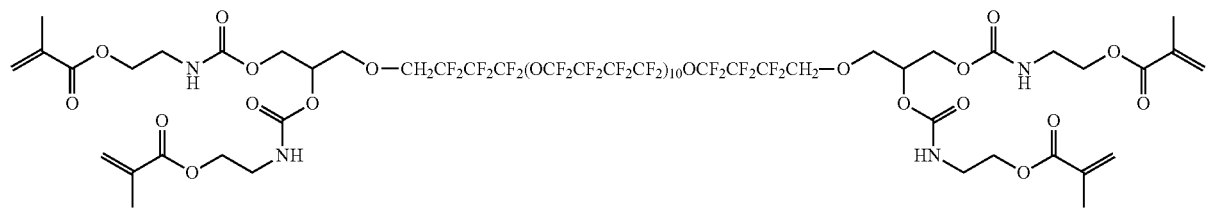
A-37
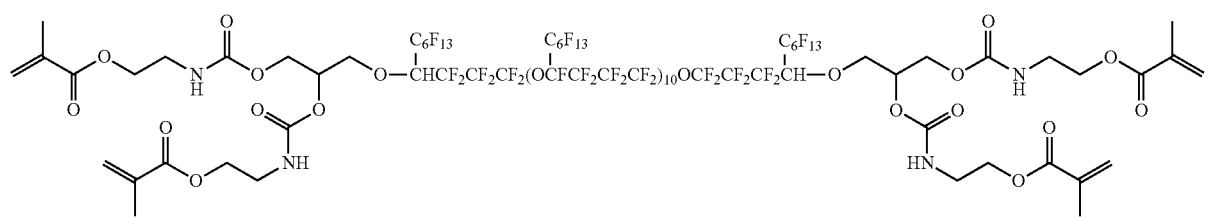
A-38
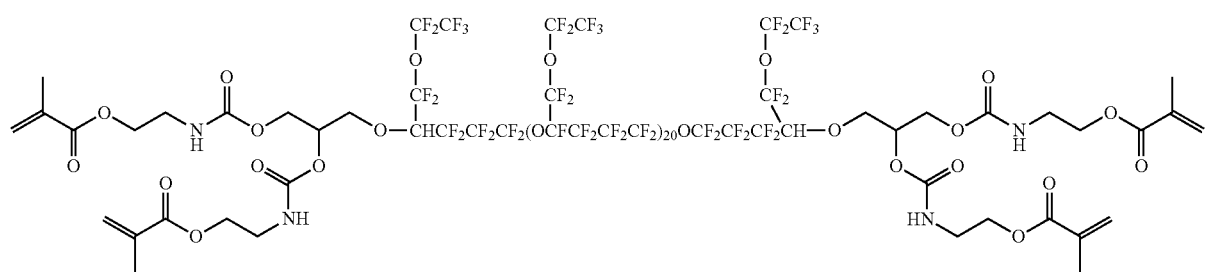
A-39
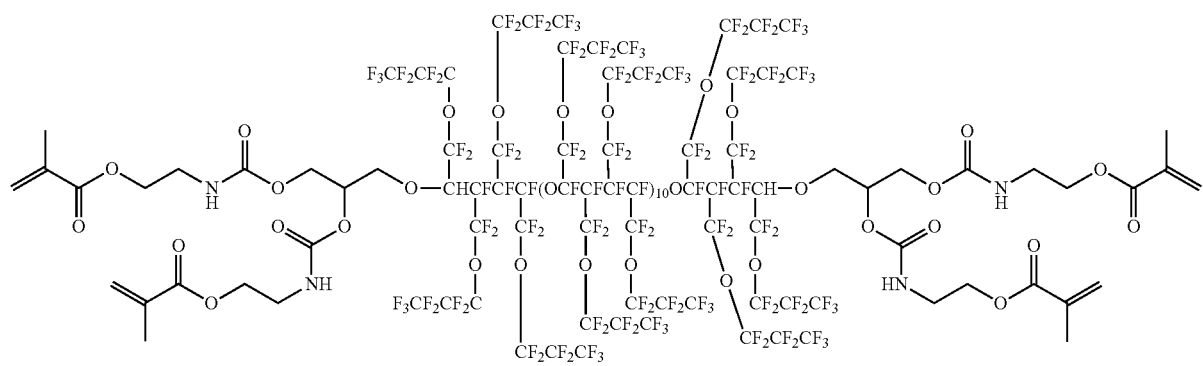
A-40
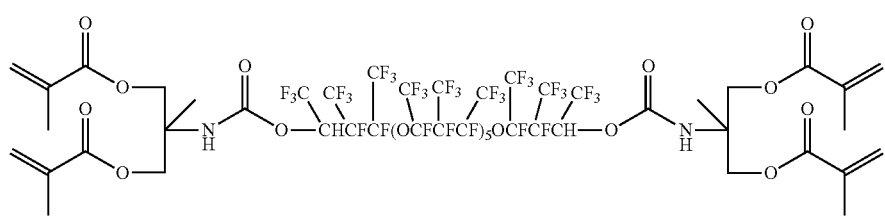
A-41

-continued
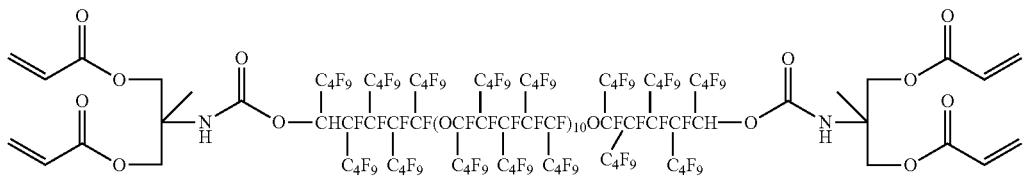
A-42
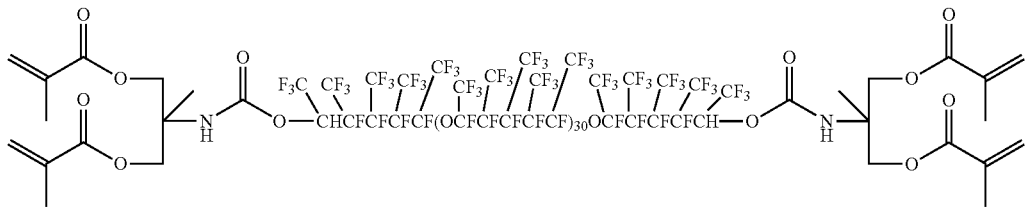
A-43
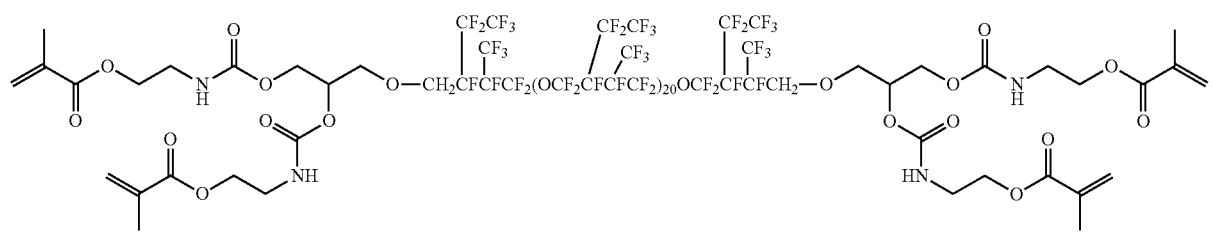
A-44
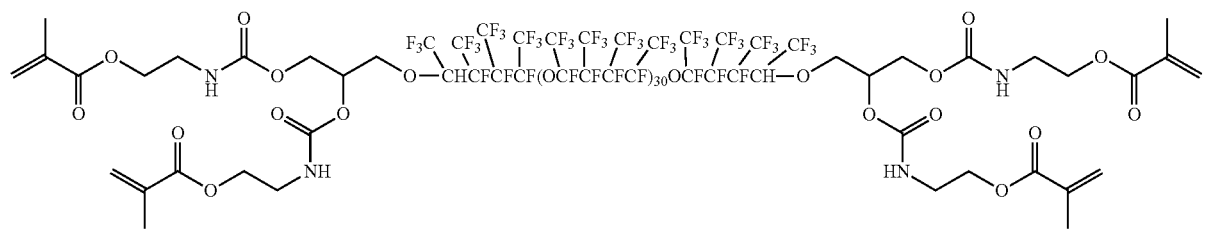
A-45
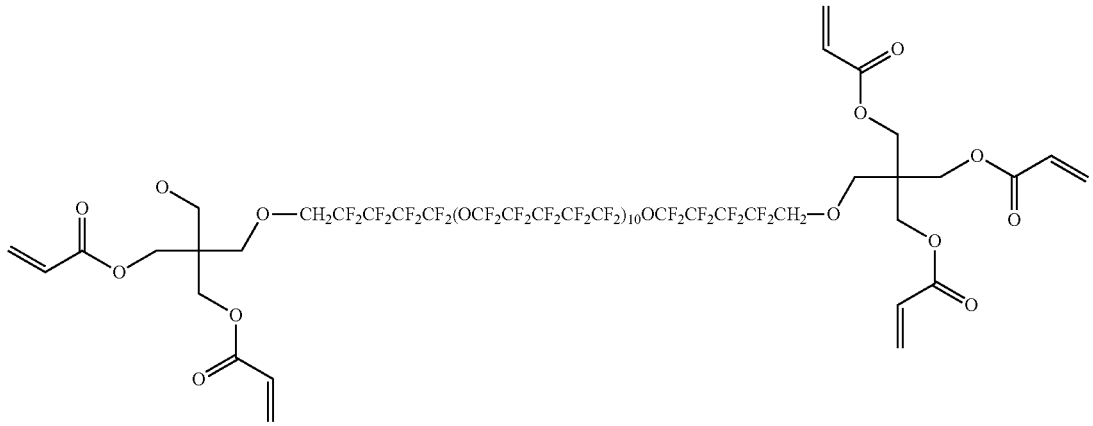
A-46

-continued
A-47
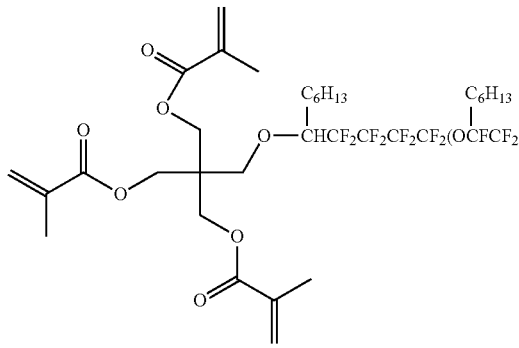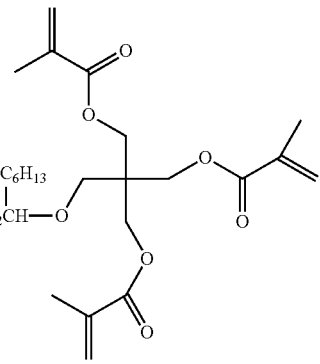
A-48
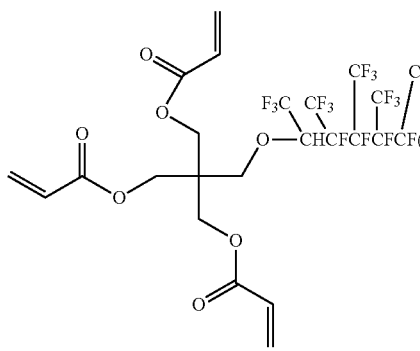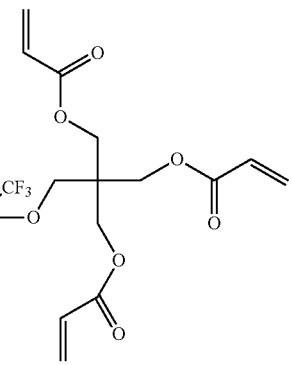
A-49
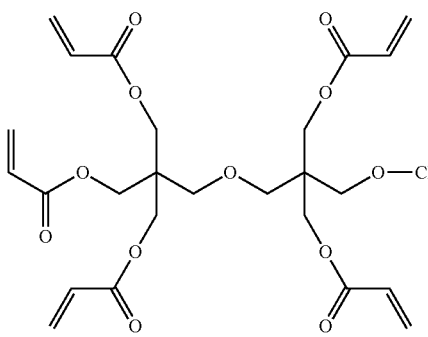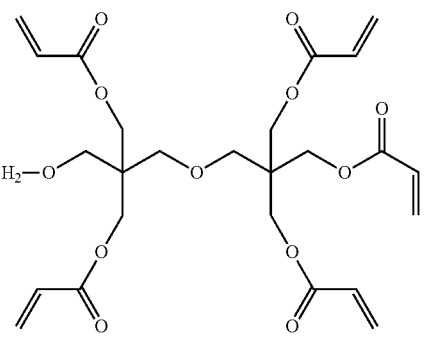
A-50
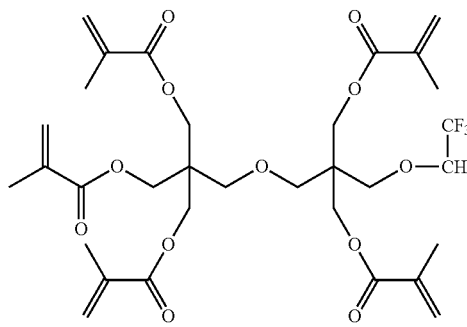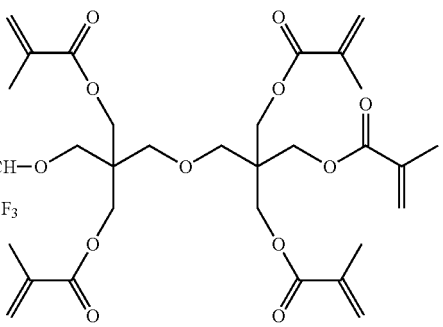

-continued
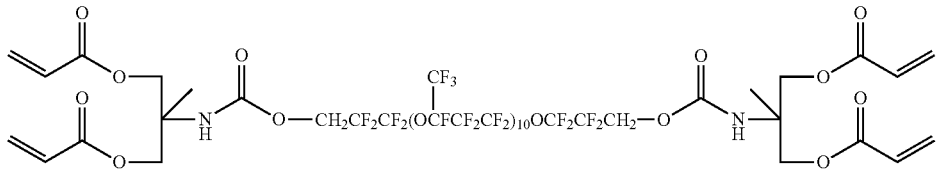
A-51
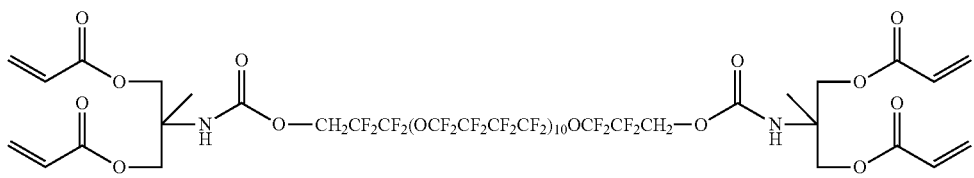
A-52
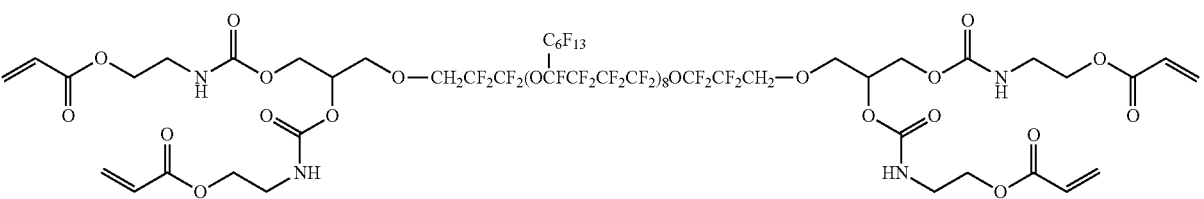
A-53
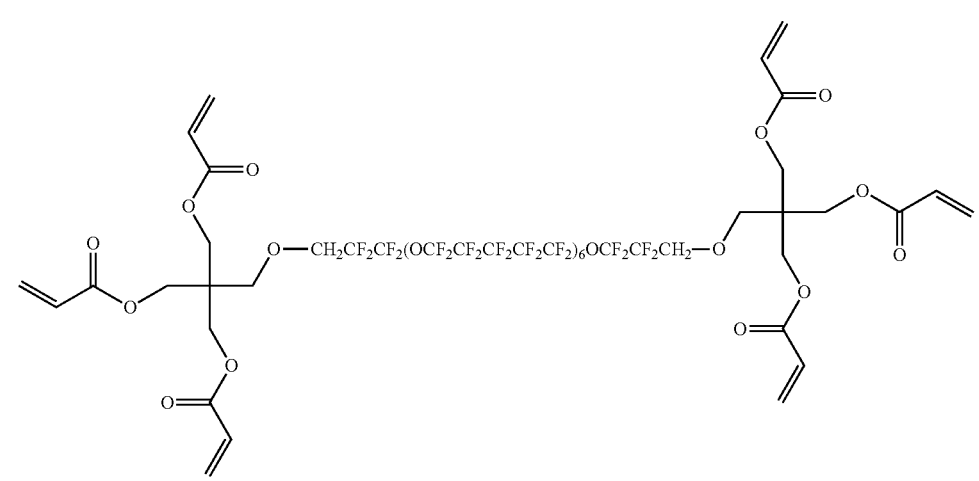
A-54
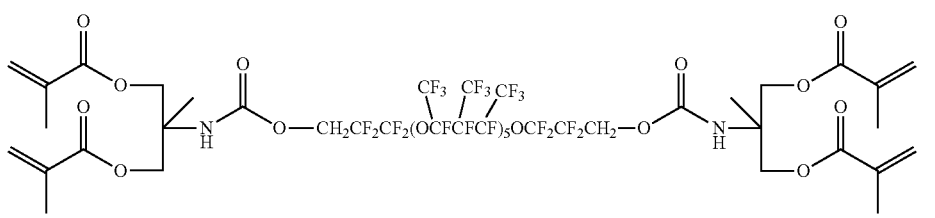
A-55
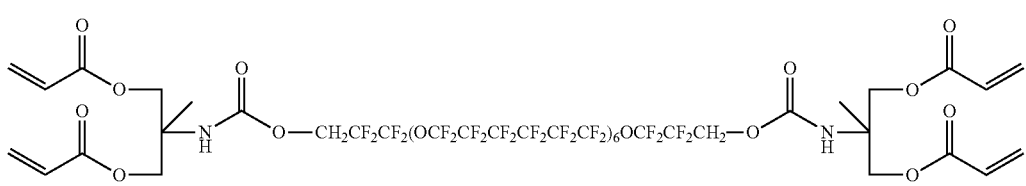
A-56

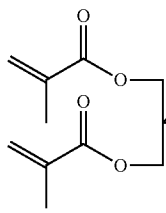
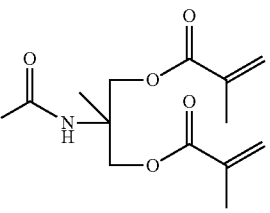

A-57

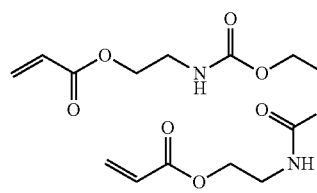
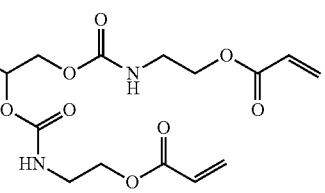

A-58

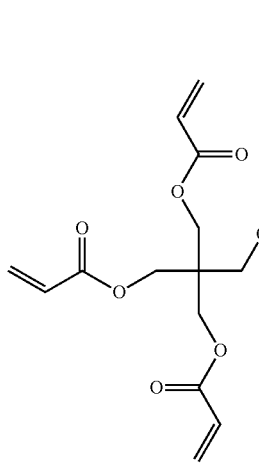
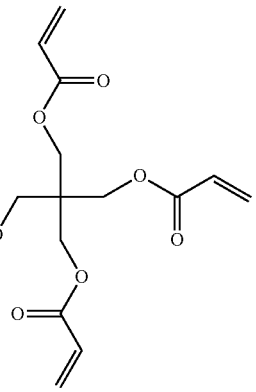

A-59

The content of the compound (A) represented by any of formulae (I-1) to (I-5) in the polymerizable composition according to the second embodiment of the invention is preferably from 0.1 to 30% by weight, more preferably from 1 to 20% by weight, still more preferably from 5 to 10% by weight, based on the total solid content of the composition.

Now, a method for production of the compound (A) represented by any of formulae (I-1) to (I-5) is described below.

The second embodiment of the invention also includes the method for production of the compound (A) represented by any of formulae (I-1) to (I-5).

The method for production of the compound (A) containing a repeating unit having a polyether structure having a fluorine atom and four or more polymerizable groups and being represented by any of formulae (I-1) to (I-5) is not particularly restricted so far as the compound (A) represented by any of formulae (I-1) to (I-5) can be produced. For example, the repeating unit having a polyether structure having a fluorine atom in the compound (A) represented by any of formulae (I-1) to (I-5) can be produced by subjecting a corresponding compound having a repeating unit having a polyether structure to a perfluorination reaction.

For the perfluorination reaction, a known method can be used. For example, a liquid phase fluorination method, an aerosol fluorination method, an electrolytic fluorination method or a fluorination method with cobalt fluoride is exemplified. From the advantage of high yield of the product, the liquid phase fluorination method is preferred.

A method for production of a compound containing a repeating unit having a polyether structure having a fluorine atom and four or more polymerizable groups and being represented by any of formulae (I-1) to (I-5) shown above, which comprises a step of obtaining the repeating unit having a polyether structure having a fluorine atom by treating a compound represented by any of formulae (II-1) to (II-5) shown below with a liquid phase fluorination method is preferred.

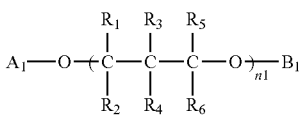

(II-1)

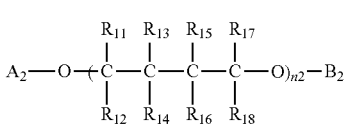

(II-2)

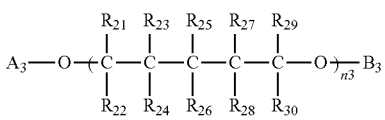

(II-3)

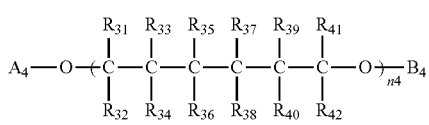

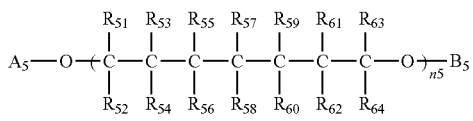

In formulae (II-1) to (II-5), $A_1$ to $A_5$ and $B_1$ to $B_5$ each independently represents a protective group of hydroxy group.

The protective group of hydroxy group for any of $A_1$ to $A_5$ and $B_1$ to $B_5$ is not particularly restricted so far as it is a group capable of protecting a hydroxy group and includes, for example, an acyl group, an arylcarbonyl group and an alkyl group.

The acyl group, arlycarbonyl group or alkyl group for the protective group of hydroxy group for any of $A_1$ to $A_5$ and $B_1$ to $B_5$ may have a substituent, and the substituent includes, for example, a fluorine atom.

$R_1$ to $R_6$, $R_{11}$ to $R_{18}$, $R_{21}$ to $R_{30}$, $R_{31}$ to $R_{42}$ and $R_{51}$ to $R_{64}$ each independently represents a hydrogen atom, an alkyl group or a group represented by $—CH_2—O—(CH_2)_{m1}H$. $m1$ represents an integer of 1 or more. $n1$ to $n5$ each independently represents a positive integer, and is preferably an integer from 5 to 50, and more preferably an integer from 10 to 20.

The alkyl group for any one of $R_1$ to $R_6$, $R_{11}$ to $R_{18}$, $R_{21}$ to $R_{30}$, $R_{31}$ to $R_{42}$ and $R_{51}$ to $R_{64}$ is preferably a straight chain alkyl group having from 1 to 10 carbon atoms, more preferably a straight chain alkyl group having from 2 to 8 carbon atoms, and includes, for example, a methyl group, an ethyl group, a propyl group and a butyl group.

$m1$ is preferably an integer from 1 to 10, and more preforably an integer from 2 to 8.

It is preferred that at least one of $R_1$ to $R_6$ is a straight chain alkyl group having from 2 to 8 carbon atoms or a group represented by $—CH_2—O—(CH_2)_{m1}H$, and it is more preferred that at least one of $R_1$ to $R_6$ is a straight chain alkyl group having from 2 to 8 carbon atoms.

Similarly, it is preferred that at least one of $R_{11}$ to $R_{18}$ is a straight chain alkyl group having from 2 to 8 carbon atoms or a group represented by $—CH_2—O—(CH_2)_{m1}H$, and it is more preferred that at least one of $R_{11}$ to $R_{18}$ is a straight chain alkyl group having from 2 to 8 carbon atoms.

Similarly, it is preferred that at least one of $R_{21}$ to $R_{30}$ is a straight chain alkyl group having from 2 to 8 carbon atoms or a group represented by $—CH_2—O—(CH_2)_{m1}H$, and it is more preferred that at least one of $R_{21}$ to $R_{30}$ is a straight chain alkyl group having from 2 to 8 carbon atoms.

Similarly, it is preferred that at least one of $R_{31}$ to $R_{41}$ is a straight chain alkyl group having from 2 to 8 carbon atoms or a group represented by $—CH_2—O—(Ch_2)_{m1}H$, and it is more preferred that at least one of $R_{31}$ to $R_{42}$ is a straight chain alkyl group having from 2 to 8 carbon atoms.

Similarly, it is preferred that at least one of $R_{51}$ to $R_{64}$ is a straight chain alkyl group having from 2 to 8 carbon atoms or a group represented by $—CH_2—O—(CH_2)_{m1}H$, and it is more preferred that at least one of $R_{51}$ to $R_{64}$ is a straight chain alkyl group having from 2 to 8 carbon atoms.

Specific examples of the compound represented by any of formulae (II-1) to (II-5) are set forth below, but the invention should not be construed as being limited thereto.

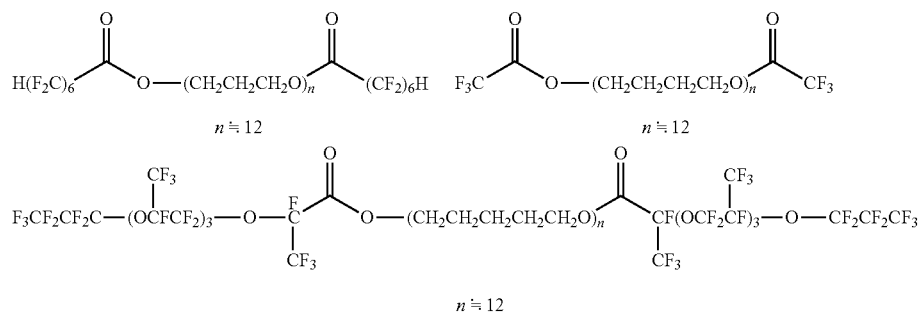

In the case of using the liquid phase fluorination method, a liquid phase may be the compound per se, but is preferably a solvent which is not involved in the product or reaction. The solvent is more preferably a solvent which is inert to the perfluorination reaction, and particularly preferably a solvent which is inert to the perfluorination reaction and is capable of dissolving the compound in an amount of 1 % by weight or more.

Specific examples of the solvent include known solvent used as a solvent for the liquid phase fluorination, for instance, a perfluorocarbon, for example, FLUORINERT FC-72 (trade name, produced by 3M Co.), a ethereal oxygen atom-containing perfluorocarbon, for example, GALDEN HT-70 (trade name, produced by Solvay Solexis Co., Ltd.), a perfluoroamine, for example, perfluorotributylamine, and anhydrous hydrogen fluoride.

The solvent for use in the perfluorination reaction is preferably the perfluorocarbon described above, and more preferably the perfluorocarbon having a boiling point of 85° C. or lower. The weight of the solvent used in the perfluorination reaction is preferably from 3 to 10,000 times, more preferably from 5 to 1,000 times, particularly preferably from 5 to 200 times, the weight of the compound.

The fluorine gas for use in the liquid phase fluorination may be used as it is, but it is preferably used by being diluted with gas or solvent which is inert to the fluorine gas and it is particularly preferably used by being diluted with gas which is inert to the fluorine gas.

The gas which is inert to the fluorine gas includes, for example, helium gas and nitrogen gas, and is preferably nitrogen gas for the economic reason. The volume concentration of fluorine gas in nitrogen gas is preferably 5% or more, and more preferably 10% or more. The amount of fluorine for use in the fluorination reaction is preferably from 1 to 100 times, more preferably from 1.1 to 10 times a minimum amount necessary for perfluorination of a compound (for example, the compound represented by any of formulae (II) and (II-1) to (II-5) described above) subjected to the perfluorination. The minimum amount of fluorine necessary for perfluorination is calculated from a number of parts capable of being perfluorinated and the sum of number of fluorine molecules necessary for perfluorination of the part. As to examples of the number of parts capable of being perfluorinated and the number of fluorine molecules necessary for perfluorination of the part, one fluorine molecule is necessary for one carbon-hydrogen bond, one fluorine molecule is necessary for one carbon-carbon double bond, and two fluorine molecules are necessary for one carbon-carbon triple bond. More specifically, the minimum amount of fluorine necessary for perfluorination of one mole of a compound having six carbon-hydrogen bond, two carbon-carbon double bond and one carbon-carbon triple bond is calculated as 10 moles.

A reaction system of the liquid phase fluorination method may be a batch system or a continuous system. The batch system is used in the examples of the invention.

The reaction temperature of the liquid phase fluorination method is preferably temperature not higher than a boiling point of the solvent. From the standpoint of reaction yield and industrial implementation, it is preferably from −40 to +100° C., and more preferably from −20 to +60° C.

The reaction pressure of the liquid phase fluorination method is not particularly restricted and in ordinary cases, it is preferably from atmospheric pressure to 1 MPa from the standpoint of industrial implementation.

In the reaction of the liquid phase fluorination method, a hydrogen atom is substituted with a fluorine atom to by-produce hydrogen fluoride. In the case of using the solvent other than hydrogen fluoride, for the purpose of removing the hydrogen fluoride by-produced it is preferred to perform a procedure, for example, addition of a hydrogen fluoride scavenger (for example, sodium fluoride) to a reactor, installation of a hydrogen floride-trapping device (for example, a gas purification tube filled with sodium fluoride) at a gas outlet of the reactor, cooling of the gas (outlet gas) ran out from a gas outlet of the reactor to separate liquefied hydrogen fluoride, or introduction of the outlet gas into a gas washer to treat. In the case of adding a hydrogen fluoride scavenger to a reactor, it is preferred to add an excess amount of the hydrogen fluoride scavenger. For instance, in case of adding sodium fluoride as the hydrogen fluoride scavenger, the sodium fluoride is preferably added in an amount from 1 to 100 times, more preferably in an amount from 1 to 10 times, the hydrogen fluoride by-produced in terms of molar ratio.

From the standpoint of achieving that among the repeating units in the compound (A) produced, the kinds and number of the substituents represented by $Rf_1$ to $Rf_4$ are the same, it is preferred that the compound represented by formula (II) is obtained by ring-opening polymerization of an epoxy ring of a compound represented by formula (III) shown below.

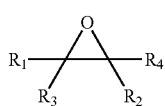

Formula (III)

In formula (III), $R_1$ to $R_4$ have the same meanings as $R_1$ to $R_4$ in formula (II) respectively.

It is preferred that the compound represented by any of formula (II-1) to (II-5) is obtained by ring-opening polymerization of a compound represented by any of formula (III-1) to (III-5) shown below. Thus, among the repeating units in the compound represented by formula (I-1) produced, the kinds and number of the substituents represented by $Rf_1$ to $Rf_6$, among the repeating units in the compound represented by formula (I-2) produced, the kinds and number of the substituents represented by $Rf_{11}$ to $Rf_{18}$, among the repeating units in the compound represented by formula (I-3) produced, the kinds and number of the substituents represented by $Rf_{21}$ to $Rf_{30}$, among the repeating units in the compound represented by formula (I-4) produced, the kinds and number of the substituents represented by $Rf_{31}$ to $Rf_{42}$, and among the repeating units in the compound represented by formula (I-5) produced, the kinds and number of the substituents represented by $Rf_{51}$ to $Rf_{64}$, can be made the same, respectively.

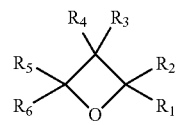

(III-1)

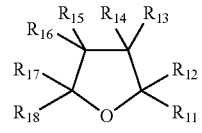

(III-2)

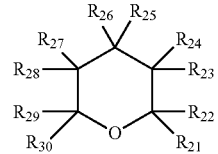

(III-3)

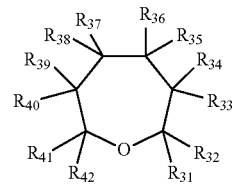

(III-4)

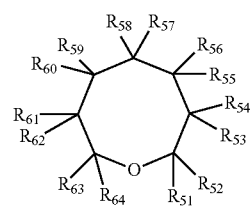

(III-5)

In formulae (III-1) to (III-5), $R_1$ to $R_6$, $R_{11}$ to $R_{18}$, $R_{21}$ $R_{30}$, $R_{31}$ $R_{42}$ and $R_{51}$ to $R_{64}$ have the same meanings as $R_1$ to $R_6$, $R_{11}$ to $R_{18}$, $R_{21}$ to $R_{30}$, $R_{31}$ to $R_{42}$ and $R_{51}$ to $R_{64}$ in formulae (II-1) to (II-5) respectively.

The ring-opening polymerization reaction for obtaining the compound represented by any of formulae (II-1) to (II-5) can be performed based on descriptions in *Alkyleneoxide Jugotai (Alkyleneoxide polymer)*, co-edited by Mitsuta Shibata, Masahiro Saito and Shinichi Akimoto (Kaibundo Publishing Co., Ltd).

(B) Photopolymerizadon Initiator

The polymerizable composition according to the invention contains a photopolymerization initiator (B).

Examples of the photopolymerization initiator include an acetophenone, a benzoin, a benzophenone, a phosphine oxide, a ketal, an anthraquinone, a thioxanthone, an azo compound, a peroxide, a 2,3-dialkyldione compound, a disulfide compound, a fluoroamine compound, an aromatic sulfonium, a lophine dimer, an onium salt, a borate salt an active ester, an active halogen, an inorganic complex and a coumarin. The photopolymerization initiators are also described in the Paragraph Nos. [0141] to [0159] of JP-A-2008-134585, and they can also be suitably used in the invention.

Various examples thereof are also described, in *Saishin UV Koka Gijutsu* (*Latest UV Curing Technology*), Technical Information Institute Co., Ltd. (1991), page 159 and Kiyomi Kato, *Shigaisen Koka System* (*Ultraviolet Curing System*), Sogo Gijutsu Center (1989), pages 65 to 148, and they are useful in the invention.

Preferred examples of commercially available photoradical polymerization initiator of photo-cleavage type include IRGACURE 651, IRGACURE 184, IRGACURE 819, IRGACURE 907, IRGACURE 1870 (a 7/3 mixed initiator of CGI-403/Irg 184), IRGACURE 500, IRGACURE 369, IRGACURE 1173, IRGACURE 2959, IRGACURE 4265, IRGACURE 4263, IRGACURE 127 and OXE01 produced by Ciba Specialty Chemicals Corp., KAYACURE DETX-S, KAYACURE BP-100, KAYACURE BDMK, KAYACURE CTX, KAYACURE BMS, KAYACURE 2-EAQ, KAYACURE ABQ, KAYACURE CPTX, KAYACURE EPD, KAYACURE ITX, KAYACURE QTX, KAYACURE BTC and KAYACURE MCA produced by Nippon Kayaku Co., Ltd, ESACURE (KIP100F, KB1, EB3, BP, X33, KTO46, KT37, KIP150, TZT) produced by Sartomer Company, Inc., and a combination thereof.

The photopolymerization initiator is preferably used in a range from 0.1 to 15% by weight, more preferably in a range from 1 to 10% by weight, based on the total solid content of the polymerizable composition.

In addition to the photopolymerization initiator, a photosensitizer may be used. Specific examples of the photosensitizer include n-butylamine, triethylamine, tri-n-butylphosphine, Michler's ketone and thioxanthone. Further, one or more auxiliary agents, for example, an azide compound, a thiourea compound or a mercapto compound may be used in combination.

Examples of commercially available photosensitizer include KAYACURE (DMBI, EPA) produced by Nippon Kayaku Co., Ltd.

(C) Organic Solvent

The polymerizable composition according to the invention contains an organic solvent.

The solvent which is used to dissolve a composition containing each component described above for forming the polymerizable composition is not particularly restricted, and an alcohol solvent and a ketone solvent are preferably used. Specific examples thereof include acetone, methyl ethyl ketone, 2-pentanone, 3-pentanone, 2-hexanone, 2-heptanone, 4-heptanone, methyl isopropyl ketone, ethyl isopropyl ketone, diisopropyl ketone, methyl isobutyl ketone, methyl teft-butyl ketone, diacetyl, acetylaectone, acetonylacetone, diacetone alcohol, mesityl oxide, chloroacetone, cyclopentanone, cyclohexanone and acetophenone. Among them, methyl ethyl ketone or methyl isobutyl ketone is preferred. The solvents may be used individually or in combination thereof at an appropriate mixing ratio.

As an auxiliary solvent, an ester solvent, for example, propylene glycol monomethyl ether acetate or a fluorine-based solvent, for example, a fluorine-based alcohol may be appropriately used. The auxiliary solvents may be used individually or in combination thereof at an appropriate mixing ratio.

The antireflective film according to the invention is described below.

The antireflective film according to the invention is an antireflective film comprising at least one low refractive index layer on a transparent support, wherein the low refractive index layer is formed from a composition for low refractive index layer containing the polymerizable composition described above.

(Method for Production of Antireflective Film)

The antireflective film according to the invention can be formed by the method described below, but the invention should not be construed as being limited thereto. First, a coating composition for low refractive index layer is prepared. Then, the coating composition is coated on a transparent support, for example, by a dip coating method, an air knife coating method, a curtain coating method, a roller coating method, a wire bar coating method, a gravure coating method or a die coating method, followed by heating and drying. A microgravure coating method, a wire bar coating method or a die coating method (see, U.S. Pat. No. 2,681,294 and JP-A-2006-122889) are more preferred, and a die coating method is particularly preferred.

After the coating, the layer formed from the composition for low refractive index layer containing the polymerizable composition is cured by light irradiation or heating, whereby a low refractive index layer is formed. If desired, another layer (a layer constituting the antireflective film which is described hereinafter, for example, a hardcoat layer, an antiglare layer, a medium refractive index layer or a high refractive index layer) may be previously coated on a transparent support, and the low refractive index layer is formed thereon. Thus, the antireflective film according to the invention is obtained.

With respect to the coating of layer constituting the anfireflective film described hereinafter (for example, a hardcoat layer, an antiglare layer, a medium refractive index layer or a high refractive index layer), the coating method same as described above may also be applied.

[Layer Construction of Antireflective Film]

The antireflective film according to the invention can be produced by providing the low refractive index layer and one or plural functional layers demanded for the purpose on a transparent support.

As one preferred embodiment, an antireflective film stacked on a transparent support, taking a refractive index, a layer thickness, a number of layers, an order of layers and the like into consideration, so as to reduce the reflectivity by optical interference, is exemplified. The antireflective film is constructed from only a low refractive index layer coated on a transparent support according to the simplest construction. In order to further reduce the reflectivity, the antireflective layer preferably has a construction in which a high refractive index layer having a higher refractive index than that of the transparent support and a low refractive index layer having a lower refractive index than that of the transparent support are provided in combination. Examples of the construction include a two-layer construction having a high refractive index layer/low refractive index, layer provided from the side of the transparent support, a construction having three layers having different refractive indices to form a stack of a medium refractive index layer (layer having a higher refractive index than that of the transparent support and a lower refractive index than that of the high refractive index layer)/a high refractive index layer/a low refractive index layer in this order, and a construction having a stack of a larger number of antiretlective layers is also proposed. Among them, a construction having a medium refractive index layer/a high refractive index layer/a low refractive index layer in this order on a transparent support having a hardcoat layer is preferred from the standpoint, for example, of durability, optical characteristics, cost or productivity, and examples thereof include constructions described, for example, in JP-A-8-122504, JP-A-8-110401, JP-A-10-300902, JP-A-2002-243906 and JP-A-2000-111706. Further, a different function may be imparted on each layer, and examples of such a layer include a low refractive index layer having an antifouling property, a high refractive index layer having an antistatic property (for example, JP-A-10-206603 or JP-A-2002-243906).

The antireflective film according to the invention preferably comprises a medium refractive index layer, a high refractive index layer and a low refractive index layer stacked in this order on the transparent support, wherein a refractive index at a wavelength of 550 nm of the medium refractive index layer is from 1.60 to 1.65 and a thickness of the medium refractive index layer is from 50.0 to 70.0 nm, a refractive index at a wavelength of 550 nm of the high refractive index layer is from 1.70 to 1.74 and a thickness of the high refractive index layer is from 90.0 to 115.0 nm, and a refractive index at a wavelength of 550 nm of the low refractive index layer is from 550 nm of 1.33 to 1.38 and a thickness of the low refractive index layer is from 85.0 to 95.0 nm.

Among the constructions of the antireflective film according to the invention described above, Construction (1) and Construction (2) described below are particularly preferred.

Construction (1):

An antireflective film wherein a refractive index at a wavelength of 550 nm of the medium refractive index layer is from 1.60 to 1.64 and a thickness of the medium refractive index layer is from 55.0 to 65.0 nm, a refractive index at a wavelength of 550 nm of the high refractive index layer is from 1.70 to 1.74 and a thickness of the high refractive index layer is from 105.0 to 115.0 nm, and a refractive index at a wavelength of 550 nm of the low refractive index layer is from 550 nm of 1.33 to 1.38 and a thickness of the low refractive index layer is from 85.0 to 95.0 nm.

Construction (2):

An antireflective film wherein a refractive index at a wavelength of 550 nm of the medium refractive index layer is from 1.60 to 1.65 and a thickness of the medium refractive index layer is from 55.0 to 65.0 nm, a refractive index at a wavelength of 550 nm of the high refractive index layer is from 1.70 to 1.74 and a thickness of the high refractive index layer is from 90.0 to 100.0 nm, and a refractive index at a wavelength of 550 nm of the low refractive index layer is from 550 nm of 1.33 to 1.38 and a thickness of the low refractive index layer is from 85.0 to 95.0 nm.

By adjusting the refractive index and thickness of each layer to the respective ranges described above, a change in the reflected color can be more reduced. Construction (1) is particularly preferred because it is a construction in which the reflectivity can be especially reduced while reducing the change in the reflected color. Construction (2) is particularly preferred because it is a construction in which the change in the reflectivity can be more reduced than Construction (1) and is excellent in robustness against change in the layer thickness.

Further, in the invention, with respect to the designed wavelength λ(=550 nm, which is representative of a wavelength region in which a luminous efficacy is highest), it is preferred that the medium refractive index layer satisfies formula (I) shown below, the high refractive index layer satisfies formula (II) shown below, and the low refractive index layer satisfies formula (III) shown below.

$$\lambda/4 \times 0.68 < n^1 d^1 < \lambda/4 \times 0.74 \quad \text{Formula (I)}$$

$$\lambda/2 \times 0.66 < n^2 d^2 \lambda/2 \times 0.72 \quad \text{Formula (II)}$$

$$\lambda/4 \times 0.84 < n^3 d^3 \lambda/4 \times 0.92 \quad \text{Formula (III)}$$

In Formulae (I) to (III), $n^1$ represents a refractive index of the medium refractive index layer, $d^1$ represents a layer thickness (nm) of the medium refractive index layer, $n^2$ represents a refractive index of the high refractive index layer, $d^2$ represents a layer thickness (nm) of the high refractive index layer, $n^3$ represents a refractive index of the low refractive index layer, $d^3$ represents a layer thickness (nm) of the low refractive index-layer, and $n^3 < n^1 < n^2$.

It is preferred that formula (I), formula (II) and formula (III) are satisfied, because the reflectivity is reduced and the change in the reflected color can be inhibited. Further, this is also preferred from the standpoint that when a fat or oil component, for example, a fingerprint or sebum is attached, a change in the tint is small and thus the stain is hardly visually recognized.

By using the low refractive index layer containing the compound (A) represented by any of formulae (I) and (I-1) to (I-5) and a fluorine-containing polyfunctional acrylate together with the layer construction described above, even in a multilayer interference layer construction a fat or oil component, for example, a magic marker, a fingerprint or sebum hardly attaches or when the fat or oil component is attached, it is possible to easily wipe off it to mate it less noticeable.

The average reflectivity is preferably less than 1.20%, more preferably less than 1.16%, from the standpoint of visibility in the invention.

Further, it is preferred in the case of installation on the surface of an image display device that an average value of the average reflectivity (specular reflectivity) is adjusted to 0.5% or less, because the reflection of image can be remarkably reduced.

As to the measurement of the specular reflectivity and the tint, the antireflection property can be evaluated by mounting an adapter ARV-474 on a spectrophotometer V-550 (produced by JASCO Corp.), measuring the specular reflectivity for the outgoing angle of $-\theta$ at an incident angle of $\theta$ ($\theta$ from 5 to 45°, intervals of 5°) in the wavelength region from 380 to 780 nm, and calculating the average reflectivity at 450 to 650 nm. Further, the tint of reflected light can be evaluated by calculating from the reflection spectrum measured, the L*, a* and b* values of the CIE1976 L*a*b* color space which are values indicating the tint of regularly reflected light for incident light at each incident angle of a CIE standard illuminant D65.

The refractive index of each layer can be measured using Multi-Wavelength Abbe Refractometer DR-M2 (produced by ATAGO Co., Ltd.) after coating the coating solution of each layer on a glass plate so as to have a thickness from 3 to 5 μm. In the specification, a refractive index measured using a filter, Interference Filter 546(e) nm for DR-M2. M4, RE-3523, is employed as the refractive index at a wavelength of 550 nm.

The thickness of each layer can be measured by observing the cross-section by means of Reflective Film Thickness Monitor FE-3000 (produced by Otsuka Electronics Co., Ltd.) utilizing light interference or a TEM (transmission electron microscope). The refractive index can also be measured simultaneously with the film thickness by the reflective film thickness monitor, but in order to increase the measurement accuracy of the layer thickness, a refractive index of each layer measured by a different means is preferably used. In the case where the refractive index of each layer cannot be measured, the measurement of the layer thickness by TEM is preferred. In this case, it is desired to measure the layer thickness at 10 or more portions and to use the average value thereof.

The antireflective film according to the invention preferably takes a form, in terms of a form at the production, in which the film is in a roll. In this case, in order to obtain neutrality of the tint of the reflected color, the layer thickness distribution value calculated by formula (6) shown below with the parameters being the average d (average value), minimum d (minimum value) and maximum d (maximum value) of the layer thickness in the range of an arbitrary 1,000 m length is preferably 5% or less, more preferably 4% or less, still more preferably 3% or less, yet still more preferably 2.5% or less, and particularly preferably 2% or less, in each layer of the thin layers.

(Maximum d−Minimum d)×100/Average d       Formula (6)

Now, the transparent support and each of the layers constituting the antireflective film according to the invention will be described in detail.

[Transparent Support]

As the transparent support of the antireflective film according to the invention, a transparent base material film is preferably used. The transparent base material film is not particularly restricted and includes, for example, a transparent resin film, a transparent resin plate, a transparent resin sheet and a transparent glass. Examples of the transparent resin film include a cellulose acylate film (for example, a cellulose triacetate film (refractive index: 1.48), a cellulose diacetate film, a cellulose acetate butyrate film or a cellulose acetate propionate film), a polyethylene terephthalate film, a polyethersulfone film, a polyacrylic resin film, a polyurethane resin film, a polyester film, a polycarbonate film, a polysulfone film, a polyether film, a polymethylpentene film, a polyether ketone film, a (meth)acrylonitrile film, a polyolefin, a polymer having an alicyclic structure (a norbornene resin (ARTON: trade name, produced by JSR Corp.) and an amorphous polyolefin (ZEONEX: trade name, produced by ZEON Corp.). Among them, triacetylcellulose, polyethylene terephthalate or a polymer having an alicycic structure is preferred, and triacetylcellulose is particularly preferred.

The thickness of the transparent support used is ordinarily approximately from 25 to 1,000 μm, preferably from 25 to 250 μm, and more preferably from 30 to 90 μm.

The width of the transparent support may be appropriately selected and from the standpoint of handling, yield and productivity, it is ordinarily from 100 to 5,000 mm, preferably from 800 to 3,000 mm, and more preferably from 1,000 to 2,000 mm. The transparent support can be handled as a lengthy film in the roll form, and the length thereof is ordinarily from 100 to 5,000 m, and preferably from 500 to 3,000 m.

The surface of the transparent support is preferably smooth and an average roughness Ra value thereof is preferably 1 μm or less, more preferably from 0.0001 to 0.5 μm, and more preferably from 0.001 to 0.1 μm.

As to the transparent support, there are descriptions in Paragraph Nos. [0163] to [0169] of JP-A-2009-98658 and they are also applied to the invention.

[Hardcoat Layer]

In the antireflective film according to the invention, a hardcoat layer may be provided in order to impart physical strength to the antireflective film. According to the invention, although the hardcoat layer may not be provided, it is preferred to provide the hardcoat layer because the scratch resistance, for example, hardness with a pencil scratch test, increases.

The antireflective film is constructed preferably by providing a low refractive index layer on the hardcoat layer, and more preferably by provided a medium refractive index layer and a high refractive index layer between the hardcoat layer and the low refractive index layer.

The hardcoat layer may be composed of a stack of two or more layers.

The refractive index of the hardcoat layer according to the invention is preferably from 1.48 to 2.00, more preferably from 1.48 to 1.60, in view of the optical design for obtaining an antireflective film. According to the invention, since at least one low refractive index layer is present on the hardcoat layer, when the refractive index of the hardcoat layer is smaller than 1.48, the antireflection property may decrease, whereas when it is larger than 2.00, the tint of reflected light tends to be intensified.

The thickness of the hardcoat layer is ordinarily approximately from 0.5 to 50 μm, preferably from 1 to 20 μm, more preferably from 5 to 20 μm, from the standpoint of imparting sufficient durability and impact resistance to the antireflective film.

The strength of the hardcoat layer is preferably H or more, more preferably 2H or more, and most preferably 3H or more, in the pencil hardness test. Further, in the Taber test according to JIS K 5400, the abrasion loss of the specimen between before and after the test is preferably smaller.

The hardcoat layer is preferably formed by a crosslinking reaction or polymerization reaction of an ionizing radiation-curable compound. For example, a polymerizable composition containing an ionizing radiation-curable polyfunctional monomer or polyfunctional oligomer is coated on a transparent support and subjected to a crosslinking reaction or polymerization reaction of the polyfunctional monomer or polyfunctional oligomer, whereby the hardcoat layer can be formed.

The functional group in the ionizing radiation-curable polyfunctional monomer or polyfunctional oligomer is preferably a photo-, electron beam- or radiation-polymerizable functional group, and more preferably a photopolymerizable functional group.

Examples of the photopolymerizable functional group include an unsaturated polymerizable functional group, for example, a (meth)acryloyl group, a vinyl group, a styryl group or an allyl group. Among them, a (meth)acryloyl group is preferred. Specifically, compounds exemplified in a polyfunctional monomer having polymerizable unsaturated groups described below are preferably used.

(Polyfunctional Monomer having Polymerizable Unsaturated Groups)

The polyfunctional monomer having polymerizable unsaturated groups is preferably a polyfunctional monomer having three or more polyimerizable unsaturated groups. The polyfunctional monomer having polymerizable unsaturated groups is able to function as a curing agent. By using the polyfunctional monomer having polymerizable unsaturated groups together with a fluorine-containing copolymer having a polymerizable unsaturated group described hereinafter, the scratch resistance or scratch resistance after treatment with chemicals can also be improved.

The polyfunctional monomer having polymerizable unsaturated groups may or may not contain a fluorine atom.

A non-fluorine-corntaining polyfunctional monomer which can be used in the invention is described below. The non-fluorine-containing polyfunctional monomer includes a compound having a polymerizable functional group, for example, a (meth)acryloyl group, a vinyl group, a styryl group or an allyl group, and is preferably a compound having a (meth)acryloyl group. In particular, a compound having three or more (meth)acryloyl groups in its molecule described below is preferably used.

Specific examples of the compound having a polymerizable unsaturated group include a (meth)acrylic acid diester of alkylene glycol, a (meth)acrylic acid diester of polyoxyalkylene glycol, A (meth)acrylic acid diester of polyhydric alcohol, a (meth)acrylic acid diester of ethylene oxide or propylene oxide adduct, an epoxy (meth)acrylate, a urethane (meth)acrylate and a polyester (meth)acrylate.

Among them, an ester of polyhydric alcohol and (meth)acrylic acid is preferred. Examples thereof include pentaerythritol tetra(meth)acrylate, pentaerythritol tri(meth)acrylate, trimethylolpropane tri(meth)acrylate, EO-modified trimethylolpropane tri(meth)acrylate, PO-modified trimethylolpropane tri(meth)acrylate, EO-modified phosphoric acid tri(meth)acrylate, trimethylolethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate and caprolactone-modified bis(acryloxyethyl)isocyanurate.

As the polyfunctional acrylate compound having (meth)acryloyl groups (ester of polyhydric alcohol and (meth)acrylic acid), a commercially available compound can be used and examples of the commercially available compound include KAYARAD DPHA and KAYARAD PET-30 produced by Nippon Kayaku Co., Ltd.

As to the non-fluorine-containing polyfunctional monomer, there are descriptions in Paragraph Nos. [0114] to [0122] of JP-A-2009-98658 and they are also applied to the invention.

For the purpose of imparting an internal scattering property, the hardcoat layer may contain a matting particle, for example, an inorganic compound particle or a resin particle, having an average particle size from 1.0 to 1.00 μm, and preferably from 1.5 to 7.0 μm.

For the purpose of controlling the refractive index of the hardcoat layer, a monomer or inorganic particle of various refractive indexes or both of them may be added to the binder of the hardcoat layer. The inorganic particle has an effect of restraining the curing shrinkage resulting from the crosslinking reaction in addition to the effect of controlling the refractive index. In the invention, the term "binder" means a polymer produced by polymerization of the polyfunctional monomer and/or the high refractive index monomer or the like after the formation of the hardcoat layer including the inorganic particle dispersed therein. As the inorganic particle for controlling the refractive index, a silica fine particle is preferably used. By using the silica fine particle, tint unevenness resulting from interference between the support and the hardcoat layer can also restrained.

(Conductive Compound)

For the purpose of imparting an antistatic property, the hardcoat layer according to the invention may contain a conductive compound. The conductive compound which can be used in the invention is not particularly restricted and includes an ion conductive compound and an electron conductive compound. The ion conductive compound includes, for example, a cationic, anionic, nonionic or amphoteric ion conductive compound. The electron conductive compound includes an electron conductive compound which is a non-conjugated polymer or conjugated, polymer formed by connected aromatic carbon rings or aromatic hetero rings with a single bond or a divalent or higher valent connecting group. Of the compounds, a compound (cationic compound) having a quaternary ammonium salt group is preferred from the standpoint of high antistatic property, relatively inexpensive and uneven distribution to the region of the base material side.

As the compound having a quaternary ammonium salt group, any of a low molecular weight type and a high molecular weight type may be used and a high molecular weight type cationic antistatic agent is preferably used because the fluctuation of antistatic property resulting, for example, from bleeding out is prevented. The high molecular weight type cationic compound having a quaternary ammonium salt group is used by appropriately selecting from known compounds, and compounds described in JP-A-2010-84425 and Japanese Patent No. 400,605 are preferably used.

[Antiglare Layer]

The antiglare layer is formed for the purpose of providing the antireflective film with an antiglare property due to surface scattering and preferably with a hardcoat property to enhance the hardness and scratch resistance of the antireflective film.

As to the antiglare layer, there are descriptions in Paragraph Nos. [0178] to [0189] of JP-A-2009-98658 and they are also applied to the invention.

[High Refractive Index Layer and Medium Refractive Index Layer)

The refractive index of the high refractive index layer is preferably from 1.70 to 1.74 as described above, and more preferably from 1.71 to 1.73. The refractive index of the medium refractive index layer is adjusted so as to be between the refractive index of the low refractive index layer and the refractive index of the high refractive index layer. The refractive index of the medium refractive index layer is preferably from 1.60 to 1.64, and more preferably from 1.61 to 1.63.

As to a method for forming the high refractive index layer or the medium refractive index layer, although a transparent thin layer of inorganic oxide formed by a chemical vapor deposition (CVD) method or a physical vapor deposition (PVB) method, particularly, a vacuum deposition method or a sputtering method, which is a kind of the physical vapor deposition method, may be used, a method of all-wet coating is preferred.

The layer formation, upon the crosslinking reaction or polymerization reaction of the curable resin is preferably conducted under an atmosphere having an oxygen concentration of 6% by volume or less, more preferably 4% by volume or less, particularly preferably 2% by volume or less, and most preferably 1% by volume or less.

For controlling the refractive index of the high refractive index layer, inorganic fine particle is preferably used. However, due to photocatalytic action titanium dioxide particle may cause a problem of deterioration of light fastness or the like to raise difficulties in view of production aptitude or durability in some cases. By adjusting the refractive index of the high refractive index layer to the range described above, inorganic fine particle having a lower refractive index than that of titanium dioxide particle, for example, zirconium oxide particle can be used which is also excellent in view of the production aptitude or durability.

As described above, the medium refractive index layer can be formed using the same materials in the same manner as in the high refractive index layer.

Specifically, according to one example, the kind of fine particle and kind of resin are selected so that the medium refractive index layer and high refractive index layer meet the requirements of thickness and refractive index in formulae (I)

and (II) described above and the blend ratio thereof is decided thereby determining the main composition.

In any of the compositions for forming the layers described above, a solvent same as in the composition for low refractive index layer can be used.

[Low Refractive Index Layer]

The refractive index of the low refractive index layer according to the invention is preferably from 1.30 to 1.47. The refractive index of the low refractive index layer in the case of the antireflective film of a multilayer thin film interference type (medium refractive index layer/high refractive index layer/low refractive index layer) is preferably from 1.33 to 1.38, and more preferably from 1.35 to 1.37. The range described above is preferred because the film strength can be maintained while reducing the reflectivity. As to a method of forming the low refractive index layer, although a transparent thin layer of inorganic oxide formed by a chemical vapor deposition (CVD) method or a physical vapor deposition (PVD) method, particularly, a vacuum deposition method or a sputtering method, which is a kind of the physical vapor deposition method, may be used, a method of all-wet coating using the coating composition for low refractive index layer is preferably used.

The haze of the low refractive index layer is preferably 3% or less, more preferably 2% or less, and most preferably 1% or less.

The strength of the antireflective film including the low refractive index layer formed is preferably H or more, more preferably 2H or more, and most preferably 3H or more, in a pencil hardness test with a load of 500 g.

Also, in order to improve the antifouling performance of the antireflective film, the contact angle to water on its surface is preferably 95° or more, and more preferably 102° or more. The contact angle of 105° or more is particularly preferred, because the antifouling performance to fingerprint is remarkably improved. The surface free energy of the antireflective film is preferably 25 mN/m or less, more preferably 23 mN/m or less, still more preferably 20 mN/m or less, and most preferably 20 mN/m or less.

(Formation of Low Refractive Index Layer)

The low refractive index layer is preferably formed by coating a polymerizable composition having dissolved or dispersed therein the compoun (A) represented by any of formulae (I) and (I-1) to (I-5), a fluorine-containing copolymer having a polymerizable unsaturated group, an inorganic fine particle, and, if desired, other arbitrary components and curing the coating simultaneously with the coating or after the coating and drying, upon a crosslinking reaction or polymerization reaction by irradiation of ionizing radiation (for example, irradiation of light or irradiation of electron beam) or heating.

In particular, when the low refractive index layer is formed upon the crosslinking reaction or polymerization reaction of an ionizing radiation curable compound, the crosslinking reaction or polymerization reaction is preferably conducted under an atmosphere having an oxygen concentration of 1% by volume or less. When the low refractive index layer is formed under an atmosphere having an oxygen concentration of 1% by volume or less, the outermost layer excellent in the physical strength and chemical resistance can be obtained.

The oxygen concentration is preferably 0.5% by volume or less, more preferably 0.1% by volume or less, particularly preferably 0.05% by volume or less, and most preferably 0.02% by volume or less.

The fluorine-containing copolymer having a polymerizable unsaturated group described above is able to function as a binder to form a film of the low refractive index layer.

The fluorine-containing copolymer having a polymerizable unsaturated group described above is preferably obtained by polymerization of at least one fluorine-containing vinyl monomer.

Examples of the fluorine-containing vinyl monomer include a fluoroolefin (for example, Fluoroethylene, vinylidene fluoride, tetrafluoroethylene or hexafluoropropylene), a partially or fully fluorinated alkyl ester derivative of (meth)acrylic acid (for example, BISCOAT 6FM (trade name, produced by Osaka Organic Chemical Industry Ltd.) or R-2020 (trade name, produced by Daikin Industries, Ltd.)), and a fully or partially fluorinated vinyl ether. The perfluoroolefin is preferred, and hexafluoropropylene is particularly preferred from the standpoint of refractive index, solubility, transparency, availability and the like. When a composition ratio of the fluorine-containing vinyl monomer is raised, the refractive index can be reduced but the film strength is lowered. In the invention, the fluorine-containing vinyl monomer is introduced so that the fluorine content in the copolymer falls in the range preferably from 20 to 60% by weight more preferably from 25 to 55% by weight, and particularly preferably from 30 to 50% by weight.

The inorganic fine particle which can be used in the low refractive index layer is not particularly restricted. The average particle size of the inorganic fine particle is preferably from 5 to 120 nm. From the standpoint of reducing the refractive index, an inorganic low refractive index particle is preferred.

The inorganic fine particle includes a magnesium fluoride fine particle and a silica fine particle from the standpoint of low refractive index.

A porous or hollow fine particle is also a preferred embodiment of the inorganic fine particle.

[Preparation Method of Porous or Hollow Fine Particle]

A preferred preparation method of a hollow fine particle is described below. The first step is formation of a core particle which can be removed by an after-treatment, the second step is formation of a shell layer, the third step is the dissolution of the core particle, and if desired, the fourth step is formation of an additional shell layer. Specifically, the hollow particle can be prepared, for example, in accordance with a preparation method of a hollow silica fine particle described in JP-A-2001-233611.

Of the constructions of the antireflective film according to the invention described above, Construction (3) and Construction (4) described below are particularly preferred, because the reflection color is uniform and neutral with low reflectivity, the excellent antifouling property is achieved wherein a fingerprint or sebum, when attached, is easily wiped off and hardly noticeable, and the scratch resistance is also excellent.

Construction (3):

Transparent support: triacetyl cellulose film (refractive index: 1.49, layer thickness: 60 nm)

Hardcoat layer: polyfunctional monomer having polymerizable unsaturated groups, silica sol, and photopolymerization initiator (refractive index: 1.49, layer thickness: 10 nm)

Medium refractive index layer; polyfunctional monomer having polymerizable unsaturated groups, zirconium oxide fine particle, and photopolymerization initiator (refractive index: 1.62, layer thickness: 60 nm)

High refractive index layer: polyfunctional monomer having polymerizable unsaturated groups, zirconium oxide fine particle, and photopolymerization initiator (refractive index: 1.72, layer thickness: 110 nm)

Low refractive index layer; fluorine-containing copolymer having polymerizable unsaturated group, hollow silica fine particle, polyfunctional monomer having polymerizable unsaturated groups (compound containing fluorine atom and compound containing no fluorine atom), compound (A) represented by any of formulae (I) and (I-1) to (I-5), and photopolymerization initiator (refractive index; 1.36, layer thickness: 90 nm)

Construction (4):

Transparent support: triacetyl cellulose film (refractive index: 1.49, layer thickness; 60 nm)

Hardcoat layer; polyfunctional monomer having polymerizable unsaturated groups, silica sol, and photopolymerization initiator (refractive index: 1.49, layer thickness: 10 nm)

Medium refractive index layer: polyfunctional monomer having polymerizable unsaturated groups, phosphorus-containing tin oxide fine particle or antimony-doped tin oxide fine particle, and photopolymerization initiator (refractive index: 1.635, layer thickness: 60 nm)

High refractive index layer: polyfunctional monomer having polymerizable unsaturated groups, zirconium oxide fine particle, and photopolymerization initiator (refractive index: 1.72, layer thickness; 95 nm)

Low refractive index layer: fluorine-containing copolymer having polymerizable unsaturated group, hollow silica fine particle, polyfunctional monomer having polymerizable unsaturated groups (compound containing fluorine atom and compound containing no fluorine atom), compound (A) represented by any of formulae (I) and (I-1) to (I-5), and photopolymerization initiator (refractive index: 1.36, layer thickness; 90 nm)

[Protective Film for Polarizing Plate]

In the case of using the antireflective film according to the invention as a surface protective film of a polarizing film (protective film for polarizing plate), the adhesion property to the polarizing film comprising a polyvinyl alcohol as the main component can be improved by hydrophilizing the surface of the transparent support opposite the side having the thin layer, that is, the surface on the side to be stacked with the polarizing film.

It is also preferred that of the two protective films of the polarizer, the film other than the antireflective film is an optical compensation film having an optical compensation layer comprising an optically anisotropic layer. The optical compensation film (retardation film) can improve the viewing angle characteristics on the liquid crystal display screen.

Although a known optical compensation film can be used, an optical compensation film described in JP-A-2001-100042 is preferred from the standpoint of enlarging the viewing angle.

In the case of using the antireflective film as a surface protective film of a polarizing film (protective film for polarizing plate), as the transparent support, a triacetyl cellulose film is particularly preferably used.

A method of preparing the protective film for a polarizing plate according to the invention includes three methods, that is, (1) a method of coating respective layers constituting the antireflective film on one surface of a transparent support previously subjected to a saponification treatment, (2) a method of coating the antireflective layer on one surface of a transparent support and subjecting a surface to be stacked with a polarizing film or both surfaces to a saponification treatment and (3) a method of coating a part of the antireflective layers on one surface of a transparent support subjecting a surface to be stacked with a polarizing film or both surfaces to a saponification treatment and then coating the remaining layers. In the method of (1), the surface where the antireflective layer is coated is also hydrophilized and the adhesion property between the transparent support and the antireflective layer can be hardly ensured and thus, the method of (2) is particularly preferred.

[Polarizing Plate]

The polarizing plate according to the invention is described below. The polarizing plate according to the invention is a polarizing plate composing a polarizing film and two protective films which protect both sides of the polarizing film, wherein at least one of the protective films is the antireflective film according to the invention.

The construction wherein the transparent support of the antireflective film is adhered to a polarizing film, if desired, through an adhesive layer comprising polyvinyl alcohol and a protective film is also provided on another side of the polarizing film is preferred. On the surface of another protective film opposite the polarizing film, an adhesive layer may be provided.

By using the antireflective film according to the invention as the protective film for polarizing plate, a polarizing plate having an antireflective function excellent in physical strength and light fastness can be produced so that a great reduction in the cost and reduction in thickness of the display device can be achieved.

Moreover, the polarizing plate according to the invention may also have an optical compensation function. In this case, it is preferred that the antireflective film is used only for one surface side, that is, either the front surface side or the rear surface side, of two surface protective films and the surface protective film on the surface of the polarizing plate opposite the side having the antireflective film is an optical compensation film.

By producing a polarizing plate wherein the antireflective film according to the invention is used as one protective film for polarizing plate and an optical compensation film having optical anisotropy is used as another protective film for polarizing film, the bright-room contrast and the up/down left/right viewing angle of liquid crystal display device can be more improved.

The image display device according to the invention comprises a display having the antireflective film or polarizing plate according to the invention at an outermost surface.

EXAMPLES

The present invention will be described in more detail with reference to the following examples, but the invention should not be construed as being limited thereto.

<Synthesis Example 1: Synthesis of Compound (A) represented by formula (I)>

(Synthesis of Compound (A-1))

Compound (A-1) was prepared according to the synthesis scheme shown below.

Synthesis scheme

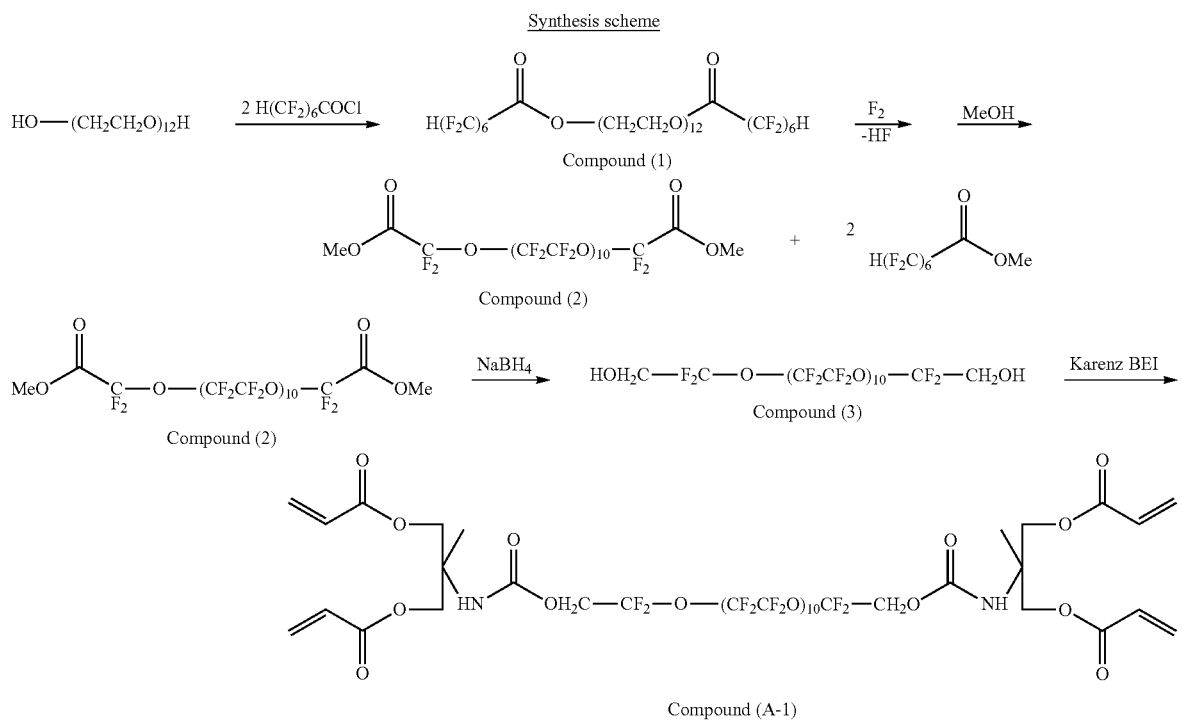

Compound (A-1)

(Step 1)

To a mixture of 60 g of polyethylene glycol (PEG 600) obtained by ring-opening polymerization of an epoxy ring based on *Alkyleneoxide Jugotai (Alkyleneoxide polymer)*, co-edited by Mitsuta Shibata, Masahiro Saito and Shinichi Akimoto (Kaibundo Publishing Co., Ltd.), 400 ml of ethyl acetate and 240 ml of pyridine was added 80.2 g of 7H-dod-decafluoroheptanoyl chloride at 0° C. with stirring and the mixture was returned to room temperature (25° C.), followed by stirring as it was for 4 hours. The reaction solution was diluted with 1.50 ml of ethyl acetate and 350 ml of hexane and then washed with 1 N hydrochloric acid, water, sodium bicarbonate water, and a saturated saline solution. The solution was dried on magnesium sulfate and concentrated to obtain Compound (1). The yield was 118.9 g (66.0%).

(Step 2)

In a reaction vessel made of fluororesin were charged 300 ml of a fluorine-containing solvent (FLUORINERT FC-72, produced by 3M Co.) and 45 g of sodium fluoride and the reaction vessel was placed in a bath of 0° C. under helium atmosphere. At an outlet of the reaction vessel, a packed bed of sodium fluoride pellet and a condenser maintained at −40° C. were installed in series. After introducing helium gas into the reaction vessel at a flow rate of 250 ml/min for one hour, 20% fluorine gas diluted with nitrogen gas (hereinafter, also referred to as diluted fluorine gas) was introduced into the reaction vessel at a flow rate of 250 ml/min for 10 minutes. While introducing the diluted helium gas into the reaction vessel at a flow rate of 250 ml/min, a solution containing 6.0 g of Compound (1), 36 g of a fluorine-containing solvent (ASAI-II CLEAN AK-225, produced by Asahi Glass Co., Ltd.) and 0.15 g of hexafluorobenzene was added to the reaction vessel at a rate of 5.2 ml/hour. After the completion of the addition, the diluted helium gas was introduced into the reaction vessel at a flow rate of 250 ml/min for 15 minutes. Then, while introducing the diluted helium gas into the reaction vessel at a flow rate of 250 ml/min, 10 ml of hexafluorobenzene was added to the reaction vessel at a rate of 10 ml/hour. After the completion of the addition, the diluted helium gas was introduced into the reaction vessel at a flow rate of 250 ml/min for 15 minutes and then helium gas was introduced into the reaction vessel at a flow rate of 250 ml/min for one hour to expel the remaining fluorine gas in the reaction vessel. If was confirmed by GC and GC-MS analysis that the perfluorination had completely proceeded.

After removing the solid from the reaction solution by filtration, the filtrate was put into a glass reaction vessel, 122 g of sodium fluoride was added thereto and while stirring at room temperature, 300 ml of methanol was dropwise added thereto. After stirring for 2.5 hours, the solid was removed by filtration and the filtrate was concentrated at normal pressure. The purification was conducted by distillation under reduced pressure to obtain Compound (2). The yield was 4.16g (50.2%).

(Step 3)

To a mixture of 3 g of Compound (2) (methyl ester compound) and 10 ml of nonafluorobutyl methyl ether was added 0.1 g of sodium tetrahydroborate at 0° C. with stirring and the mixture was returned to room tempearture, followed by stirring for 2 hours. The reaction solution was washed with 6 N hydrochloric acid, water, sodium bicarbonate water, and a saturated saline solution. The solution was dried on magnesium sulfate and concentrated to obtain Compound (3). The yield was 2.4 g (80.0%).

(Step 4)

A mixture of 2.8 g of Compound (3) (alcohol compound), 4 ml of nonafluorobutyl methyl ether, 0.8 g of KARENZ BEI (produced by Showa Denko K. K.), 0.2 mg of 4-methoxyphenol and 1.0 mg of tin (IV) dibutyl dilaurate was stirred at 70° C. for 4 hours. After the completion of the reaction, 3.5 ml of nonafluorobutyl methyl ether was added thereto to obtain a 20% by weight solution of the desired Compound (A-1).

Compound (A-16), Compound (A-7), Compound (A-13), Compound (A-26) and Compound (A-28) were obtained in the same manner as in Synthesis of Compound (A-1).

Examples 1 to 6 and Comparative Examples 1 to 3

[Production of Antireflective Film]

Preparation of a coating solution for forming each layer and formation of each layer were conducted in the manner shown below to produce each of the antireflective films of Examples 1 to 6 and Comparative Examples 1 to 3.

(Preparation of Coating Solution A for Hardcoat Layer)

The composition shown below was charged into a mixing tank and the mixture was stirred to prepare a coating solution for hardcoat layer.

To 900 parts by weight of methyl ethyl ketone were added 100 parts by weight of cyclohexanone, 750 parts by weight of partially caprolactone-modified polyfunctional acrylate (DPCA-20, produced by Nippon Kayaku Co., Ltd.), 200 parts by weight of a silica sol (MIBK-ST, produced by Nissan Chemical Industries, Ltd.) and 50 parts by weight of a photopolymerization initiator (IRGACURE 184, produced by Ciba Specialty Chemicals Corp.), followed by stirring. The mixture was filtered through a polypropylene filter having a pore size of 0.4 µm to prepare Coating solution A for hardcoat layer.

(Preparation of Coating Solution A for Medium Refractive Index Layer)

To 5.1 parts by weight of a $ZrO_2$ fine particle-containing hardcoat agent (DESOLITE Z7404 [refractive index; 1.72, solid content concentration: 60% by weight, content of zirconium oxide fine particle: 70% by weight (based on solid content), average particle size of zirconium oxide fine particle: about 20 nm, solvent composition: methyl isobutyl ketone/methyl ethyl ketone=9/1, produced by JSR Corp.]) were added 1.5 parts by weight of a mixture (DPHA) of dipentaerythritol pentaacrylate and dipentaerythritol hexaacrylate, 0.05 parts by weight of a photopolymerization initiator (IRGACURE 907, produced by Ciba Specialty Chemicals Corp.), 66.6 parts by weight of methyl ethyl ketone, 7.7 parts by weight of methyl isobutyl ketone and 19.1 parts by weight of cyclohexanone, followed by stirring. The mixture was thoroughly stirred and then filtered through a polypropylene filter having a pore size of 0.4 µm to prepare Coating solution A for medium refractive index layer.

(Preparation of Coating Solution B for Hardcoat Layer)

A mixture of 4.5 parts by weight of a mixture (DPHA) of dipentaerythritol pentaacrylate and dipentaerythritol hexaacrylate, 0.14 parts by weight of a photopolymerization initiator (IRGACURE 907, produced by Ciba Specialty Chemicals Corp.), 66.5 parts by weight of methyl ethyl ketone, 9.5 parts by weight of methyl isobutyl ketone and 19.0 parts by weight of cyclohexanone was thoroughly stirred and then filtered through a polypropylene filter having a pore size of 0.4 µm to prepare Coating solution B for medium refractive index layer.

Coating solution C for medium refractive index layer was prepared by mixing Coating solution A for medium refractive index layer and Coating solution B for medium refractive index layer in appropriate amounts so as to provide the refractive index of each sample shown in Table 2 below.

(Preparation of Coating Solution A for High Refractive Index Layer)

To 15.7 parts by weight of a $ZrO_2$ fine particle-containing hardcoat agent (DESOLITE Z7404 [refractive index: 1.72, solid content concentration: 60% by weight, content of zirconium oxide fine particle: 70% by weight (based on solid content), average particle size of zirconium oxide fine particle: about 20 nm, solvent composition: methyl isobutyl ketone/methyl ethyl ketone=9/1, produced by JSR Corp.]) were added 61.9 parts by weight of methyl ethyl ketone, 3.4 parts by weight of methyl isobutyl ketone and 1.1 parts by weight of cyclohexanone, followed by stirring. The mixture was filtered through a polypropylene filter having a pore size of 0.4 µm to prepare Coating solution A for high refractive index layer.

(Preparation of Coating Solution for Low Refractive Index Layer)

(Synthesis of Perfluoroolefin Copolymer (1))

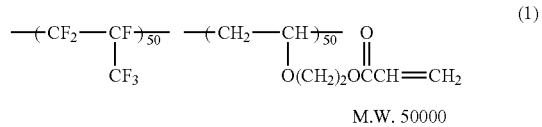

M.W. 50000

In the structural formula above, 50:50 indicates a molar ratio.

In a stainless steel autoclave having an inner volume of 100 ml equipped with a stirrer were charged 40 ml of ethyl acetate, 14.7 g of hydroxyethyl vinyl ether and 0.55 g of dilauroyl peroxide and the inside of the system was degassed and displaced with nitrogen gas. Further, 25 g of hexafluoropropylene (HFP) was introduced into the autoclave and the temperature was raised to 65° C. The pressure when the temperature in the autoclave reached 65° C. was 0.53 MPa (5.4 kg/cm$^2$). The reaction was continued for 8 hours while maintaining the temperature and when the pressure reached 0.31 MPa (3.2 kg/cm$^2$), the heating was terminated and the system was allowed to cool. At the time when the inner temperature decreased to room temperature, the unreacted monomer was expelled, and the autoclave was opened to take out the reaction solution. The reaction solution was poured into a large excess of hexane and the solvent was removed by decantation to obtain the polymer precipitated. The polymer was dissolved in a small amount of ethyl acetate and subjected to reprecipitation twice from hexane to completely remove the residual monomer. After drying, 28 g of the polymer was obtained. Subsequently, 20 g of the polymer was dissolved in 100 ml of N,N-dimethylacetamide, and 11.4 g of acrylic chloride was dropwise added thereto under ice cooling, followed by stirring at room temperature for 10 hours. To the reaction solution was added ethyl acetate and the resulting solution was washed with water. The organic layer was extracted and concentrated, and the polymer obtained was reprecipitated from hexane to obtain 19 g of Perfluoreolefin copolymer (1). The refractive index and weight average molecular weight of the polymer were 1.422 and 50,000, respectively.

(Preparation of Hollow Silica Particle Dispersion A)

To 500 parts by weight of a fine particle sol of hollow silica particle (isopropyl alcohol silica sol, CS60-IPA, produced by Catalysts & Chemicals Ind. Co., Ltd., average particle size: 60 nm, shell thickness: 10 nm, silica concentration: 20% by weight, refractive index of silica particle: 1.31) were added 30 parts by weight of acryloyloxypropyltrimethoxysilane and 1.51 parts by weight of diisopropoxyaluminum ethyl acetate to mix, and 9 parts by weight of ion-exchanged water was added thereto. After reacting at 60° C. for 8 hours, the reaction mixture was cooled to room temperature, and 1.8 parts by weight of acetyl acetone was added thereto to obtain a dispersion. Then, solvent replacement was conducted by reduced-pressure distillation under a pressure of 30 Torr while adding cyclohexanone so as to keep the silica content almost constant, and the concentration was finally adjusted to obtain Dispersion A having a solid content concentration of 18.2% by weight. The remaining amount of IPA (isopropyl alcohol) in Dispersion A obtained was analyzed by gas chromatography and found to be 0.5% by weight or less.

(Preparation of Coating Solution for Low Refractive Index Layer)

Each of the components was mixed as shown in Table 1 below and dissolved in methyl ethyl ketone to prepare each of Coating solutions Ln1 to Ln9 for low refractive index layer having a solid content concentration of 5% by weight.

TABLE 1

Composition of Coating Solution

| Coating Solution No. | Content of P-1 (% by weight) | Antifouling Agent Kind | Antifouling Agent % by Weight | Polyfunctional Monomer Kind | Polyfunctional Monomer % by Weight | Polyfunctional Monomer Kind | Polyfunctional Monomer % by Weight | Initiator Kind | Initiator % by Weight | Hollow Silica Dispersion Kind | Hollow Silica Dispersion % by Weight |
|---|---|---|---|---|---|---|---|---|---|---|---|
| Ln 1 | 15 | A-1  | 5 | M-1 | 20 | DPHA | 7 | Irg127 | 3 | Dispersion A | 50 |
| Ln 2 | 15 | A-16 | 5 | M-1 | 20 | DPHA | 7 | Irg127 | 3 | Dispersion A | 50 |
| Ln 3 | 15 | A-7  | 5 | M-1 | 20 | DPHA | 7 | Irg127 | 3 | Dispersion A | 50 |
| Ln 4 | 15 | A-13 | 5 | M-1 | 20 | DPHA | 7 | Irg127 | 3 | Dispersion A | 50 |
| Ln 5 | 15 | A-26 | 5 | M-1 | 20 | DPHA | 7 | Irg127 | 3 | Dispersion A | 50 |
| Ln 6 | 15 | A-28 | 5 | M-1 | 20 | DPHA | 7 | Irg127 | 3 | Dispersion A | 50 |
| Ln 7 | 15 | AC-1 | 5 | M-1 | 20 | DPHA | 7 | Irg127 | 3 | Dispersion A | 50 |
| Ln 8 | 15 | AC-2 | 5 | M-1 | 20 | DPHA | 7 | Irg127 | 3 | Dispersion A | 50 |
| Ln 9 | 15 | AC-3 | 5 | M-1 | 20 | DPHA | 7 | Irg127 | 3 | Dispersion A | 50 |

As the antifouling agent Compound (A-1), (A-7), (A-13), (A-16), (A-26), (A-28), (AC-1), (AC-2) or (AC-3) was used. Compounds (A-1), (A-7), (A-13), (A-16), (A-26) and (A-28) are described hereinbefore.

Compound (AC-1) is Compound 1 described in JP-A-2009-256597, Compound (AC-2) is Fluorine compound (3) described in Japanese Patent No. 4,556,151, and Compound (AC-3) is Compound B-5 described in JP-A-2009-29979.

As described hereinbefore Compound 1 described in JP-A-2009-256597 has in fact the structure shown by (AC-1').

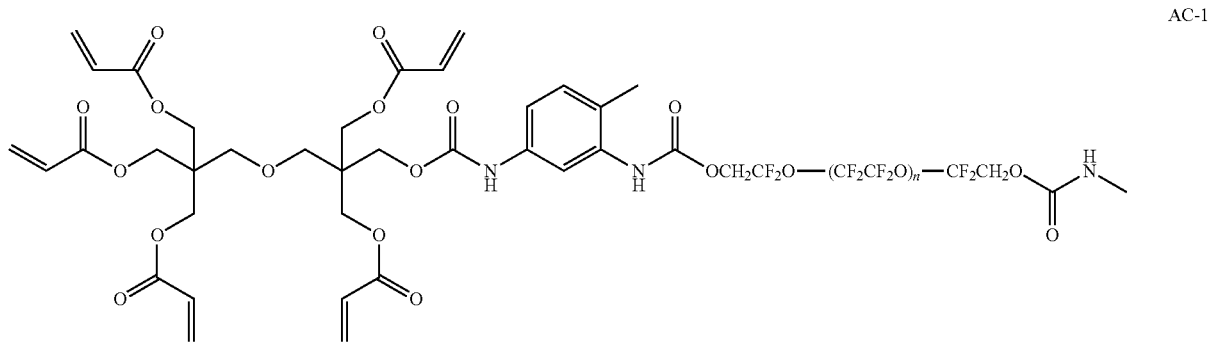

AC-1

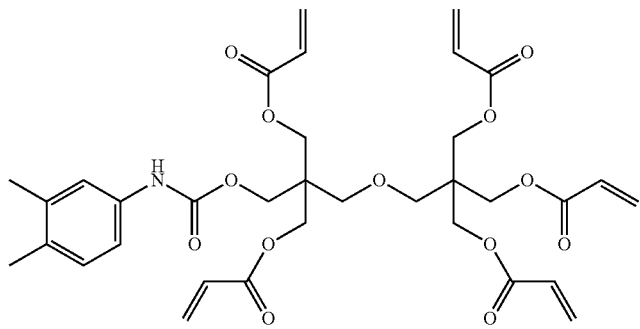

$n = 10\sim15$

AC-1'
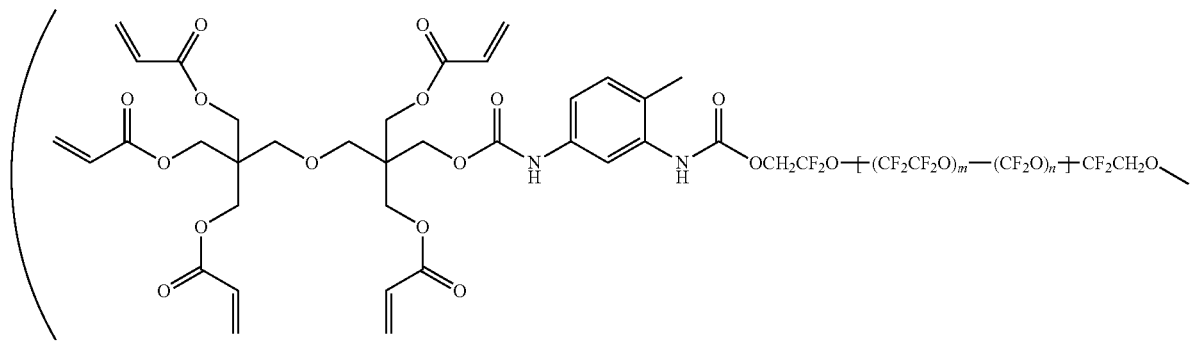
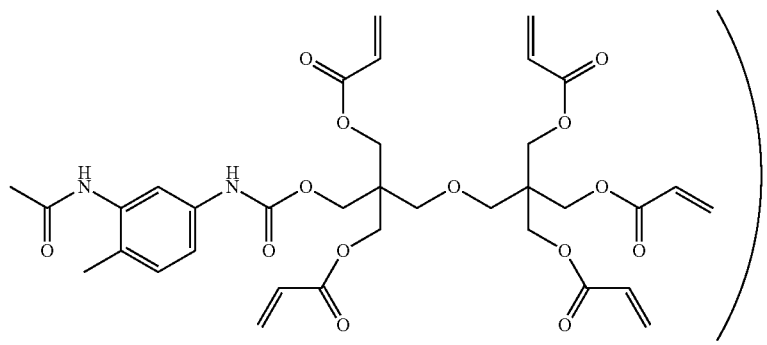
Average value of *m* is 8 and average value of *n* is 5.
AC-2
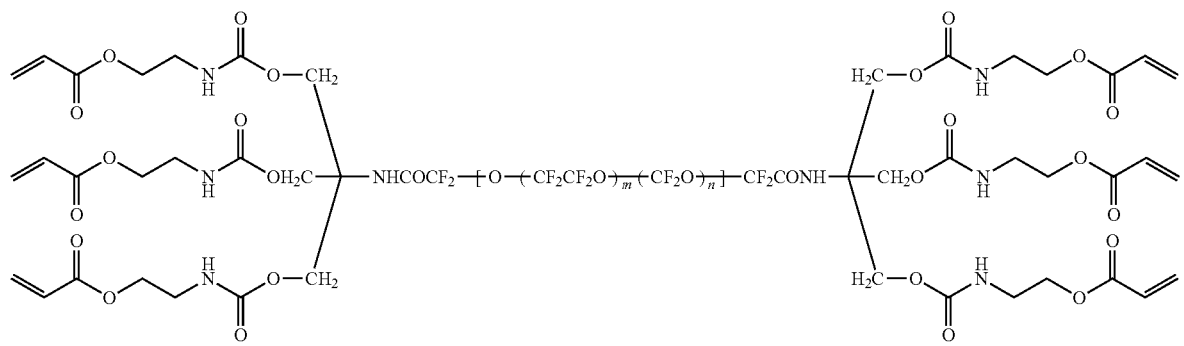
Average value of *m* is 8 and average value of *n* is 5.
AC-3
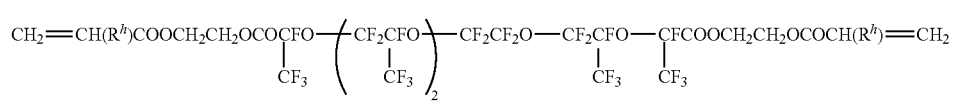
$R^h$ represents a hydrogen atom.

The other compounds used are shown below.
P-1: Perfluoroolefin copolymer (1) described above
DPHA: Mixture of dipentaerythritol pentaacrylate and dipentaerythritol hexaacrylate (produced by Nippon Kayaku Co., Ltd.)
Dispersion A: Hollow silica particle dispersion A described above (hollow silica particle sol surface-modified with acryloyloxypropyltrimethoxysilane, solid content concentration: 18.2% by weight)
Irg127: Photopolymerization initiator (Irgacore 127, produced by Ciba Specialty Chemicals Corp.) M-1: Fluorine-containing polyfunctional acrylate (fluorine content ratio; 44.9% by weight, tetrafunction) shown below

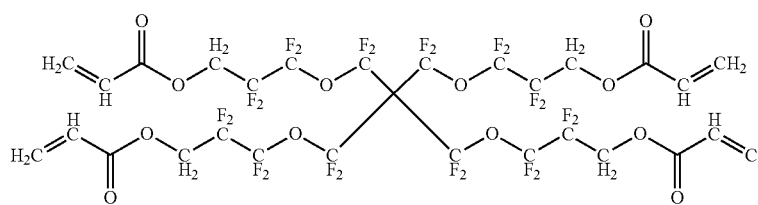

(Production of Hardcoat Layer A)

On a triacetyl cellulose film (TD60UL, produced by Fujifilm Corp., refractive index: 1.48) having a thickness of 60 μm as a transparent support, Coating solution A for hardcoat layer described above was coated using a gravure coater and dried at 100° C. Then, the coated layer was cured by irradiating an ultraviolet ray at an illuminance of 400 m W/cm$^2$ and an irradiation dose of 150 mJ/cm$^2$ using an air-cooled metal halide lamp (produced by Eye Graphics Co., Ltd.) of 160 W/cm while purging with nitrogen so as to give an atmosphere having an oxygen concentration of 1.0% by volume or less, whereby Hardcoat layer A having a thickness of 10 μm was formed.

On Hardcoat Layer A were coated the coating solution for medium refractive index layer, the coating solution for high refractive index layer and the coating solution for low refractive index layer each prepared so as to have the desired refractive index using a gravure coater. The refractive index of each layer was measured by Multi-wavelength Abbe Refractometer DR-M2 (produced by ATAGO Co., Ltd.) after coating the coating solution for each layer on a glass plate so as to have a thickness of about 4 μm. A refractive index measured using a filter, Interference Filter 546(e) nm for DR-M2, M4, RE-3523, was employed as the refractive index at a wavelength of 550 nm.

The thickness of each layer was determined using Reflective Film Thickness Monitor FE-3000 (produced by Otsuka Electronics Co., Ltd.) after stacking the medium refractive index layer, the high refractive index layer and the low refractive index layer. As the refractive index of each layer in the determination, the value obtained by the Abbe Refractometer described above was used.

The drying conditions of the medium refractive index layer were 90° C. and 30 seconds, and the ultraviolet ray curing conditions were such that an air-cooled metal halide lamp (produced by Eye Graphics Co., Ltd.) of 180 W/cm was used at an illuminance of 300 mW/cm$^2$ and an irradiation dose of 240 mJ/cm$^2$ while purging with nitrogen so as to give an atmosphere having an oxygen concentration of 1.0% by volume or less.

The drying conditions of the high refractive index layer were 90° C. and 30 seconds, and the ultraviolet ray curing conditions were such that an air-cooled metal halide lamp (produced by Eye Graphics Co., Ltd.) of 240 W/cm was used at an illuminance of 300 mW/cm$^2$ and an irradiation dose of 240 mJ/cm$^2$ while purging with nitrogen to give an atmosphere having an oxygen concentration of 1.0% by volume or less.

(Production of Low Refractive Index Layer)

The drying conditions of the low refractive index layer were 90° C. and 30 seconds, and the ultraviolet ray curing conditions were such that an air-cooled metal halide lamp (produced by Eye Graphics Co., Ltd.) of 240 W/cm was used at an illuminance of 600 mW/cm$^2$ and an irradiation dose of 600 mJ/cm$^2$ while purging with nitrogen to give an atmosphere having an oxygen concentration of 0.1% by volume or less.

The coating solution, refractive index and layer thickness of each layer used for the production of the antireflective film for Examples 1 to 6 and Comparative Examples 1 to 3 produced in the manner as described above are shown in Table 2.

TABLE 2

| | | Hardcast Layer | | Medium Refractive Index Layer | | | High Refractive Index Layer | | | Low Refractive Index Layer | | |
|---|---|---|---|---|---|---|---|---|---|---|---|---|
| | Base Material | Coating Solution | Layer Thickness (μm) | Coating Solution | Refractive Index | Layer Thickness (μm) | Coating Solution | Refractive Index | Layer Thickness (μm) | Coating Solution | Refractive Index | Layer Thickness (μm) |
| Example 1 | TD60UL | A | 10 | C | 1.62 | 60 | A | 1.72 | 110 | Ln 1 | 1.36 | 94 |
| Example 2 | TD60UL | A | 10 | C | 1.62 | 60 | A | 1.72 | 110 | Ln 2 | 1.36 | 94 |
| Example 3 | TD60UL | A | 10 | C | 1.62 | 60 | A | 1.72 | 110 | Ln 3 | 1.36 | 94 |
| Example 4 | TD60UL | A | 10 | C | 1.62 | 60 | A | 1.72 | 110 | Ln 4 | 1.36 | 94 |
| Example 5 | TD60UL | A | 10 | C | 1.62 | 60 | A | 1.72 | 110 | Ln 5 | 1.36 | 94 |
| Example 6 | TD60UL | A | 10 | C | 1.62 | 60 | A | 1.72 | 110 | Ln 6 | 1.36 | 94 |

TABLE 2-continued

|  | Base Material | Hardcast Layer | | Medium Refractive Index Layer | | | High Refractive Index Layer | | | Low Refractive Index Layer | | |
|---|---|---|---|---|---|---|---|---|---|---|---|---|
|  |  | Coating Solution | Layer Thickness (μm) | Coating Solution | Refractive Index | Layer Thickness (μm) | Coating Solution | Refractive Index | Layer Thickness (μm) | Coating Solution | Refractive Index | Layer Thickness (μm) |
| Comparative Example 1 | TD60UL | A | 10 | C | 1.62 | 60 | A | 1.72 | 110 | Ln 7 | 1.38 | 94 |
| Comparative Example 2 | TD60UL | A | 10 | C | 1.62 | 60 | A | 1.72 | 110 | Ln 8 | 1.37 | 94 |
| Comparative Example 3 | TD60UL | A | 10 | C | 1.62 | 60 | A | 1.72 | 110 | Ln 9 | 1.37 | 94 |

[Evaluation of Antireflective Film]

Various performances of the antireflective film were evaluated according to the methods described below. The results obtained are shown in Table 3.

(1) Evaluation of Steel Wool Scratch Resistance (SW Resistance)

The scratch resistance was evaluated by conducting a rubbing test under the conditions shown below using a rubbing tester.

Environmental conditions for evaluation: 25° C., 60% RH

Rubbing material: Steel wool (Grade No. 0000, produced by Nippon Steel Wool Co., Ltd.) wound around the rubbing tip (1×1 cm) of the tester in contact with the sample and fixed by a band Moving distance (one way): 13 cm Rubbing speed: 13 cm/sec Load: 500 g/cm$^2$ Contact area at the tip: 1×1 cm Number of times of rubbing: 10 reciprocations Oil-based black ink was applied to the rear side of the sample of antireflective film after the rubbing, and the scratch mark in the rubbed portion was visually observed with reflected light and evaluated according to the criteria shown below.

A: Scratch mark is not found at all even when observed extremely carefully.

B: Slight weak scratch mark is found when observed extremely carefully.

C: Weak scratch mark is found.

D: Scratch mark of medium degree is found.

E: Scratch mark is recognizable at a glance.

(2) Fingerprint Wipe-Off Property 1.

Oil-based black ink was applied to the rear side of the sample of antireflective film, and a finger was pressed on the coated surface thereby attaching a fingerprint. The fingerprint attached was wiped off with ten reciprocations with a tissue paper, and the remaining trace of the fingerprint attached was observed and evaluated according to the criteria shown below.

A: The trace of the fingerprint attached is not completely found.

B: A small trace of the fingerprint attached is found, but is not noticeable.

C: The trace of the fingerprint attached is found, and is noticeable.

D: The wipe-off trace of the fingerprint attached can be clearly recognized, and is noticeable.

E: The fingerprint attached can not be wiped off.

(3) Fingerprint Wipe-Off Property 2

Oil-based black ink was applied to the rear side of the sample of antireflective film, and a finger was pressed on the coated surface thereby attaching a fingerprint. The fingerprint attached was wiped off with a tissue paper, and a number of times of wiping-off repetition (reciprocations) performed until the remaining trace of the fingerprint attached completely disappeared was evaluated. The complete disappearance with a smaller number of times of repetition is preferred.

(4) Antifouling Durability

The film was fixed on a glass surface with an adhesive, and a circle of 5 mm in diameter was written thereon in three turns with a pen tip (fine) of a black magic marker (MACKY GOKUBOSO, trade name, produced by ZEBRA Co.) under the conditions of 25° C. and 60% RH. After 10 seconds, the circle was wiped off with a 10-ply folded and bundled BENCOT (trade name, produced by Asahi Kasei Corp.) by moving the bundle back and forth 2 times under a load large enough to make a dent in the BENCOT bundle. The writing and wiping were repeated under the above-described conditions until the magic marker stain could not be eliminated by the wiping, and thus the antifouling durability could be evaluated by a number of times of repetition taken to wipe off the magic marker stain. The number of times of repetition until the marker stain cannot be eliminated is preferably 10 or more, and more preferably 15 or more.

(5) Average Reflectivity

The antireflection property was evaluated by mounting an adapter ARV474 on a spectrophotometer V-550 (produced by JASCO Corp.), measuring the specular reflectivity for the outgoing angle of 5° at an incident angle of 5° in the wavelength region of 380 to 780 nm, and calculating the average reflectivity at 450 to 650 nm.

(6) Relative Surface Free Energy

A contact angle meter (Contact Angle Meter CA-X, produced by Kyowa Interface Science Co., Ltd.) was used in the dry atmosphere (20° C./65% RH). Using pure water as liquid, a droplet of pure water having a diameter of 1.0 mm was made at the tip of stylus and brought into contact with a film surface, thereby making the droplet on the film surface. The contact angle was defined as an angle that the line tangent to the liquid surface at a film-liquid contact point forms with the film surface on the side including the liquid and measured. Further, using methylene iodide instead of water, the contact angle was measured, and the surface free energy was determined by the formula shown below.

The surface free energy ($\gamma s^v$: unit, mN/m) was defined as a value $\gamma s^v$ ($=\gamma s^d + \gamma s^h$) expressed as a sum of $\gamma s^d$ and $\gamma s^h$ determined by the simultaneous equations a and b shown below using the contact angles $\theta_{H2O}$ and $\theta_{CH2I2}$ of pure water $H_2O$ and methylene iodide $CH_2I_2$ as determined experimentally on the antireflective film, with reference to D. K. Owens, *J. Appl. Polym., Sci.*, 13, 1741 (1969).

$$1+\cos\theta_{H2O} = 2\sqrt{\gamma s^d}(\sqrt{\gamma_{H2O}^d/\gamma_{H2O}^v}) + 2\sqrt{\gamma s^h}(\sqrt{\gamma_{H2O}^h/\gamma_{H2O}^v}) \quad \text{a.}$$

$$1+\cos\theta_{CH2I2} = 2\sqrt{\gamma s^d}(\sqrt{\gamma_{CH2I2}^d/\gamma_{CH2I2}^v}) + 2\sqrt{\gamma s^h}(\sqrt{\gamma_{CH2I2}^h/\gamma_{CH2I2}^v}) \quad \text{b.}$$

$\gamma_{H2O}^d = 21.8$, $\gamma_{H2O}^h = 51.0$, $\gamma_{H2O}^v = 72.8$,
$\gamma_{CH2I2}^6 = 49.5$, $\gamma_{CH2I2}^h = 1.3$, $\gamma_{CH2I2}^v = 50.8$ With respect to the surface free energies determined in Examples 1 to 6 and Comparative Examples 1 to 3, the surface free energies of the antireflective films of Examples 1 to 6 and Comparative Examples 2 and 3 are shown in Table 3 below as relative values, taking the surface free energy of the antireflective film of Comparative Examples 1 as 100.

The evaluation results are shown in Table 3.

TABLE 3

|  | Antifouling Agent | SW Resistance | Relative Surface Free Energy | Antifouling Durability (number of times) | Fingerprint Wipe-off Property 1 | Fingerprint Wipe-off Property 2 (number of times) | Average Reflectivity (%) | Refractive Index |
|---|---|---|---|---|---|---|---|---|
| Example 1 | A-1 | A | 90 | 15 | B | 5 | 1.15 | 1.36 |
| Example 2 | A-16 | A | 90 | 15 | B | 4 | 1.15 | 1.36 |
| Example 3 | A-7 | A | 80 | 20 | A | 2 | 1.15 | 1.36 |
| Example 4 | A-13 | A | 80 | 22 | A | 2 | 1.11 | 1.36 |
| Example 5 | A-26 | A | 80 | 22 | A | 2 | 1.14 | 1.36 |
| Example 6 | A-28 | A | 80 | 21 | A | 2 | 1.14 | 1.36 |
| Comparative Example 1 | AC-1 | A | 100 | 10 | C | 10 | 1.20 | 1.38 |
| Comparative Example 2 | AC-2 | A | 100 | 12 | C | 10 | 1.20 | 1.37 |
| Comparative Example 3 | AC-3 | B | 100 | 9 | D | >30 | 1.15 | 1.37 |

As is apparent from the results shown in Table 3, Comparative Examples 1 to 3 using the antifouling agent outside the scope of formula (I) exhibit the high refractive index of the low refractive index layer, high relative surface free energy and low antifouling durability, and are also poor in the fingerprint wipe-off property.

On the other hand, it can be seen that Examples 1 to 6 using the compound (A) represented by formula (I) exhibit the low refractive index of the low refractive index layer, low relative surface free energy and high antifouling durability, and are also excellent in the fingerprint wipe-off property.

It can also be seen that the effect of improving the visibility is obtained in Examples 1 to 6, although the difference of the average reflectivity between Examples 1 to 6 and Comparative Examples 1 and 2 is small (for example, the difference is 0.05% between Example 1 and Comparative Example 1).

<Synthesis Example 2: Synthesis of Compound (A) Represented by any of Formulae (I-1) to (I-5)>

(Synthesis of Compound (A-32))

Compound (A-32) was prepared according to the synthesis scheme shown below,

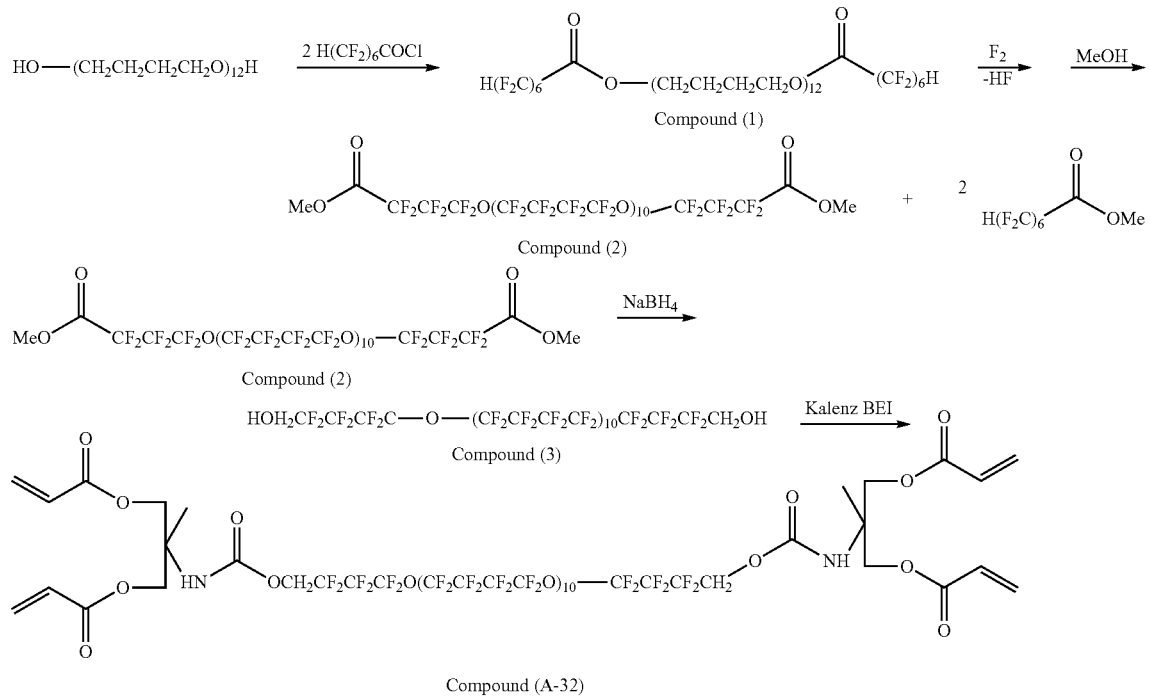

Compound (A-32)

(Step 1)

To a mixture of 70 g of polytetramethylele oxide 650 obtained by ring-opening polymerization based on *Alkyleneoxide Jugotai* (*Alkyleneoxide polymer*), co-edited by Mitsuta Shibata, Masahiro Saito and Shinichi Akimoto (Kaibundo Publishing Co., Ltd.), 400 ml of ethyl acetate and 240 ml of pyridine was added 80.2 g of 7H-dodecafluoroheptanoyl chloride at 0° C. with stirring and the mixture was returned to room temperature (25° C.), followed by stirring as it was for 4 hours. The reaction solution was diluted with 150 ml of ethyl acetate and 350 ml of hexane and then washed with 1 N hydrochloric acid, water, sodium bicarbonate water, and a saturated saline solution. The solution was dried on magnesium sulfate and concentrated to obtain Compound (1), The yield was 133.1 g (98.0%).

(Step 2)

In a reaction vessel made of fluororesin were charged 300 ml of a fluorine-containing solvent (FLUORINERT FC-72, produced by 3M Co.) and 45 g of sodium fluoride and the reaction vessel was placed in a bath of 0° C. under helium atmosphere. At an outlet of the reaction vessel, a packed bed of sodium fluoride pellet and a condenser maintained at −40° C. were installed in series. After introducing helium gas into the reaction vessel at a flow rate of 250 ml/min for one hour, 20% fluorine gas diluted with nitrogen gas (hereinafter, also referred to as diluted fluorine gas) was introduced into the reaction vessel at a flow rate of 250 ml/min for 10 minutes. While introducing the diluted helium gas into the reaction vessel at a flow rate of 250 ml/min, a solution containing 6.0 g of Compound (1), 36 g of a fluorine-containing solvent (ASAHI CLEAN AK-225, produced by Asahi Glass Co., Ltd.) and 0.15 g of hexafluorobenzene was added to the reaction vessel at a rate of 5.2 ml/hour. After the completion of the addition, the diluted helium gas was introduced into the reaction vessel at a flow rate of 250 ml/min for 15 minutes. Then, while introducing the diluted helium gas into the reaction vessel at a flow rate of 250 ml/min, 10 ml of hexafluorobenzene was added to the reaction vessel at a rate of 10 ml/hour. After the completion of the addition, the diluted helium gas was introduced into the reaction vessel at a flow rate of 250 ml/min for 1.5 minutes and then helium gas was introduced into the reaction vessel at a flow rate of 250 ml/min for one hour to expel the remaining fluorine gas in the reaction vessel. It was confirmed by GC and GC-MS analysis that the perfluorination had completely proceeded.

After removing the solid from the reaction solution by filtration, the filtrate was put into a glass reaction vessel, 122 g of sodium fluoride was added thereto and while stirring at room temperature, 300 ml of methanol was dropwise added thereto. After stirring for 2.5 hours, the solid was removed by filtration and the filtrate was concentrated at normal pressure. The purification was conducted by distillation under reduced pressure to obtain Compound (2). The yield was 4.97 g (52.0%).

(Step 3)

To a mixture of 3 g of Compound (2) (methyl ester compound) and 10 ml of Nonafluorobutyl methyl ether was added 0.1 g of sodium tetrahydroborate at 0° C. with stirring and the mixture was returned to room temperature, followed by stirring for 2 hours. The reaction solution was washed with 6 N hydrochloric acid, water, sodium bicarbonate water and a saturated saline water. The solution was dried on magnesium sulfate and concentrated to obtain Compound (3). The yield was 2.4 g (80.5%).

(Step 4)

A mixture of 2.8 g of Compound (3) (alcohol compound), 4 ml of nonafluorobutyl methyl ether, 0.8 g of KARENZ BEI (produced by Showa Denko K. K.), 0.2 mg of 4-methoxyphenol and 1.0 mg of tin (IV) dibutyl dilaurate was stirred at 70° C. for 4 hours. After the completion of the reaction, 3.5 ml of nonafluorobutyl methyl ether was added thereto to obtain a 20% by weight solution of the desired Compound (A-32).

Compound (A-41), Compound (A-43), Compound (A-34), Compound (A-35), Compound (A-51), Compound (A-52), Compound (A-53), Compound (A-54), Compound (A-56), Compound (A-57) and Compound (A-58) were obtained in the same manner as in Synthesis of Compound (A-32).

Examples 7 to 18 and Comparative Examples 4 to 6

[Production of Antireflective Film]

Preparation of a coating solution for forming each layer and formation of each layer were conducted in the manner shown below to produce each of the antireflective films of Examples 7 to 18 and Comparative Examples 4 to 6.

(Preparation of Coating Solution A for Hardcoat Layer)

The composition shown below was charged into a mixing tank and the mixture was stirred to prepare a coating solution for hardcoat layer.

To 900 parts by weight of methyl ethyl ketone were added 100 parts by weight of cyclohexanone, 750 parts by weight of partially caprolactone-modified polyfunctional acrylate (DPCA-20, produced by Nippon Kayaku Co., Ltd.), 200 parts by weight of a silica sol (MIBK-ST, produced by Nissan Chemical Industries, Ltd.) and 50 parts by weight of a photopolymerization initiator (IRGACURE 184, produced by Ciba Specialty Chemicals Corp.), followed by stirring. The mixture was filtered through a polypropylene filter having a pore size of 0.4 μm to prepare Coating solution A for hardcoat layer.

(Preparation of Coating Solution A for Medium Refractive Index Layer)

To 5.1 parts by weight of a $ZrO_2$ fine particle-containing hardcoat agent (DESOLITE Z7404 [refractive index: 1.72, solid content concentration: 60% by weight, content of zirconium oxide fine particle: 70% by weight (based on solid content), average particle size of zirconium oxide fine particle: about 20 nm, solvent composition: methyl isobutyl ketone/methyl ethyl ketone=9/1, produced by JSR Corp.]) were added 1.5 parts by weight of a mixture (DPHA) of dipentaerythritol pentaacrylate and dipentaerythritol hexaacrylate, 0.05 parts by weight of a photopolymerization initiator (IGRGACURE 907, produced by Ciba Specialty Chemicals Corp.), 66.6 parts by weight of methyl ethyl ketone, 7.7 parts by weight of methyl isobutyl ketone and 19.1 parts by weight of cyclohexanone, followed by stirring. The mixture was thoroughly stirred and then filtered through a polypropylene filter having a pore size of 0.4 μm to prepare Coating solution A for medium refractive index layer.

(Preparation of Coating Solution B for Medium Refractive Index Layer)

A mixture of 4.5 parts by weight of a mixture (DPHA) of dipentaerythritol pentaacrylate and dipentaerythritol hexaacrylate, 0.14 parts by weight of a photopolymerlzation initiator (IRGACURE 907, produced by Ciba Specialty Chemicals Corp.), 66.5 parts by weight of methyl ethyl ketone, 9.5 parts by weight of methyl isobutyl ketone and 19.0 parts by weight of cyclohexanone was thoroughly stirred and then filtered through a polypropylene filter having a pore size of 0.4 μm to prepare Coating solution B for medium refractive index layer.

Coating solution C for medium refractive index layer was prepared by mixing Coating solution A for medium refractive index layer and Coating solution 8 for medium refractive index layer in appropriate amounts so as to provide the refractive index of each sample shown in Table 5 below.

(Preparation of Coating Solution A for High Refractive Index Layer)

To 15.7 parts by weight of a ZrO$_2$ fine particle-containing hardcoat agent (DESOLITE Z7404 [refractive index: 1.72, solid content concentration: 60% by weight, content of zirconium oxide fine particle: 70% by weight (based on solid content), average particle size of zirconium oxide fine particle: about 20 nm, solvent composition: methyl isobutyl ketone/methyl ethyl ketone=9/1, produced by JSR Corp.]) were added 61.9 parts by weight of methyl ethyl ketone, 3.4 parts by weight of methyl isobutyl ketone and 1.1 parts by weight of cyclohexanone, followed by stirring, The mixture was filtered through a polypropylene filter having a pore size of 0.4 μm to prepare Coating solution A for high refractive index layer.

(Preparation of Coating Solution for Low Refractive Index Layer)
(Synthesis of Perfluoroolefin Copolymer (1))

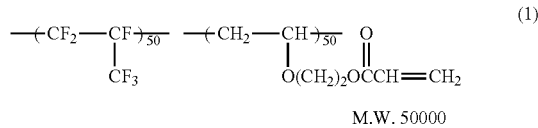

M.W. 50000

In the structural formula above, 50:50 indicates a molar ratio.

In a stainless steel autoclave having an inner volume of 100 ml equipped with a stirrer were charged 40 ml of ethyl acetate, 14.7 g of hydroxyethyl vinyl ether and 0.55 g of dilauroyl peroxide and the inside of the system was degassed and displaced with nitrogen gas. Further, 25 g of hexafluoropropylene (HFP) was introduced into the autoclave and the temperature was raised to 65° C. The pressure when the temperature in the autoclave reached 65° C. was 0.53 MPa (5.4 kg/cm$^2$). The reaction was continued for 8 hours while maintaining the temperature and when the pressure reached 0.31 MPa (3.2 kg/cm$^2$), the heating was terminated and the system was allowed to cool. At the time when the inner temperature decreased to room temperature, the unreacted monomer was expelled, and the autoclave was opened to take out the reaction solution. The reaction solution was poured into a large excess of hexane and the solvent was removed by decantation to obtain the polymer precipitated. The polymer was dissolved in a small amount of ethyl acetate and subjected to reprecipitation twice from hexane to completely remove the residual monomer. After drying, 28 g of the polymer was obtained. Subsequently, 20 g of the polymer was dissolved in 100 ml of N,N-dimethylacetamide, and 11.4 g of acrylic chloride, was dropwise added thereto under ice cooling, followed by stirring at room temperature for 10 hours. To the reaction solution was added ethyl acetate and the resulting solution was washed with water. The organic layer was extracted and concentrated, and the polymer obtained was reprecipitated from hexane to obtain 19 g of Perfluoroolefin copolymer (1). The refractive index and weight average molecular weight of the polymer were 1.422 and 50,000, respectively.

(Preparation of Hollow Silica Particle Dispersion A)

To 500 parts by weight of a fine particle sol of hollow silica particle (isopropyl alcohol silica sol, CS60-IPA, produced by Catalysts & Chemicals Ind. Co., Ltd., average particle size: 60 nm, shell thickness: 10 nm, silica concentration: 20% by weight, refractive index of silica particle: 1.31) were added 30 parts by weight of acryloyloxypropyltrimethoxysilane and 1.51 parts by weight of diisopropoxyaluminum ethyl acetate to mix, and 9 parts by weight of ion-exchanged water was added thereto. After reacting at 60° C. for 8 hours, the reaction mixture was cooled to room temperature, and 1.8 parts by weight of acetyl acetone was added thereto to obtain a dispersion. Then, solvent replacement was conducted by reduced-pressure distillation under a pressure of 30 Torr while adding cyclohexanone so as to keep the silica content almost constant and the concentration was finally adjusted to obtain Dispersion A having a solid content concentration of 18.2% by weight The remaining amount of IPA (isopropyl alcohol) in Dispersion A obtained was analyzed by gas chromatography and found to be 0.5% by weight or less.

(Preparation of Coating Solution for Low Refractive Index Layer)

Each of the components was mixed as shown in Table 4 below and dissolved in methyl ethyl ketone to prepare each of Coating solutions Ln10 to Ln24 for low refractive index layer having a solid content concentration of 5% by weight.

TABLE 4

| | | Composition of Coating Solution | | | | | | | | |
|---|---|---|---|---|---|---|---|---|---|---|
| | Content of | Antifouling Agent | | Polyfunctional Monomer | | Initiator | | Hollow Silica Dispersion | | |
| Coating Solution No. | P-1 (% by weight) | Kind | % by Weight | Kind | % by Weight | Kind | % by Weight | Kind | % by Weight | Kind % by Weight |
| Ln 10 | 15 | A-41 | 5 | M-1 | 20 | DPHA | 7 | Irg127 | 3 | Dispersion A 50 |
| Ln 11 | 15 | A-32 | 5 | M-1 | 20 | DPHA | 7 | Irg127 | 3 | Dispersion A 50 |
| Ln 12 | 15 | A-43 | 5 | M-1 | 20 | DPHA | 7 | Irg127 | 3 | Dispersion A 50 |
| Ln 13 | 15 | A-34 | 5 | M-1 | 20 | DPHA | 7 | Irg127 | 3 | Dispersion A 50 |
| Ln 14 | 15 | A-35 | 5 | M-1 | 20 | DPHA | 7 | Irg127 | 3 | Dispersion A 50 |
| Ln 15 | 15 | A-51 | 5 | M-1 | 20 | DPHA | 7 | Irg127 | 3 | Dispersion A 50 |
| Ln 16 | 15 | A-52 | 5 | M-1 | 20 | DPHA | 7 | Irg127 | 3 | Dispersion A 50 |
| Ln 17 | 15 | A-53 | 5 | M-1 | 20 | DPHA | 7 | Irg127 | 3 | Dispersion A 50 |
| Ln 18 | 15 | A-54 | 5 | M-1 | 20 | DPHA | 7 | Irg127 | 3 | Dispersion A 50 |
| Ln 19 | 15 | A-56 | 5 | M-1 | 20 | DPHA | 7 | Irg127 | 3 | Dispersion A 50 |
| Ln 20 | 15 | A-57 | 5 | M-1 | 20 | DPHA | 7 | Irg127 | 3 | Dispersion A 50 |
| Ln 21 | 15 | A-58 | 5 | M-1 | 20 | DPHA | 7 | Irg127 | 3 | Dispersion A 50 |
| Ln 22 | 15 | AC-1 | 5 | M-1 | 20 | DPHA | 7 | Irg127 | 3 | Dispersion A 50 |
| Ln 23 | 15 | AC-2 | 5 | M-1 | 20 | DPHA | 7 | Irg127 | 3 | Dispersion A 50 |
| Ln 24 | 15 | AC-3 | 5 | M-1 | 20 | DPHA | 7 | Irg127 | 3 | Dispersion A 50 |

As the antifouling agent, Compound (A-32), (A-34), (A-35), (A-41), (A-43), (A-51), (A-52), (A-53), (A-54), (A-56), (A-57), (A-58), (AC-1), (AC-2) or (AC-3) was used. Compounds (A-32), (A-34), (A-35), (A-41), (A-43), (A-51), (A-52), (A-53), (A-54), (A-56), (A-57) and (A-58) are described hereinbefore.

Compound (AC-1) is Compound 1 described in JP-A-2009-256597, Compound (AC-2) is Fluorine compound (3) described in Japanese Patent No. 4,556,151, and Compound (AC-3) is Compound B-5 described In JP-A-2009-29979.

Compound 1 described in JP-A-2009-256597 has in fact the structure shown by (AC-1').

AC-1

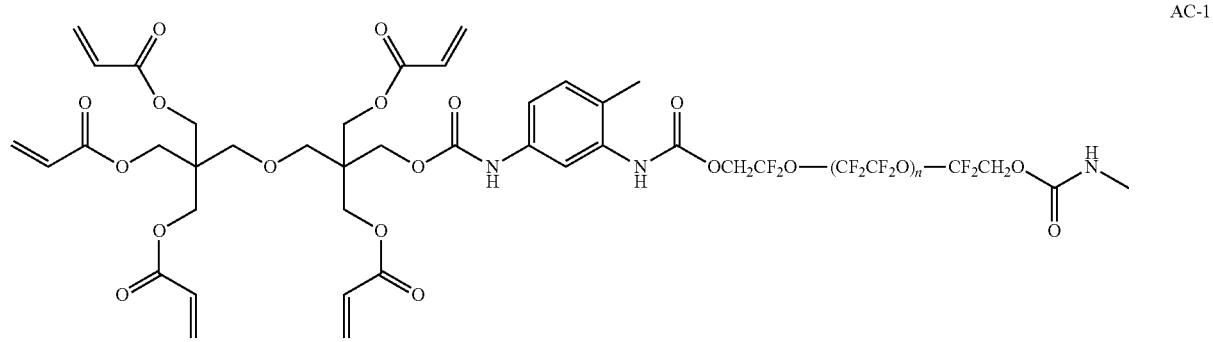

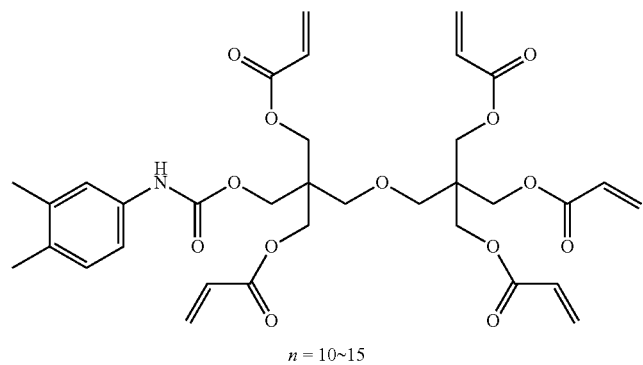

$n = 10\sim15$

AC-1'

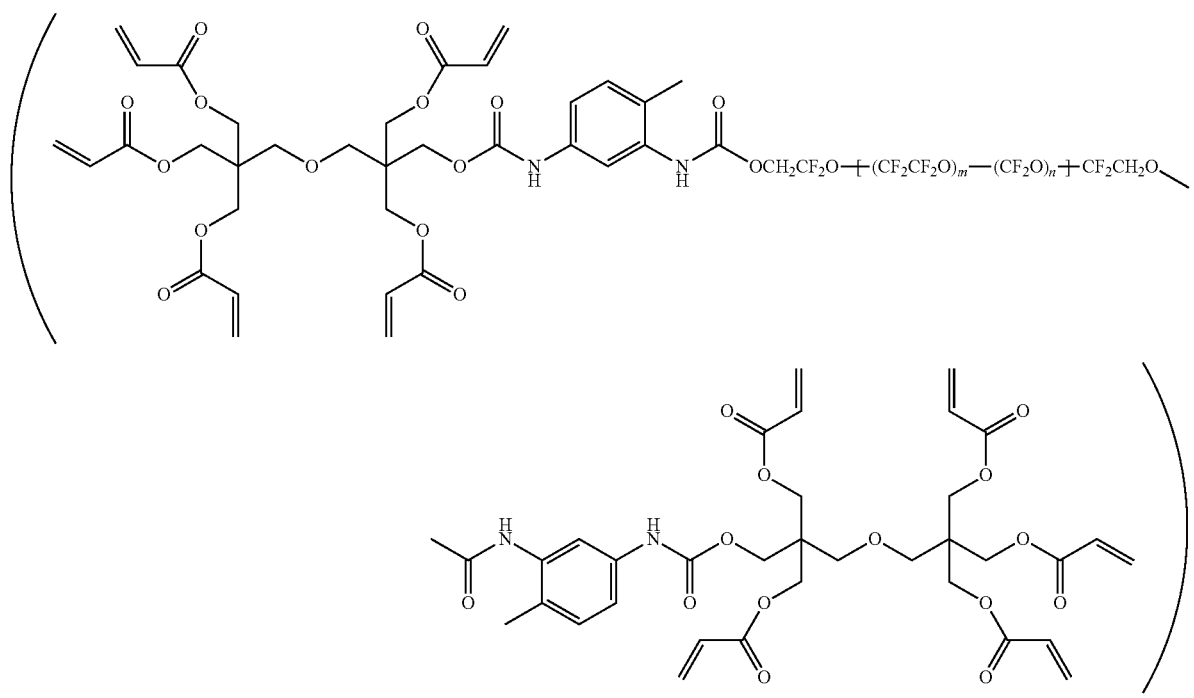

Average value of $m$ is 8 and average value of $n$ is 5.

AC-2

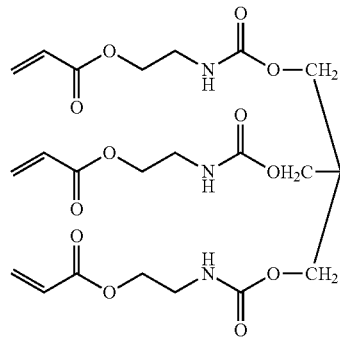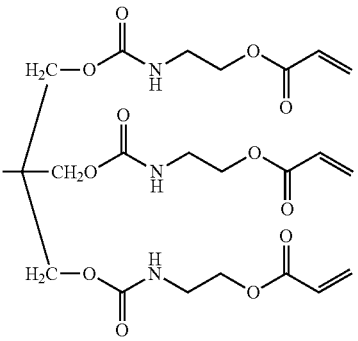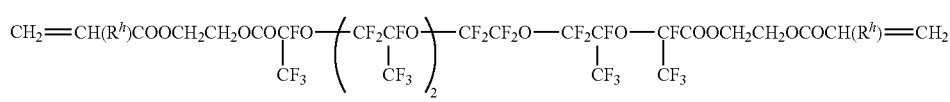

Average value of $m$ is 8 and average value of $n$ is 5.

AC-3

$CH_2=CH(R^h)COOCH_2CH_2OCOCFO-(CF_2CFO)_2-CF_2CF_2O-CF_2CFO-CFCOOCH_2CH_2OCOCH(R^h)=CH_2$
with $CF_3$ branches $R^h$ represents a hydrogen atom.

The other compounds used are shown below.
P-1: Perfluoroolefin copolymer (1) described above
DPHA: Mixture of dipentaerythritol pentaacrylate and dipentaerythritol hexaacrylate (produced by Nippon Kayaku Co., Ltd.)
Dispersion A: Hollow silica particle dispersion A described above (hollow silica particle sol surface-modified with acryloyloxypropyltrimethoxysilane, solid content concentration: 18.2% by weight)
Irg127: Photopolymerization initiator (Irgacure 127, produced by Ciba Specialty Chemicals Corp.)
M-1; Fluorine-containing polyfunctional acrylate (fluorine content ratio: 44.9% by weight, tetrafunction) shown below

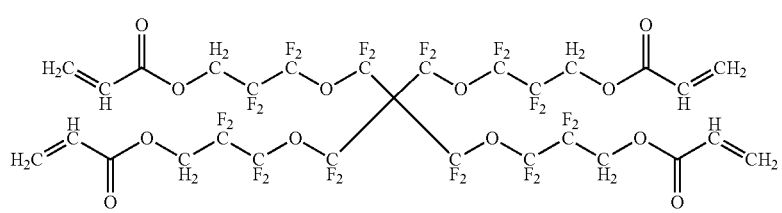

M-1

$C_f$: 44.9%

(Production of Hardcoat Layer A)

On a triacetyl cellulose film (TD60UL, produced by Fujifilm Corp., refractive index: 1.48) having a thickness of 60 μm as a transparent support, Coating solution A for hardcoat layer described above was coated using a gravure coater and dried at 100° C. Then, the coated layer was cured by irradiating an ultraviolet ray at an illuminance of 400 mW/cm² and an irradiation dose of 150 mJ/cm² using an air-cooled metal halide lamp (produced by Eye Graphics Co., Ltd.) of 160 W/cm while purging with nitrogen so as to give an atmosphere having an oxygen concentration of 1.0% by volume or less, whereby Hardcoat layer A having a thickness of 10 μm was formed.

On Hardcoat Layer A were coated the coating solution for medium refractive index layer, the coating solution for high refractive index layer and the coating solution for low refractive index layer each prepared so as to have the desired refractive index using a gravure coater. The refractive index of each layer was measured by Multi-wavelength Abbe Refractometer DR-M2 (produced by ATAGO Co., Ltd.) after coating the coating solution for each layer on a glass plate so as to have a thickness of about 4 μm. A refractive index measured using a filter, Interference filter 546(e) nm for DR-M2, M4, RE-3523, was employed as the refractive index at a wavelength of 550 nm.

The thickness of each layer was determined using Reflective Film Thickness Monitor FE-3000 (produced by Otsuka Electronics Co., Ltd.) after stacking the medium refractive index layer, the high refractive index layer and the low refractive index layer. As the refractive index of each layer in the determination, the value obtained by the Abbe Refractometer described above was used.

The drying conditions of the medium refractive index layer were 90° C. and 30 seconds, and the ultraviolet ray curing conditions were such that an air-cooled metal halide lamp (produced by Eye Graphics Co., Ltd.) of 180 W/cm was used at an illuminance of 300 mW/cm² and an irradiation dose of 240 mJ/cm² while purging with nitrogen so as to give an atmosphere having an oxygen concentration of 1.0% by volume or less.

The drying conditions of the high refractive index layer were 90° C. and 30 seconds, and the ultraviolet ray curing conditions were such that an air-cooled metal halide lamp (produced by Eye Graphics Co., Ltd.) of 240 W/cm was used at an illuminance of 300 mW/cm$^2$ and an irradiation dose of 240 mJ/cm$^2$ while purging with nitrogen to give an atmosphere having an oxygen concentration of 1.0% by volume or less.

(Production of Low Refractive Index Layer)

The drying conditions of the low refractive index layer were 90° C. and 30 seconds, and the ultraviolet ray curing conditions were such that an air-cooled metal halide lamp (produced by Eye Graphics Co., Ltd.) of 240 W/cm was used at an illuminance of 600 mW/cm$^2$ and an irradiation dose of 600 mJ/cm$^2$ while purging with nitrogen to give an atmosphere having an oxygen concentration of 0.1% by volume or less.

The coating solution, refractive index and layer thickness of each layer used for the production of the antireflective film for Examples 7 to 18 and Comparative Examples 4 to 6 produced in the manner as described above are shown in Table 5.

mark in the rubbed portion was visually observed with reflected light and evaluated according to the criteria shown below.

A: Scratch mark is not found at all even when observed extremely carefully.
B: Slight weak scratch mark is found when observed extremely carefully.
C: Weak scratch mark is found.
D: Scratch mark of medium degree is found.
E: Scratch mark is recognizable at a glance.

(2) Fingerprint Wipe-Off Property 1

Oil-based black ink was applied to the rear side of the sample of antireflective film, and a finger was pressed on the coated surface thereby attaching a fingerprint. The fingerprint attached was wiped off with ten reciprocations with a tissue paper, and the remaining trace of the fingerprint attached was observed and evaluated according to the criteria shown below.

A: The trace of the fingerprint attached is not completely found.
B: A small trace of the fingerprint attached is found, but is not noticeable.

TABLE 5

| | Base Material | Hardcoat Layer Coating Solution | Hardcoat Layer Layer Thickness (µm) | Medium Refractive Index Layer Coating Solution | Medium Refractive Index Layer Refractive Index | Medium Refractive Index Layer Layer Thickness (µm) | High Refractive Index Layer Coating Solution | High Refractive Index Layer Refractive Index | High Refractive Index Layer Layer Thickness (µm) | Low Refractive Index Layer Coating Solution | Low Refractive Index Layer Refractive Index | Low Refractive Index Layer Layer Thickness (µm) |
|---|---|---|---|---|---|---|---|---|---|---|---|---|
| Example 7 | TD60UL | A | 10 | C | 1.62 | 60 | A | 1.72 | 110 | Ln 10 | 1.36 | 94 |
| Example 8 | TD60UL | A | 10 | C | 1.62 | 60 | A | 1.72 | 110 | Ln 11 | 1.36 | 94 |
| Example 9 | TD60UL | A | 10 | C | 1.62 | 60 | A | 1.72 | 110 | Ln 12 | 1.36 | 94 |
| Example 10 | TD60UL | A | 10 | C | 1.62 | 60 | A | 1.72 | 110 | Ln 13 | 1.36 | 94 |
| Example 11 | TD60UL | A | 10 | C | 1.62 | 60 | A | 1.72 | 110 | Ln 14 | 1.36 | 94 |
| Example 12 | TD60UL | A | 10 | C | 1.62 | 60 | A | 1.72 | 110 | Ln 15 | 1.36 | 94 |
| Example 13 | TD60UL | A | 10 | C | 1.62 | 60 | A | 1.72 | 110 | Ln 16 | 1.36 | 94 |
| Example 14 | TD60UL | A | 10 | C | 1.62 | 60 | A | 1.72 | 110 | Ln 17 | 1.36 | 94 |
| Example 15 | TD60UL | A | 10 | C | 1.62 | 60 | A | 1.72 | 110 | Ln 18 | 1.36 | 94 |
| Example 16 | TD60UL | A | 10 | C | 1.62 | 60 | A | 1.72 | 110 | Ln 19 | 1.36 | 94 |
| Example 17 | TD60UL | A | 10 | C | 1.62 | 60 | A | 1.72 | 110 | Ln 20 | 1.36 | 94 |
| Example 18 | TD60UL | A | 10 | C | 1.62 | 60 | A | 1.72 | 110 | Ln 21 | 1.36 | 94 |
| Comparative Example 4 | TD60UL | A | 10 | C | 1.62 | 60 | A | 1.72 | 110 | Ln 22 | 1.38 | 94 |
| Comparative Example 5 | TD60UL | A | 10 | C | 1.62 | 60 | A | 1.72 | 110 | Ln 23 | 1.37 | 94 |
| Comparative Example 6 | TD60UL | A | 10 | C | 1.62 | 60 | A | 1.72 | 110 | Ln 24 | 1.37 | 94 |

[Evaluation of Antireflective Film]

Various performances of the antireflective film were evaluated according to the methods described below. The results obtained are shown in Table 6.

(1) Evaluation of Steel Wool Scratch Resistance (SW Resistance)

The scratch resistance was evaluated by conducting a rubbing test under the conditions shown below using a rubbing tester.

Environmental conditions for evaluation: 25° C., 60% RH
Rubbing material: Steel wool (Grade No, 0000, produced by Nippon Steel Wool Co., Ltd.) wound around the rubbing tip (1×1 cm) of the tester in contact with the sample and fixed by a band
Moving distance (one way): 13 cm.
Rubbing speed: 13 cm/sec
Load: 500 g/cm$^2$
Contact area at the tip: 1×1 cm
Number of times of rubbing: 10 reciprocations Oil-based black ink was applied to the rear side of the sample of antireflective film after the rubbing, and the scratch C: The trace of the fingerprint attached is found, and is noticeable.
D: The wipe-off trace of the fingerprint attached can be clearly recognised, and is noticeable.
E: The fingerprint attached can not be wiped off.

(3) Fingerprint Wipe-Off Property 2

Oil-based black ink was applied to the rear side of the sample of antireflective film, and a finger was passed on the coated surface thereby attaching a fingerprint. The fingerprint attached was wiped off with a tissue paper, and a number of times of wiping-off repetition (reciprocations) performed until the remaining trace of the fingerprint attached completely disappeared was evaluated. The complete disappearance with a smaller number of times of repetition is preferred.

(4) Antifouling Durability

The film was fixed on a glass surface with an adhesive, and a circle of 5 mm in diameter was written thereon in three turns with a pen tip (fine) of a black magic marker (MACKY GOKUBOSO, trade name, produced by ZEBRA Co.) under the conditions of 25° C. and 60% RH. After 10 seconds, the circle was wiped off with a 10-ply folded and bundled BENCOT (trade name, produced by Asahi Kasei Corp.) by moving the bundle back and forth 2 times under a load large enough to make a dent in the BENCOT bundle. The writing and wiping were repeated under the above-described conditions until the magic marker stain could not be eliminated by the wiping, and thus the antifouling durability could be evaluated by a number of times of repetition taken to wipe off the magic marker stain. The number of times of repetition until the marker stain cannot be eliminated is preferably 10 or more, and more preferably 15 or more.

(5) Average Reflectivity

The antireflection property was evaluated by mounting an adapter ARV-474 on a spectrophotometer V-550 (produced by JASCO Corp.), measuring the specular reflectivity for the outgoing angle of 5° at an incident angle of 5° in the wavelength region of 380 to 780 nm, and calculating the average reflectivity at 450 to 650 nm.

(6) Relative Surface Free Energy

A contact angle meter (Contact Angle Meter CA-X, produced by Kyowa Interface Science Co., Ltd.) was used in the dry atmosphere (20° C./65% RH). Using pure water as liquid, a droplet of pure water having a diameter of 1.0 mm was made at the tip of stylus and brought into contact with a film surface, thereby making the droplet on the film surface. The contact angle was defined as an angle that the line tangent to the liquid surface at a film-liquid contact point forms with the film surface on the side including the liquid and measured. Further, using methylene iodide instead of water, the contact angle was measured, and the surface free energy was determined by the formula shown below.

The surface free energy ($\gamma s^v$: unit, mN/m) was defined as a value $\gamma s^v$ ($=\gamma s^d + \gamma s^h$) expressed as a sum of $\gamma s^d$ and $\gamma s^h$ determined by the simultaneous equations a and b shown below using the contact angles $\theta_{H2O}$ and $\theta_{CH2I2}$ of pure water $H_2O$ and methylene iodide $CH_2I_2$ as determined experimentally on the antireflective film, with reference to D. K. Owens, *J. Appl. Polym., Sci.*, 13, 1741 (1969).

$$1+\cos\theta_{H2O}=2\sqrt{\gamma s^d}(\sqrt{\gamma_{H2O}^d/\gamma_{H2O}^v})+2\sqrt{\gamma s^h}(\sqrt{\gamma_{H2O}^h/\gamma_{H2O}^v}) \quad \text{a.}$$

$$1+\cos\theta_{CH2I2}=2\sqrt{\gamma s^d}(\sqrt{\gamma_{CH2I2}^d/\gamma_{CH2I2}^v})+2\sqrt{\gamma s^h}(\sqrt{\gamma_{CH2I2}^h/\gamma_{CH2I2}^v}) \quad \text{b.}$$

$\gamma_{H2O}^d=21.8$, $\gamma_{H2O}^h=51.0$, $\gamma_{H2O}^v=72.8$,
$\gamma_{CH2I2}^6=49.5$, $\gamma_{CH2I2}^h=1.3$, $\gamma_{CH2I2}^v=50.8$ With respect to the surface free energies determined in Examples 7 to 18 and Comparative Examples 4 to 6, the surface free energies of the antireflective films of Examples 7 to 18 and Comparative Examples 5 and 6 are shown in Table 6 below as relative values, taking the surface free energy of the antireflective film of Comparative Examples 4 as 100.

The evaluation results are shown in Table 6.

TABLE 6

|  | Antifouling Agent | SW Resistance | Relative Surface Free Energy | Antifouling Durability (number of times) | Fingerprint Wipe-off Property 1 | Fingerprint Wipe-off Property 2 (number of times) | Average Reflectivity (%) | Refractive Index |
|---|---|---|---|---|---|---|---|---|
| Example 7 | A-41 | A | 90 | 15 | B | 5 | 1.14 | 1.36 |
| Example 8 | A-32 | A | 90 | 15 | B | 4 | 1.14 | 1.36 |
| Example 9 | A-43 | A | 80 | 23 | A | 2 | 1.11 | 1.36 |
| Example 10 | A-34 | A | 80 | 24 | A | 2 | 1.12 | 1.36 |
| Example 11 | A-35 | A | 80 | 25 | A | 1 | 1.11 | 1.36 |
| Example 12 | A-51 | A | 90 | 18 | A | 4 | 1.14 | 1.36 |
| Example 13 | A-52 | A | 90 | 17 | A | 4 | 1.14 | 1.36 |
| Example 14 | A-53 | A | 90 | 19 | A | 3 | 1.14 | 1.36 |
| Example 15 | A-54 | A | 80 | 22 | A | 2 | 1.12 | 1.36 |
| Example 16 | A-56 | A | 80 | 24 | A | 1 | 1.11 | 1.36 |
| Example 17 | A-57 | A | 80 | 25 | A | 1 | 1.11 | 1.36 |
| Example 18 | A-58 | A | 80 | 25 | A | 1 | 1.12 | 1.36 |
| Comparative Example 4 | AC-1 | A | 100 | 10 | C | 10 | 1.20 | 1.38 |
| Comparative Example 5 | AC-2 | A | 100 | 12 | C | 10 | 1.15 | 1.37 |
| Comparative Example 6 | AC-3 | B | 100 | 9 | D | >30 | 1.15 | 1.37 |

As is apparent from the results shown in Table 6, Comparative Examples 4 to 6 using the antifouling agent outside the scope of any of formula (I-1) to (I-5) exhibit the high relative surface free energy and low antifouling durability, and are also poor in the fingerprint wipe-off property.

On the other hand, it can be seen that Examples 7 to 18 using the compound (A) represented by any of formula (I-1) to (I-5) exhibit the low relative surface free energy and high antifouling durability, and are also excellent in the fingerprint wipe-off property.

It can also be seen that the effect of improving the visibility is obtained in Examples 7 to 18, although the difference of the average reflectivity between Examples 7 to 18 and Comparative Examples 4 to 6 is small (for example, the difference is 0.06% between Example 7 and Comparative Example 4).

What is claimed is:

1. A polymerizable composition comprising:
   (A) a compound containing a repeating unit having a polyether structure having a fluorine atom and four or more polymerizable groups and being represented by the following formula (I);
   (B) a photopolymerization initiator; and
   (C) an organic solvent:

Formula (I)

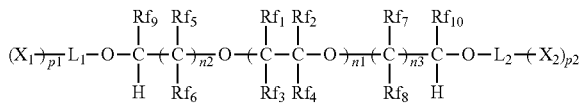

wherein $Rf_1$ to $Rf_4$ each independently represents a fluorine atom, an alkyl group having a fluorine atom or a group represented by —$CF_2$—O—$(CF_2)_{m1}F$, m1 represents an integer of 1 or more, n1 represents a number of the repeating unit and is a positive integer, $Rf_5$ to $Rf_8$ each independently represents a fluorine atom, an alkyl group having a fluorine atom or a group represented by —$CF_2$—O—$(CF_2)_{m2}F$, n2 and n3 each independently represents a positive integer, when n2 or n3 is 2 or more, two or more $Rf_5$s, two or more $Rf_6$s, two or more $Rf_7$s or two or more $Rf_8$s may be same as or different from each other, m2 represents an integer of 1 or more, $Rf_9$ and $Rf_{10}$ each independently represents a hydrogen atom, an alkyl group having a fluorine atom or a group represented by —$CF_2$—O—$(CF_2)_{m3}F$, m3 represents an integer of 1 or more, $L_1$ represents a (p1+1) valent aliphatic connecting group, $L_2$ represents a (p2+1) valent aliphatic connecting group, p1 and p2 each independently represents an integer of 2 or more, and $X_1$ and $X_2$ each independently represents a group having a polymerizable group, and wherein at least one of $Rf_1$ to $Rf_8$ in the formula (I) is a straight chain perfluoroalkyl group having from 2 to 8 carbon atoms or a group represented by —$CF_2$—O—$(CF_2)_mF$ in which m represents an integer from 1 to 10, and $Rf_9$ and $Rf_{10}$ each independently represents a hydrogen atom, a straight chain perfluoroalkyl group having from 2 to 8 carbon atoms or the group represented by —$CF_2$—O—$(CF_2)_{m3}F$.

2. The polymerizable composition as claimed in claim 1, wherein a kind and number of the substituents represented by $Rf_1$ to $Rf_4$ are same among the repeating units in the compound (A).

3. The polymerizable composition as claimed in claim 1, wherein $L_1$ and $L_2$ in the formula (I) each independently represents a connecting group represented by one of the following formula:

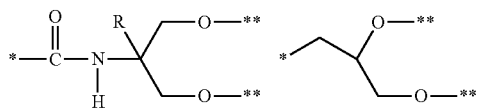

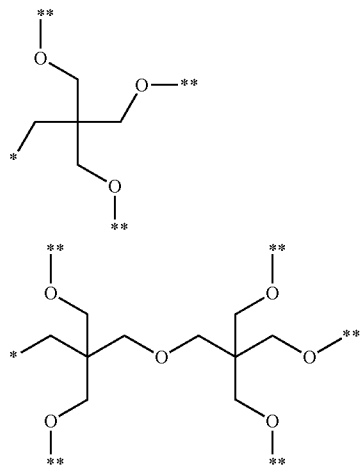

wherein R represents a hydrogen atom or an alkyl group, * represents a site connecting to an adjacent oxygen atom in the formula (I), and ** represents a site connecting to $X_1$ or $X_2$ in the formula (I).

4. The polymerizable composition as claimed in claim 1, wherein the group having a polymerizable group represented by $X_1$ or $X_2$ in the compound (A) is a (meth)acryloyl group.

5. An antireflective film comprising at least one low refractive index layer and a transparent support, wherein the low refractive index layer is formed from the polymerizable composition as claimed in claim 1.

6. A polarizing plate comprising a polarizing film and two protective films which protect both sides of the polarizing film, wherein at least one of the protective films is the antireflective film as claimed in claim 5.

7. An image display device comprising a display having the antireflective film as claimed in claim 5 at an outermost surface of the image display.

* * * * *